US012554233B2

(12) United States Patent
Copperthite et al.

(10) Patent No.: US 12,554,233 B2
(45) Date of Patent: Feb. 17, 2026

(54) METHODS, APPARATUSES, AND COMPUTER PROGRAMMING PRODUCTS IMPLEMENTING A MULTI-VARIABLE, CLOSED LOOP APPROACH FOR DETERMINING AN OPTIMIZATION PATHWAY

(71) Applicant: Honeywell International Inc., Charlotte, NC (US)

(72) Inventors: Amanda Copperthite, Houston, TX (US); Daniel Sherman, Geismar, LA (US); Scott Duncan, Houston, TX (US); Paul Prabakar, Cumming, GA (US); Ramdas Pai, Cary, NC (US); Jeffrey Renfro, Deer Park, TX (US); Joseph Majewski, Huntington, NY (US); Joseph Lu, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 390 days.

(21) Appl. No.: 18/187,873

(22) Filed: Mar. 22, 2023

(65) Prior Publication Data
US 2024/0201639 A1 Jun. 20, 2024

Related U.S. Application Data

(60) Provisional application No. 63/476,324, filed on Dec. 20, 2022.

(51) Int. Cl.
*G05B 13/04* (2006.01)
*G06Q 10/0631* (2023.01)

(52) U.S. Cl.
CPC ....... *G05B 13/042* (2013.01); *G06Q 10/0631* (2013.01)

(58) Field of Classification Search
None
See application file for complete search history.

(56) References Cited

U.S. PATENT DOCUMENTS

| 5,351,184 A | 9/1994 | Lu et al. |
| 5,682,309 A | 10/1997 | Bartusiak et al. |

(Continued)

FOREIGN PATENT DOCUMENTS

| EP | 2172887 A2 | 4/2010 |
| WO | 2015/184123 A1 | 12/2015 |
| WO | 2022/248855 A1 | 12/2022 |

OTHER PUBLICATIONS

Andreas Dellnitz et al., "Energy costs vs. carbon dioxide emissions in short-term production planning," Journal of Business Economics, 90:1383-1407, (Jul. 14, 2020).

(Continued)

*Primary Examiner* — Mohammad Ali
*Assistant Examiner* — Saad M Kabir
(74) *Attorney, Agent, or Firm* — Alston & Bird LLP

(57) ABSTRACT

Embodiments of the present disclosure provide for generating improved, feasible, and optimized pathways for optimizing operation of an industrial plant or component thereof. Embodiments utilize a multi-variate optimization model that may utilize real-time data and any number of available dynamic and static configurations to optimize for multiple optimization parameters. The multi-variate optimization model outputs an optimization pathway, for example including any number of transformation action(s) representing decarbonization step(s), that enable configuration of the plant or processing unit(s) thereof in a manner that optimizes operations of the plant or processing unit(s). For example, the optimization pathway in some contexts is optimized to generate a pathway that reduces the impact of emissions generated by the plant or processing unit(s) in a feasible (Continued)

manner that is most cost efficient for a particular plant in a particular location in consideration with any number of other constraints or considerations.

20 Claims, 32 Drawing Sheets

(56) References Cited

U.S. PATENT DOCUMENTS

| | | | |
|---|---|---|---|
| 11,698,625 | B2 | 7/2023 | Berntorp et al. |
| 2007/0088447 | A1 | 4/2007 | Stothert et al. |
| 2009/0319059 | A1 | 12/2009 | Renfro et al. |
| 2012/0166616 | A1 | 6/2012 | Meehan et al. |
| 2015/0032681 | A1 | 1/2015 | Mevissen et al. |
| 2017/0284198 | A1 | 10/2017 | Pop et al. |
| 2018/0299878 | A1 | 10/2018 | Cella et al. |
| 2019/0130330 | A1 | 5/2019 | Slagle et al. |
| 2019/0155268 | A1 | 5/2019 | Cohen et al. |
| 2020/0089229 | A1 | 3/2020 | Lee et al. |
| 2020/0162559 | A1 | 5/2020 | Sustaeta et al. |
| 2021/0358058 | A1 | 11/2021 | Da Mata Cecilio et al. |
| 2021/0373513 | A1 | 12/2021 | Quirynen et al. |
| 2022/0027817 | A1 | 1/2022 | Hubbs et al. |
| 2022/0327538 | A1 | 10/2022 | Kumar et al. |
| 2023/0022510 | A1 | 1/2023 | Quirynen et al. |
| 2024/0295863 | A1 | 9/2024 | O'Nien et al. |

OTHER PUBLICATIONS

Chaoyang Zhang et al., "Big Data Analysis Approach for Real-Time Carbon Efficiency Evaluation of Discrete Manufacturing Workshops," IEEE Access, 7:107730-107743, (2019).
Extended European Search Report Mailed on Apr. 29, 2024 for EP Application No. 23213920, 13 page(s).
Extended European Search Report Mailed on May 14, 2024 for EP Application No. 23212294, 7 page(s).
Extended European Search Report Mailed on May 14, 2024 for EP Application No. 23212316, 9 page(s).
Extended European Search Report Mailed on May 21, 2024 for EP Application No. 23213234, 10 page(s).
Lin Kong et al., "Multi-layer integration framework for low carbon design based on design features," Journal of Manufacturing Systems, 61:223-238, (Sep. 21, 2021).
Zhongtai Hu et al., "A digital twin-based framework of manufacturing workshop for marine diesel engine," The International Journal of Advanced Manufacturing Technology, 117:3323-3342, (Aug. 27, 2021).
Amanda Copperthite et al., U.S. Appl. No. 18/175,233 for "Method and Apparatus for Optimizing Carbon Emissions Associated With an Operation of a Processing Plant", filed Feb. 27, 2023.
Amanda Copperthite et al., U.S. Appl. No. 18/322,912 for "Emission Optimization for Industrial Processes", filed May 24, 2023.
Hauke Engel et al., "Failure is not an option: Increasing the chances of achieving net zero," McKinsey & Company, 7 pages, (Jun. 2022).
J. G. Renfro et al., "Simultaneous Optimization and Solution of Systems Described by Differential/Algebraic Equations," Computers and Chemical Engineering, 11(5):503-517, (1987).
Jasmeer Ramlal et al., "Moving Horizon Estimation for an Industrial Gas Phase Polymerization Reactor," Proceedings of American Control Conference (ACC), 6 pages, (2007).
Jean-Mark Ollagnier et al., "Reaching Net Zero by 2050," Accenture, 26 pages, (2021).
Jeffrey D. Kelly et al., "Continuously Improve the Performance of Planning and Scheduling Models with Parameter Feedback," Foundations of Computer Aided Operations Conference, 5 pages, (2008).
Jeffrey Glen Renfro et al., U.S. Appl. No. 18/182,767 for "Apparatuses, Computer-Implemented Methods, and Computer Program Products for Closed Loop Optimal Planning and Scheduling Under Uncertainty", filed Mar. 13, 2023.
Matthew Ellis et al., "A tutorial review of economic model predictive control methods," Journal of Process Control, 24:1156-1178, (2014).
Michael J. Risbeck et al., "Mixed-Integer Model Predictive Control with Applications to Building Energy Systems," Ph.D. Thesis, University of Wisconsin—Madison, 204 pages, (2018).
Robert E. Young et al., "Evolution of an Industrial Nonlinear Model Predictive Controller," Chemical Process Control-VI, AIChE Symposium Series No. 326, vol. 98, 342-351, (2001).
RTI, "Net Zero Planner—An Integrated Modeling Tool," 5 pages, (2023). [Retrieved from the Internet Sep. 13, 2023: URL: <https://www.rti.org/impact/net-zero-planner-integrated-modeling-tool>].
Urmila Diwekar, "Introduction to Applied Optimization," Second Edition, Springer, 310 pages, (2008).
Final Rejection Mailed on Sep. 11, 2025 for U.S. Appl. No. 18/175,233, 23 page(s).
Non-Final Rejection Mailed on Jun. 3, 2025 for U.S. Appl. No. 18/322,912, 20 page(s).
Non-Final Rejection Mailed on May 15, 2025 for U.S. Appl. No. 18/175,233, 21 page(s).
Final Rejection Mailed on Oct. 3, 2025 for U.S. Appl. No. 18/322,912, 21 page(s).
Non-Final Rejection Mailed on Sep. 23, 2025 for U.S. Appl. No. 18/182,767, 18 page(s).
EP Office Action Mailed on Oct. 16, 2025 for EP Application No. 23213920, 8 page(s).
Advisory Action (PTOL-303) Mailed on Nov. 7, 2025 for U.S. Appl. No. 18/175,233, 3 page(s).
Advisory Action (PTOL-303) Mailed on Dec. 10, 2025 for U.S. Appl. No. 18/322,912, 3 page(s).

FIG. 5

OPTIMIZATION PATHWAY GENERATOR CONFIGURATION

| Option | Status | Start | Groups | Project Cost | Operating Cost/yr | Actual Emissions/yr | MAC ($/MT CO2e) | Project Duration | One Year Cost |
|---|---|---|---|---|---|---|---|---|---|
| LDAR Enhancement | Optimized | 2023 | 1 | $511,000 | $0 | 170000 | $0.16 | 2 | $26,531 |
| PSV | Optimized | 2024 | 2 | $6,077,000 | $58,846 | 109023 | $2.65 | 2 | $288,911 |
| 245fa Non-Cond | Optimized | 2024 | 3 | $500,000 | $20,153 | 3500 | $10.46 | 2 | $36,610 |
| Other HFC Emissions | Optimized | 2027 | 4 | $2,000,000 | $57,579 | 10000 | $15.00 | 2 | $150,000 |
| Carbon Capture Boilers | Optimized | 2023 | 5 | $30,000,000 | $1,948,102 | 56393 | $19.78 | 5 | $1,115,346 |
| Grey Boilers | Optimized | 2023 | 5 | $31,700,000 | $0 | 59361 | $80.64 | 3 | $4,786,751 |
| Blue H2 Boilers | Optimized | 2032 | 5 | $31,700,000 | $0 | 59361 | $212.85 | 3 | $12,634,877 |
| Green H2 Boilers | Optimized | 2023 | 5 | $31,700,000 | $0 | 59361 | $111.05 | 3 | $6,591,820 |
| Renewable Elect. Combustion Boilers | Optimized | 2023 | 6 | $0 | $0 | 59361 | $165.20 | 5 | $9,806,753 |
| Gray H2 HF Furnaces and Spar Dryer | Optimized | 2023 | 6 | $10,000,000 | $0 | 28731 | $80.64 | 3 | $2,316,793 |
| Blue H2 HF Furnaces and Spar Dryer | Optimized | 2030 | 6 | $10,000,000 | $0 | 28731 | $212.85 | 3 | $6,115,295 |
| Green H2 HF Furnaces and Spar Dryer | Optimized | 2023 | 6 | $10,000,000 | $0 | 28731 | $111.05 | 3 | $3,190,449 |
| Renew Elect. Comb HF Furnaces and Spar Dryer | Optimized | 2023 | 6 | $0 | $0 | 28731 | $165.20 | 5 | $4,746,479 |
| Gray H2 Hot Salt Furnaces | Optimized | 2023 | 7 | $5,000,000 | $0 | 7511 | $80.64 | 3 | $605,671 |
| Blue H2 Hot Salt Furnaces | Optimized | 2032 | 7 | $5,000,000 | $0 | 7511 | $212.85 | 3 | $1,596,699 |
| Green H2 Hot Salt Furnaces | Optimized | 2023 | 7 | $5,000,000 | $0 | 7511 | $111.05 | 3 | $834,067 |
| Renewable Elect. Comb Hot Salt Furnaces | Optimized | 2023 | 7 | $0 | $0 | 7511 | $165.20 | 5 | $1,240,855 |
| Heat Recovery Phase 1 | Optimized | 2023 | 8 | $2,100,000 | $67,176 | 3101 | $8.70 | 2 | $26,979 |
| Efficiency Red. Combustion | Optimized | 2023 | 9 | $18,000,000 | $1,061,380 | 7892 | $15.00 | 2 | $118,380 |
| Renewable Elect. Electricity | Optimized | 2028 | 10 | $0 | $4,500,000 | 73421 | $61.29 | 2 | $4,499,973 |
| Efficiency Red. Electricity | Optimized | 2028 | 11 | $5,000,000 | $1,410,695 | 8158 | $15.00 | 2 | $122,370 |
| Carbon Offset Purchase | Optimized | 2023 | 12 | $0 | $0 | 0 | $82.5 | 0 | $31,315,675 |

| | | | | |
|---|---|---|---|---|
| Cost of Offsets Per MT CO2 | $82.5 | | | |
| Initial Year | 2022 | | | |
| Final Year | 2035 | | | |
| Number of Project Choices | 22 | | | |
| Number of years in problem | 14 | | | |
| Maximum Number of Projects in a Year | 3 | 3 | | |
| Maximum 2 Year Projects in a Year | 3 | 3 | | |
| Maximum 3 Year Projects in a Year | 2 | 2 | | |
| Maximum 5 Year Projects in a Year | 1 | 1 | | |
| Maximum Total Time of Selected Projects | 9 | 9 | | |
| Project Status Options | Optimized | Fixed | Unavailable | |
| Objective Function | MAC | TotalCost | MinTimeToCN | |

BUILD MILP

OPTIMIZATION PATHWAY GENERATOR CONFIGURATION 600

| Asset Project | 2022 | 2023 | 2024 | 2025 | 2026 | 2027 | 2028 | 2029 | 2030 | 2031 | 2032 | 2033 | 2034 | 2035 |
|---|---|---|---|---|---|---|---|---|---|---|---|---|---|---|
| Plant A Emissions (MT CO2e) | 715000 | 715000 | 715000 | 715000 | 715000 | 715000 | 715000 | 715000 | 357500 | 357500 | 357500 | 357500 | 357500 | 0 |
| Plant A Emission Reductions (MT CO2e) | 0 | 0 | 0 | 0 | 0 | 0 | 0 | 0 | 357500 | 357500 | 357500 | 357500 | 357500 | 357500 |
| Plant A Cumulative Emission Reductions (MT CO2e) | 0 | 0 | 0 | 0 | 0 | 0 | 0 | 0 | 357500 | 357500 | 357500 | 357500 | 357500 | 715000 |
| Plant A Project Costs | $0 | $0 | $0 | $30,500,000 | $30,500,000 | $0 | $6,588,000 | $0 | $0 | $0 | $0 | $0 | $0 | $0 |
| Plant A Cumulative Project Costs | $0 | $0 | $0 | $30,500,000 | $30,500,000 | $0 | $37,088,000 | $37,088,000 | $37,088,000 | $37,088,000 | $37,088,000 | $37,088,000 | $37,088,000 | $37,088,000 |
| Plant A Operationg Cost Changes | $0 | $0 | $0 | $0 | $0 | $0 | $0 | $0 | $185,024 | $185,024 | $185,024 | $185,024 | $185,024 | $29,308,726 |
| Plant A Cumulative Operating Cost Changes | $0 | $0 | $0 | $0 | $0 | $0 | $0 | $0 | $185,024 | $370,047 | $555,071 | $740,094 | $925,118 | $928,383,609 |

| | |
|---|---|
| TOTAL PROJECT COST | $37,088,000 $37,088,000 |
| TOTAL OPERATING COST 20 YEARS | $586,174,529 $586,174,529 |
| TOTAL COST | $623,262,529 $623,262,529 |

| Objective Function | MAC | | |
|---|---|---|---|
| Constraints | Minimum | Value | Maximum |
| Total Projects | 0 | 3 | 3 |
| Two Year Projects | 0 | 2 | 3 |
| Three Year Projects | 0 | 0 | 2 |
| Five Year Projects | 0 | 1 | 1 |
| Total Time of Selected Project | 0 | 9 | 9 |

| | |
|---|---|
| TOTAL EMISSIONS REDUCTION % | 100% |
| 2030 EMISSIONS PURCHASE TO OFFSET | 22084 |
| FINAL EMISSIONS PURCHASE TO OFFSET | 379584 |
| 2030 EMISSIONS LIMIT | 357500 |
| FINAL EMISSIONS LIMIT | 357500 |

| | | |
|---|---|---|
| FINAL EMISSIONS | 0 | BASE |
| FINAL PERIOD MAC TO ACHIEVE CN ($/MT CO2e) | $45.80 | $45.80 |
| AVERAGE MAC TO ACHIEVE CN ($/MT CO2e) | $68.55 | $68.55 |

FIG. 6

Net Zero Optimal Planner Project Schedule

| Asset | Project | Status | 2022 | 2023 | 2024 | 2025 | 2026 | 2027 | 2028 | 2029 | 2030 | 2031 | 2032 | 2033 | 2034 | 2035 |
|---|---|---|---|---|---|---|---|---|---|---|---|---|---|---|---|---|
| Plant A | LDAR Enhancement | Optimized | | | | | | | PROJECT | PROJECT | | | | | | |
| Plant A | PSV | Optimized | | | | | | | PROJECT | PROJECT | | | | | | |
| Plant A | 245fa Non-Cond | Optimized | | | | | | | | | | | | | | |
| Plant A | Other HFC Emissions | Optimized | | | | | | | | | | | | | | |
| Plant A | Carbon Capture Boilers | Optimized | | | | PROJECT | PROJECT | PROJECT | PROJECT | PROJECT | | | | | | |
| Plant A | Grey Boilers | Optimized | | | | | | | | | | | | | | |
| Plant A | Blue H2 Boilers | Optimized | | | | | | | | | | | | | | |
| Plant A | Green H2 Boilers | Optimized | | | | | | | | | | | | | | |
| Plant A | Renewable Elect. Combustion Boilers | Optimized | | | | | | | | | | | | | | |
| Plant A | Gray H2 HF Furnaces and Spar Dryer | Optimized | | | | | | | | | | | | | | |
| Plant A | Blue H2 HF Furnaces and Spar Dryer | Optimized | | | | | | | | | | | | | | |
| Plant A | Green H2 HF Furnaces and Spar Dryer | Optimized | | | | | | | | | | | | | | |
| Plant A | Renew Elect. Comb HF Furnaces and Spar Dryer | Optimized | | | | | | | | | | | | | | |
| Plant A | Gray H2 Hot Salt Furnaces | Optimized | | | | | | | | | | | | | | |
| Plant A | Blue H2 Hot Salt Furnaces | Optimized | | | | | | | | | | | | | | |
| Plant A | Green H2 Hot Salt Furnaces | Optimized | | | | | | | | | | | | | | |
| Plant A | Renewable Elect. Comb Hot Salt Furnaces | Optimized | | | | | | | | | | | | | | |
| Plant A | Heat Recovery Phase 1 | Optimized | | | | | | | | | | | | | | |
| Plant A | Efficiency Red. Combustion | Optimized | | | | | | | | | | | | | | |
| Plant A | Renewable Elect. Electricity | Optimized | | | | | | | | | | | | | | |
| Plant A | Efficiency Red. Electricity | Optimized | | | | | | | | | | | | | | |
| Plant A | Carbon Offset Purchase | Optimized | | | | | | | | | | | | | | |
| Plant A | Total Projects | | 0 | 0 | 0 | 1 | 1 | 1 | 3 | 3 | 0 | 0 | 0 | 0 | 0 | 0 |

FIG. 7

OPTIMIZATION PATHWAY PROJECTED PROJECT COSTS

| Asset | Project | Status | 2022 | 2023 | 2024 | 2025 | 2026 | 2027 | 2028 | 2029 | 2030 | 2031 | 2032 | 2033 | 2034 | 2035 |
|---|---|---|---|---|---|---|---|---|---|---|---|---|---|---|---|---|
| Plant A | LDAR Enhancement | Optimized | $0 | $0 | $0 | $0 | $0 | $0 | $511,000 | $0 | $0 | $0 | $0 | $0 | $0 | $0 |
| Plant A | PSV | Optimized | $0 | $0 | $0 | $0 | $0 | $0 | $6,077,000 | $0 | $0 | $0 | $0 | $0 | $0 | $0 |
| Plant A | 245fa Non-Cond | Optimized | $0 | $0 | $0 | $0 | $0 | $0 | $0 | $0 | $0 | $0 | $0 | $0 | $0 | $0 |
| Plant A | Other HFC Emissions | Optimized | $0 | $0 | $0 | $0 | $0 | $0 | $0 | $0 | $0 | $0 | $0 | $0 | $0 | $0 |
| Plant A | Carbon Capture Boilers | Optimized | $0 | $0 | $0 | $30,500,000 | $0 | $0 | $0 | $0 | $0 | $0 | $0 | $0 | $0 | $0 |
| Plant A | Grey Boilers | Optimized | $0 | $0 | $0 | $0 | $0 | $0 | $0 | $0 | $0 | $0 | $0 | $0 | $0 | $0 |
| Plant A | Blue H2 Boilers | Optimized | $0 | $0 | $0 | $0 | $0 | $0 | $0 | $0 | $0 | $0 | $0 | $0 | $0 | $0 |
| Plant A | Green H2 Boilers | Optimized | $0 | $0 | $0 | $0 | $0 | $0 | $0 | $0 | $0 | $0 | $0 | $0 | $0 | $0 |
| Plant A | Renewable Elect. Combustion Boilers | Optimized | $0 | $0 | $0 | $0 | $0 | $0 | $0 | $0 | $0 | $0 | $0 | $0 | $0 | $0 |
| Plant A | Gray H2 HF Furnaces and Spar Dryer | Optimized | $0 | $0 | $0 | $0 | $0 | $0 | $0 | $0 | $0 | $0 | $0 | $0 | $0 | $0 |
| Plant A | Blue H2 HF Furnaces and Spar Dryer | Optimized | $0 | $0 | $0 | $0 | $0 | $0 | $0 | $0 | $0 | $0 | $0 | $0 | $0 | $0 |
| Plant A | Green H2 HF Furnaces and Spar Dryer | Optimized | $0 | $0 | $0 | $0 | $0 | $0 | $0 | $0 | $0 | $0 | $0 | $0 | $0 | $0 |
| Plant A | Renew Elect. Comb HF Furnaces and Spar Dryer | Optimized | $0 | $0 | $0 | $0 | $0 | $0 | $0 | $0 | $0 | $0 | $0 | $0 | $0 | $0 |
| Plant A | Gray H2 Hot Salt Furnaces | Optimized | $0 | $0 | $0 | $0 | $0 | $0 | $0 | $0 | $0 | $0 | $0 | $0 | $0 | $0 |
| Plant A | Blue H2 Hot Salt Furnaces | Optimized | $0 | $0 | $0 | $0 | $0 | $0 | $0 | $0 | $0 | $0 | $0 | $0 | $0 | $0 |
| Plant A | Green H2 Hot Salt Furnaces | Optimized | $0 | $0 | $0 | $0 | $0 | $0 | $0 | $0 | $0 | $0 | $0 | $0 | $0 | $0 |
| Plant A | Renewable Elect. Comb Hot Salt Furnaces | Optimized | $0 | $0 | $0 | $0 | $0 | $0 | $0 | $0 | $0 | $0 | $0 | $0 | $0 | $0 |
| Plant A | Heat Recovery Phase 1 | Optimized | $0 | $0 | $0 | $0 | $0 | $0 | $0 | $0 | $0 | $0 | $0 | $0 | $0 | $0 |
| Plant A | Efficiency Red. Combustion | Optimized | $0 | $0 | $0 | $0 | $0 | $0 | $0 | $0 | $0 | $0 | $0 | $0 | $0 | $0 |
| Plant A | Renewable Elect. Electricity | Optimized | $0 | $0 | $0 | $0 | $0 | $0 | $0 | $0 | $0 | $0 | $0 | $0 | $0 | $0 |
| Plant A | Efficiency Red. Electricity | Optimized | $0 | $0 | $0 | $0 | $0 | $0 | $0 | $0 | $0 | $0 | $0 | $0 | $0 | $0 |
| Plant A | Carbon Offset Purchase | Optimized | 0 | $0 | $0 | $0 | $0 | $0 | $0 | $0 | $0 | $0 | $0 | $0 | $0 | $0 |
| Plant A | Project Costs | | $37,088,000 | $0 | $0 | $30,500,000 | $0 | $0 | $6,588,000 | $0 | $0 | $0 | $0 | $0 | $0 | $0 |
| Plant A | Total Project Costs | | | | | | | | | | | | | | | |

FIG. 8

| OPTIMIZATION PATHWAY PROJECTED OPERATIONAL COSTS | | | | | | | | | | | | | | |
|---|---|---|---|---|---|---|---|---|---|---|---|---|---|---|
| Project | Status | 2022 | 2023 | 2024 | 2025 | 2026 | 2027 | 2028 | 2029 | 2030 | 2031 | 2032 | 2033 | 2034 | 2035 |
| LDAR Enhancement | Optimized | | | | | | | | | $0 | $0 | $0 | $0 | $0 | $0 |
| PSV | Optimized | | | | | | | | | $58,846 | $58,846 | $58,846 | $58,846 | $58,846 | $58,846 |
| 245fa Non-Cond | Optimized | | | | | | | | | $0 | $0 | $0 | $0 | $0 | $0 |
| Other HFC Emissions | Optimized | | | | | | | | | $0 | $0 | $0 | $0 | $0 | $0 |
| Carbon Capture Boilers | Optimized | | | | | | | | | $1,948,102 | $1,948,102 | $1,948,102 | $1,948,102 | $1,948,102 | $1,948,102 |
| Grey Boilers | Optimized | | | | | | | | | $0 | $0 | $0 | $0 | $0 | $0 |
| Blue H2 Boilers | Optimized | | | | | | | | | $0 | $0 | $0 | $0 | $0 | $0 |
| Green H2 Boilers | Optimized | | | | | | | | | $0 | $0 | $0 | $0 | $0 | $0 |
| Renewable Elect. Combustion Boilers | Optimized | | | | | | | | | $0 | $0 | $0 | $0 | $0 | $0 |
| Gray H2 HF Furnaces and Spar Dryer | Optimized | | | | | | | | | $0 | $0 | $0 | $0 | $0 | $0 |
| Blue H2 HF Furnaces and Spar Dryer | Optimized | | | | | | | | | $0 | $0 | $0 | $0 | $0 | $0 |
| Green H2 HF Furnaces and Spar Dryer | Optimized | | | | | | | | | $0 | $0 | $0 | $0 | $0 | $0 |
| Renew Elect. Comb HF Furnaces and Spar Dryer | Optimized | | | | | | | | | $0 | $0 | $0 | $0 | $0 | $0 |
| Gray H2 Hot Salt Furnaces | Optimized | | | | | | | | | $0 | $0 | $0 | $0 | $0 | $0 |
| Blue H2 Hot Salt Furnaces | Optimized | | | | | | | | | $0 | $0 | $0 | $0 | $0 | $0 |
| Green H2 Hot Salt Furnaces | Optimized | | | | | | | | | $0 | $0 | $0 | $0 | $0 | $0 |
| Renewable Elect. Comb Hot Salt Furnaces | Optimized | | | | | | | | | $0 | $0 | $0 | $0 | $0 | $0 |
| Heat Recovery Phase 1 | Optimized | | | | | | | | | $0 | $0 | $0 | $0 | $0 | $0 |
| Efficiency Red. Combustion | Optimized | | | | | | | | | $0 | $0 | $0 | $0 | $0 | $0 |
| Renewable Red. Electricity | Optimized | | | | | | | | | $0 | $0 | $0 | $0 | $0 | $0 |
| Efficiency Red. Electricity | Optimized | | | | | | | | | $0 | $0 | $0 | $0 | $0 | $0 |
| Carbon Offset Purchase | Optimized | | | | | | | | | $1,821,925 | $1,821,925 | $1,821,925 | $1,821,925 | $1,821,925 | $31,315,675 |
| Operational Cost Changes | $0 | | | | | | | | | $185,024 | $185,024 | $185,024 | $185,024 | $185,024 | $29,308,726 |
| Total Operational Cost Changes | $28,383,609 | | | | | | | | | | | | | | |

FIG. 9

METHODS, APPARATUSES, AND COMPUTER PROGRAMMING PRODUCTS IMPLEMENTING A MULTI-VARIABLE, CLOSED LOOP APPROACH FOR DETERMINING AN OPTIMIZATION PATHWAY

CROSS-REFERENCE TO RELATED APPLICATIONS

This application claims the benefit of U.S. Provisional Patent Application No. 63/476,324, filed Dec. 20, 2022, the entire contents of which are incorporated by reference herein.

TECHNOLOGICAL FIELD

Embodiments of the present disclosure relate generally to determining an optimal pathway toward decarbonization of industrial control systems, and specifically to utilizing multiple input variables, constraints, and system feedback to determine an optimal path toward decarbonization.

BACKGROUND

In various contexts, organizations may attempt to determine an appropriate approach to reduce carbon emissions of industrial control systems. Often, decision makers at these organizations rely on data and models to understand the potential impact and risks associated with the complex task of decarbonization.

Applicant has identified many technical challenges and difficulties associated with analyzing and drawing conclusions based on the complex and everchanging data and models associated with decarbonization. Through applied effort, ingenuity, and innovation, Applicant has solved problems related to determining an optimization pathway by developing solutions embodied in the present disclosure, which are described in detail below.

BRIEF SUMMARY

Various embodiments are directed to example methods, apparatuses, and computer program products for producing an optimization pathway based on a plurality of input data. Other implementations for determining an optimization pathway will be, or will become, apparent to one with skill in the art upon examination of the following figures and detailed description. It is intended that all such additional implementations be included within this description be within the scope of the disclosure, and be protected by the following claims.

In accordance with one aspect of the disclosure, a computer-implemented method for producing an optimization pathway for a plurality of assets is provided. In some embodiments, the computer-implemented method is executable via any number of device(s) embodied in specialized hardware, software, firmware, and/or a combination thereof, as described herein. In one example embodiment, the example computer-implemented method includes receiving a plurality of inputs including at least one uncertain input and a plurality of variable inputs, where the at least one uncertain input is associated with an uncertainty model, and where the uncertainty model corresponds to a predicted accuracy of the uncertain input. The example computer-implemented method further includes generating an optimization model, where the optimization model is associated with a plurality of optimization parameters, and where the optimization model is configured based at least in part on the plurality of configuration inputs, the input uncertainty model, at least one hard constraint, and at least one soft constraint. The example computer-implemented method further includes generating the optimization pathway including a plurality of decarbonization tasks associated with the plurality of assets based at least in part on the optimization model, where the optimization pathway is optimized according to the plurality of selected optimization parameters, where the optimization pathway conforms to each of the one or more hard constraints. The example computer-implemented method further includes generating an updated optimization pathway based at least in part on an observed value and the optimization pathway, where the observed value includes at least one measured value captured by one or more sensing devices positioned to capture a physical characteristic of a monitored asset of the plurality of assets.

Additionally or alternatively, in some embodiments of the example computer-implemented method, the plurality of configuration inputs include static configuration inputs, and dynamic configuration inputs.

Additionally or alternatively, in some embodiments of the example computer-implemented method, the static configuration inputs include at least one of a geographic location of one or more assets of the plurality of assets and an operating environment of one or more assets of the plurality of assets.

Additionally or alternatively, in some embodiments of the example computer-implemented method, the dynamic configuration inputs include at least one of a cost of consumable materials, a cost of operations, a budget, regulatory requirements, resources available, and implementation timelines.

Additionally or alternatively, in some embodiments of the example computer-implemented method, the uncertainty model indicates the predicted accuracy of the uncertain input through a probability distribution indicating a probability of an occurrence of a particular value for the uncertain input.

Additionally or alternatively, in some embodiments of the example computer-implemented method, each of the plurality of optimization parameters is associated with an optimization weight corresponding to a relative priority of a particular optimization parameter, and the plurality of optimization parameters are optimized according to an order defined by the optimization weight.

Additionally or alternatively, in some embodiments of the example computer-implemented method, the example computer-implemented method further includes receiving a carbon emissions target value representing the target net carbon emissions for the plurality of assets, where a model carbon emissions output value associated with the net carbon emissions of the optimized plurality of assets is below the carbon emissions target value.

Additionally or alternatively, in some embodiments of the example computer-implemented method, the plurality of optimization parameters may include at least one of total cost, time, risk, and total carbon emissions.

Additionally or alternatively, in some embodiments of the example computer-implemented method, the plurality of decarbonization tasks include replacing, modifying, or installing at least one asset of the plurality of assets.

Additionally or alternatively, in some embodiments of the example computer-implemented method, performance of the plurality of decarbonization tasks results in a reduction of a carbon emissions value of one or more assets of the plurality of assets.

Additionally or alternatively, in some embodiments of the example computer-implemented method, the optimization pathway provides a predicted value for each of the plurality of optimization parameters.

In accordance with another aspect of the disclosure, an apparatus for producing an optimization pathway for a plurality of assets is provided. In one example embodiment, the example apparatus includes at least one processor and at least one memory having computer-coded instructions stored thereon that, in execution with the at least one processor, causes the apparatus to perform any one of the example computer-implemented methods described herein. In another example embodiment, the example apparatus includes means as described herein for performing any one of the example computer-implemented methods described herein.

In accordance with another aspect of the disclosure, a computer program product for producing an optimization pathway for a plurality of assets is provided. In one example embodiment, the example computer program product includes at least one non-transitory computer-readable storage medium having computer program code stored thereon that, in execution with at least one processor, configures the computer program product for performing the steps of any one of the example computer-implemented methods described herein.

In an embodiment, a system comprises one or more processors and a memory having program code stored thereon. The program code, in execution with the at least one processor, causes the system to determine a set of emission constraints associated with emission optimization for an industrial domain related to one or more industrial processes that produce one or more industrial process products. In one or more embodiments, the program code, in execution with the at least one processor, also causes the system to configure an emission optimization model based at least in part on the set of emission constraints and at least one other non-emission constraint. In one or more embodiments, the program code, in execution with the at least one processor, also causes the system to receive an emission optimization request to optimize carbon emissions related to the one or more industrial processes.

In one or more embodiments, the program code, in execution with the at least one processor, also causes the system to, in response to the emission optimization request, apply the emission optimization model to real-time measurement data associated with the one or more industrial processes to determine one or more operational modifications for the one or more industrial processes that at least satisfy the set of emission constraints and optimize the at least one non-emission constraint. In one or more embodiments, the program code, in execution with the at least one processor, also causes the system to, in response to the emission optimization request and based on the one or more operational modifications, perform one or more actions associated with the one or more industrial processes.

In another embodiment, a computer-implemented method is provided. The computer-implemented method provides for determining a set of emission constraints associated with emission optimization for an industrial domain related to one or more industrial processes that produce one or more industrial process products. In one or more embodiments, the computer-implemented method also provides for configuring an emission optimization model based at least in part on the set of emission constraints and at least one other non-emission constraint. In one or more embodiments, the computer-implemented method also provides for receiving an emission optimization request to optimize carbon emissions related to the one or more industrial processes. In one or more embodiments, the computer-implemented method also provides for, in response to the emission optimization request, applying the emission optimization model to real-time measurement data associated with the one or more industrial processes to determine one or more operational modifications for the one or more industrial processes that at least satisfy the set of emission constraints and optimize the at least one non-emission constraint. In one or more embodiments, the computer-implemented method also provides for, in response to the emission optimization request and based on the one or more operational modifications, performing one or more actions associated with the one or more industrial processes.

In yet another embodiment, a computer program product comprises at least one non-transitory computer-readable storage medium having computer-readable program code portions stored therein. The computer-readable program code portions comprise an executable portion configured to determine a set of emission constraints associated with emission optimization for an industrial domain related to one or more industrial processes that produce one or more industrial process products. In one or more embodiments, the computer-readable program code portions also comprise an executable portion configured to configure an emission optimization model based at least in part on the set of emission constraints and at least one other non-emission constraint. In one or more embodiments, the computer-readable program code portions also comprise an executable portion configured to receive an emission optimization request to optimize carbon emissions related to the one or more industrial processes. In one or more embodiments, the computer-readable program code portions also comprise an executable portion configured to, in response to the emission optimization request, apply the emission optimization model to real-time measurement data associated with the one or more industrial processes to determine one or more operational modifications for the one or more industrial processes that at least satisfy the set of emission constraints and optimize the at least one non-emission constraint. In one or more embodiments, the computer-readable program code portions also comprise an executable portion configured to, in response to the emission optimization request and based on the one or more operational modifications, perform one or more actions associated with the one or more industrial processes.

In various aspects, a computer-implemented method for optimizing carbon emissions associated with an operation of a processing plant is provided. The processing plant can include a plurality of assets and the computer-implemented method can include identifying a carbon output value associated with operating each asset of the plurality of assets of the processing plant. The computer-implemented method can further include identifying an impact value associated with each asset of the plurality of assets. The impact value associated with each asset can include a marginal abatement impact value associated with the asset, an operational impact value associated with operating the asset, and/or an asset alteration impact value associated with the asset.

In various examples, the computer-implemented method can further include generating an optimized set of transformation actions corresponding to the plurality of assets utilizing a multi-optimization model. The multi-optimization model can be based at least in part on the carbon output value associated with operating each asset of the plurality of assets and the impact value associated with each asset of the plurality of assets.

In various examples, an optimized cumulative carbon output value associated with the operations of the plurality of assets can be less than a current cumulative carbon output value associated with the plurality of assets and an optimized cumulative carbon output value can be further based at least in part on the optimized set of transformation actions. An optimized cumulative impact value associated with the operations of the plurality of assets can be less than a current cumulative asset impact value associated with the plurality of assets. The optimized cumulative impact value can be further based at least in part on the optimized set of transformation actions. Also, generating the optimized set of transformation actions over a long duration of time further includes minimizing the optimized cumulative impact value associated with the plurality of assets.

In various examples, the computer-implemented method can include identifying a carbon emissions goal value and the optimized cumulative carbon output value can be less than the carbon emissions goal value. The carbon emissions goal value can be based at least in part on a geographical location of the processing plant.

In various examples, the computer-implemented method can include determining the optimized cumulative carbon output value associated with the plurality of assets. Also, generating the optimized set of transformation actions can be in response to the optimized cumulative carbon output value exceeding a carbon emissions goal value. Generating the optimized set of transformation actions can be done in real-time or in near real-time with the determining the optimized cumulative carbon output value associated with the plurality of assets.

In various examples, the optimized set of transformation actions can include a transformation action to generate a schedule for installing, replacing, renewing, or modifying at least one asset of the plurality of assets. Also, the optimized set of transformation actions can include a first transformation action to generate a schedule for installing, replacing, renewing, or modifying a first asset of the plurality of assets and a second transformation action to generate a recommendation to install, replace, renew, or modify the first asset of the plurality of assets.

In various examples, the optimized set of transformation actions can include a transformation action to generate a recommendation to install, replace, renew, or modify at least one asset of the plurality of assets, a transformation action to automatically generate a work order to install, replace, renew, or modify at least one asset of the plurality of assets, a transformation action to convert received electricity to operate at least one asset of the plurality of assets from a non-renewable energy source to a renewable energy source, a transformation action to convert at least one asset of the plurality of assets to operate with green hydrogen, and/or a transformation action to obtain a carbon credit offset for an operation of at least one asset of the plurality of assets.

In various examples, the computer-implemented method of claim 1 can include performing at least one transformation action of the optimized set of transformation actions on at least one asset of the plurality of assets and generating a time stamp of when the at least one transformation action was performed on the at least one asset of the plurality of assets.

In various examples, generating the optimized set of transformation actions can include generating a first scenario for the optimized set of transformation actions in real-time or in near real-time with generating a second scenario for the optimized set of transformation actions. The first scenario can include a first transformation action associated with a first asset of the plurality of assets and the second scenario can include a second transformation action, different than the first transformation action, that can be associated with a second asset of the plurality of assets. The computer-implemented method can include performing the first transformation action or the second transformation action, but not both.

In various examples, generating the optimized set of transformation actions can include generating a first scenario for the optimized set of transformation actions in real-time or in near real-time with generating a second scenario for the optimized set of transformation actions. The first scenario can include a first transformation action associated with a first asset of the plurality of assets and the second scenario can include a second transformation action, different than the first transformation action, that can be associated with the first asset of the plurality of assets. The computer-implemented method can include performing the first transformation action or the second transformation action, but not both.

In various aspects, an apparatus includes at least one processor and at least one memory, which can include program code. The at least one memory and the program code can be configured to, with the at least one processor, cause the apparatus to receive or determine a carbon output value associated with operating each asset of a plurality of assets of a processing plant. Additionally, the at least one memory and the program code can be configured to, with the at least one processor, cause the apparatus to receive or determine an impact value associated with each asset of the plurality of assets. The impact value associated with each asset can include a marginal abatement impact value associated with the asset, an operational impact value associated with operating the asset, and/or an asset alteration impact value associated with the asset. The at least one memory and the program code can be configured to, with the at least one processor, cause the apparatus to generate an optimized set of transformation actions corresponding to the plurality of assets utilizing a multi-optimization model based at least in part on the carbon output value associated with operating each asset of the plurality of assets and the impact value associated with each asset of the plurality of assets. An optimized cumulative carbon output value associated with the operations of the plurality of assets can be less than a current cumulative carbon output value associated with the plurality of assets. The optimized cumulative carbon output value can be further based at least in part on the optimized set of transformation actions. An optimized cumulative impact value associated with the operations of the plurality of assets can be less than a current cumulative asset impact value associated with the plurality of assets. The optimized cumulative impact value can be further based at least in part on the optimized set of transformation actions.

In various examples, the at least one memory and the program code can be further configured to, with the at least one processor, cause the apparatus to receive or determine a carbon emissions goal value. The optimized cumulative carbon output value can be less than the carbon emissions goal value.

In various examples, the at least one memory and the program code can be further configured to, with the at least one processor, cause the apparatus to determine the optimized cumulative carbon output value associated with the plurality of assets. If the optimized cumulative carbon output value exceeds a carbon emissions goal value, the generation of the optimized set of transformation actions can be caused.

In various examples, the optimized set of transformation actions can include a first transformation action to generate a schedule for installing, replacing, renewing, or modifying a first asset of the plurality of assets and a second transformation action to generate a recommendation to install, replace, renew, or modify the first asset of the plurality of assets.

In various examples, the optimized set of transformation actions includes a transformation action to generate a recommendation to install, replace, renew, or modify at least one asset of the plurality of assets, a transformation action to automatically generate a work order to install, replace, renew, or modify at least one asset of the plurality of assets, a transformation action to convert received electricity to operate at least one asset of the plurality of assets from a non-renewable energy source to a renewable energy source, a transformation action to convert at least one asset of the plurality of assets to operate with green hydrogen, and/or a transformation action to obtain a carbon credit offset for an operation of at least one asset of the plurality of assets.

In various examples, the at least one memory and the program code can be further configured to, with the at least one processor, cause the apparatus to perform at least one transformation action of the optimized set of transformation actions on at least one asset of the plurality of assets and generate a time stamp of when the at least one transformation action was performed on the at least one asset of the plurality of assets.

In various examples, the at least one memory and the program code can be further configured to, with the at least one processor, cause the apparatus to generate a first scenario for the optimized set of transformation actions in real-time or in near real-time with generating a second scenario for the optimized set of transformation actions. The first scenario can include a first transformation action associated with a first asset of the plurality of assets, and the second scenario can include a second transformation action, different than the first transformation action, that can be associated with a second asset of the plurality of assets. The at least one memory and the program code can be further configured to perform the first transformation action or the second transformation action, but not both. In accordance with another aspect of the disclosure, a computer-implemented method for generating an optimized plan with respect to a target is provided. In one example embodiment, the computer-implemented method comprises: receiving, using one or more processors, input data associated with an industrial plant, wherein at least a portion of the input data comprises uncertain input data; generating, using the one or more processors, uncertainty-based modification data; applying at least the uncertainty-based modification data to the input data to generate updated input data: generating, using the one or more processors and based at least in part on applying the updated input data to an optimization model, predicted optimized plan comprising optimized plan data; and initiating, using the one or more processors, the performance of one or more prediction-based actions based at least in part on the predicted optimized plan.

Additionally or alternatively, in some embodiments of the example computer-implemented method, generating the uncertainty-based modification data comprises: identifying, using the one or more processors, a set of uncertain input variables associated with the uncertain input data; generating, using the one or more processors, a data distribution for each uncertain input variable in the set of uncertain input variables; and generating, using the one or more processors, the uncertainty-based modification data based at least in part on sampling the data distribution for each uncertain input variable.

Additionally or alternatively, in some embodiments of the example computer-implemented method, generating the predicted optimized plan based at least in part on applying the input data comprises: for each sampled set of uncertain input variables: optimizing, using the one or more processors and based at least in part on a priority order, a control error minimization problem for each of one or more constraint priority groups, wherein each constraint priority group is associated with a priority level; and optimizing, using the one or more processors, a profit maximization problem, wherein the profit maximization problem comprises at least a decision variable cost measure.

Additionally or alternatively, in some embodiments of the example computer-implemented method, the optimization model embodies a non-linear model predictive control.

Additionally or alternatively, in some embodiments of the example computer-implemented method, the optimization model comprises at least a feedback mechanism configured to enable closed loop planning.

Additionally or alternatively, in some embodiments of the example computer-implemented method, initiating performance of one or more prediction-based actions comprises outputting at least a portion of the optimized plan to a user interface.

Additionally or alternatively, in some embodiments of the example computer-implemented method, initiating performance of one or more prediction-based action comprises causing automatic reconfiguration of operation of at least one physical component of the industrial plant based at least in part on at least a portion of the optimized plan.

In accordance with another aspect of the disclosure, an apparatus for generating optimized plan with respect to a target is provided. In one example embodiment, the apparatus includes at least one processor and at least one memory that includes computer-coded instructions stored thereon that, in execution with the at least one processor, causes the apparatus to perform any one of the example computer-implemented methods described herein. In another example embodiment, the apparatus includes means for performing each step of any one of the example computer-implemented methods described herein.

In accordance with another aspect of the disclosure, a computer program product for generating an optimized pan with respect to a target is provided. In one example embodiment, the computer program product includes at least one non-transitory computer-readable storage medium having computer program code stored thereon that, in execution with at least one processor, configures the computer program product for performing any one of the example computer-implemented methods described herein.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 5 illustrates an example configuration of an optimization pathway generator in accordance with an example embodiment of the present disclosure.

FIG. 6 illustrates example projected characteristics of an example optimization pathway in accordance with an example embodiment of the present disclosure.

FIG. 7 illustrates an example decarbonization task schedule of an example optimization pathway in accordance with an example embodiment of the present disclosure.

FIG. 8 illustrates example projected project costs of an example optimization pathway in accordance with an example embodiment of the present disclosure.

FIG. 9 illustrates example operational costs of an example optimization pathway in accordance with an example embodiment of the present disclosure.

DETAILED DESCRIPTION

Figure 1:
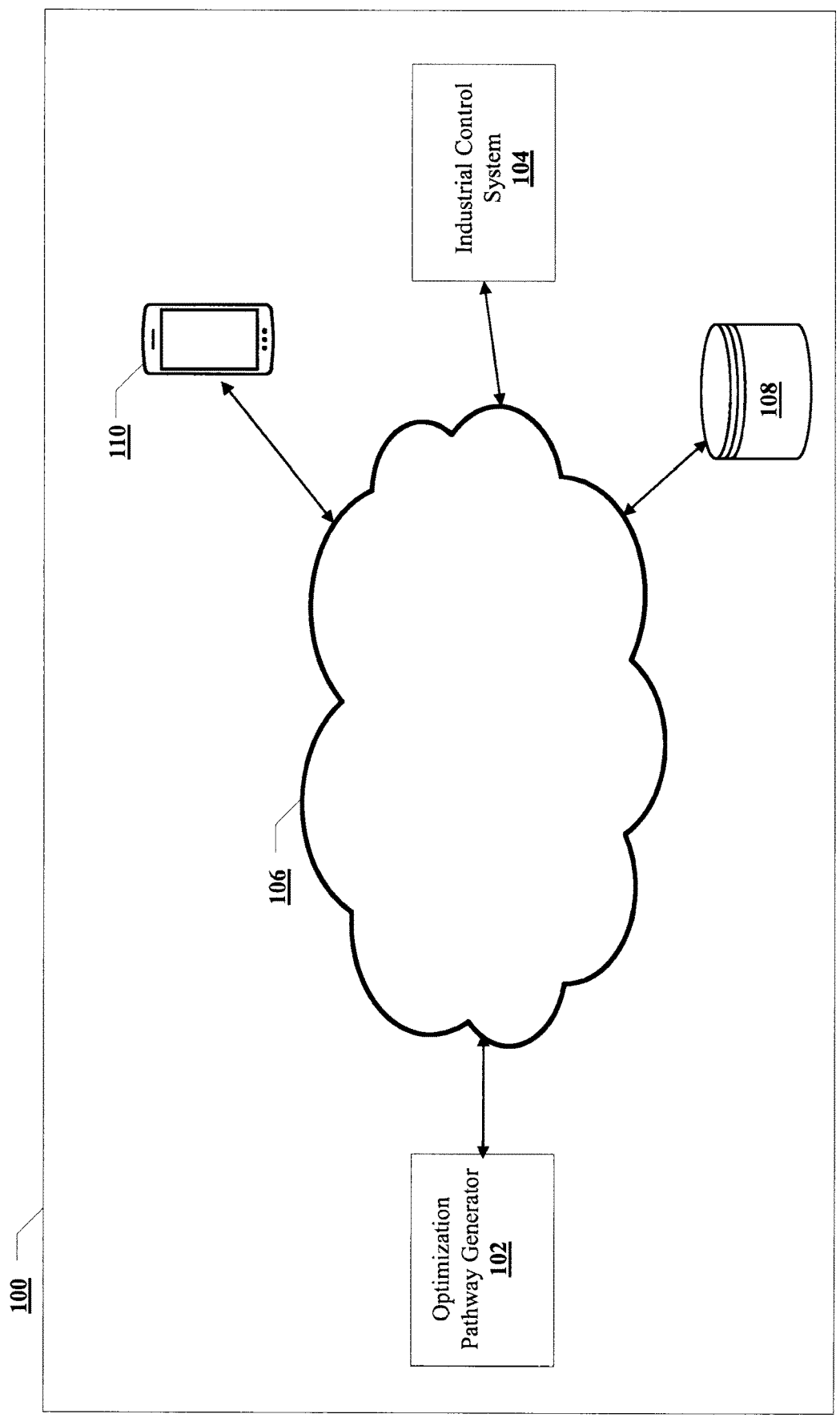
FIG. 1 illustrates an example block diagram of a system that may be specially configured within which embodiments of the present disclosure may operate.

Example embodiments will be described more fully hereinafter with reference to the accompanying drawings, in which some, but not all embodiments of the disclosure of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Various example embodiments address technical problems associated with determining an optimal decarbonization pathway based on a variety of configuration inputs. As understood by those of skill in the field to which the present disclosure pertains, there are numerous example scenarios in which an organization may desire to determine an optimal path toward decarbonization.

For example, several private and public organizations around the world have set ambitious goals toward reducing carbon emissions. Unfortunately, many of the steps these organizations are taking are too small and will not result in the desired outcomes. Decision makers at these organizations often rely on data and models to understand the potential impact and risks of complex decarbonization tasks. Due to the complex nature of these decarbonization tasks and the ever-changing landscape related to decarbonization and the regulation of carbon emissions, these decision makers are unaware of the optimal decarbonization pathway for their ecosystem, resulting in a lack of effective action and inefficient capital deployment.

In some examples, data and generic planning tools are utilized to plan decarbonization tasks. However, data related to decarbonization is fragmented across multiple formats and obtained from a multitude of sources making it difficult to provide a holistic picture of integrated decarbonization options. As a result, often times, singular inputs are optimized and then compared to other singular inputs. In addition, the decarbonization technology landscape is vast and decarbonization activity varies significantly by geography, the resources available to an organization, and the legal and political climate. Further, decarbonization technology is rapidly changing, altering the effectiveness, cost, and other important considerations of an optimal path to a decarbonization goal.

Embodiments of the present disclosure provide for improvements to determining an optimized pathway toward decarbonization for an organization's assets, such as assets related to an industrial control system. For example, in some embodiments, an optimization pathway generator may utilize input data from various sources in multiple formats to determine an optimization pathway. Such input may be ingested into the optimization pathway generator from user interfaces on input devices, sensor devices monitoring assets, databases dynamically updated with real-time data, and other similar sources. Supporting a variety of input sources and formats may enable an optimization pathway generator to consider a multitude of variables in determining an optimal path toward a decarbonization goal. In addition, by modeling the various inputs, along with input constraints, the decarbonization pathway generation may optimize a decarbonization pathway across a plurality of variables, such as cost, overall emissions, time, etc. Further, utilizing real-time data specific to an asset's geography may enable the optimization pathway generator to consider constraints, resources, regulations, and other important considerations specific to an asset's geography. Additionally, accessing real-time data from online sources and databases may enable the optimization pathway generator to access pertinent data across several industries. Finally, in some embodiments, the optimization pathway generator may utilize feedback data, for example, from historical data of similar assets, from sensing devices, and from other dynamic sources, to continually update the optimization pathway.

As a result of the herein described example embodiments and in some examples, the accuracy and effectiveness of decarbonization pathways may be greatly improved. As a result, organizations may determine a decarbonization pathway that is best for their specific environment and puts their assets on a path toward carbon neutrality.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would." "preferably." "possibly." "typically," "optionally," "for example," "often," or "might" (or other such language) be included or have a characteristic, that particular component or feature is not required to be included or to have the characteristic. Such component or feature can be optionally included in some embodiments, or it can be excluded.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "system" refers to, or includes, a computer-related entity or an entity related to an operational apparatus with one or more specific functionalities, wherein the entity can be either hardware, a combination of hardware and software, software, or software in execution. As an example, a system may be, but is not limited to being, a process running on a processor, a processor, an object, an executable, a thread of execution, computer-executable instructions, a program, and/or a computer. By way of illustration and not limitation, both an application running on a server and the server can be a system.

As used herein, the term "asset" refers to a machine, a tank, a pipe, an electric device, equipment, or any other physical structure or object within or associated with a processing plant that is utilized in or in support of a process performed by the processing plant. In an example context of an oil refinery plant, non-limiting examples of an asset include a storage tank, a boiler, a furnace (e.g., a hot salt furnace or a high frequency furnace), a light bulb, a lighting system, an HVAC system, an electric motor, an electric battery, a spar dryer, a blender, a product tank, a catalyst, a reactor, a carbon capture system, a combustor, a pump, a computer, a server computer, a heat exchanger, a pressure vessel, a pipe or piping system, a connector, and a valve. A processing unit within a particular plant embodies a physical component representing a particular asset associated with the plant.

As used herein, the term "renewable energy source" means a source that will easily replenish over time and the term "non-renewable energy source" means a source that will not be easily replenished over time. For example, a renewable energy source can include renewable electricity sources, such as solar energy, hydropower energy, and wind energy, and renewable fuel sources, such as green hydrogen fuel and biofuels. A non-renewable energy source can include non-renewable electricity sources, such as coal power, and non-renewable fuel sources, such as petroleum or gray hydrogen fuel.

As used herein, the term "real-time" refers to a first action being performed instantaneously, or almost instantaneously but for minor signal processing and/or transmission delays, with a second action. For example, a first action that is performed within one second of a second action being performed is performed in real-time with the second action. As used herein, the term "near real time" refers to a first action being performed as delayed based at least in part on an intermediary delay interval and performed within a certain time frame of the second action being performed, but the first action and the second action are not performed instantaneously. For example, a first action that is performed within a day, such as within an hour, such as within a minute of a second action being performed is performed in near real-time with the second action.

The term "industrial plant," "plant," "processing plant," and/or similar terms used herein interchangeably may refer to a building, complex, or arrangement of components that perform a chemical, physical, electrical, mechanical process, and/or the like for converting input materials into one or more output products. Non-limiting examples of an industrial plant include a chemical industrial plant, automotive manufacturing plant, distillery, oil refinery, fabric manufacturing plant, and/or the like. In some embodiments, a plant includes any number of assets embodying physical components that enable performance of an industrial process.

The term "physical component" with respect to an industrial plant may refer to a real-world machine, system, or other physical structure within and/or associated with the industrial plant, and that is utilized by the industrial plant. For example, a physical component with respect to an industrial plant may comprise machine, system, or other structure that is utilized in a process performed by the industrial plant. In an example context of an oil refinery plant, non-limiting examples of a physical component may include a furnace, a pump, a heat exchanger, and/or the like.

The term "predicted optimized plan" may refer to a plan or schedule outputted by a predictive data analysis system incorporating one or more models. The predicted optimized plan may be associated with a particular industrial plant and may comprise plan data and/or schedules for a specified time horizon.

The term "optimized plan data" may refer to data corresponding to a predicted optimized plan for achieving a target (e.g., target measure), such as achieving net zero emission over a specified time horizon. Optimized plan data may include various types of data. For example, optimized plan data may include values corresponding to a property of a physical component, performance data, feasibility data, and/or the like. In some embodiments, a portion of "optimized plan data" embodies, represents, or corresponds to a particular transformation action and/or particular timestamp data associated with the particular transformation action.

The term "time horizon" may refer to electronically managed data representing a length of time, such as a length of time over which a predicted optimized plan is configured to achieve a desired target (e.g., net zero emission).

The term "optimization model" may refer to any statistical, algorithmic, mathematical, and/or machine learning data construct(s) configured to process the various configuration inputs, hard constraints, soft constraints, optimization parameters, uncertainty models, and/or other data, or any combination thereof, pertinent to the formulation of an optimization pathway and constructed in a format such that the optimization system may generate an optimization pathway optimized relative to one or more optimization parameters utilizing the data construct(s). In some embodiments, the optimization pathway includes or embodies a predicted optimized plan. The predicted optimized plan, or otherwise "the optimization pathway," in some embodiments includes any number of transformation action(s) and/or a schedule of transformation action(s).

The term "non-linear optimization model" may refer to an optimization model that is based at least in part on one or more non-linear functions.

The term "constraint type" may refer to electronically managed data representing a particular classification/category of a constraint associated with operation of an industrial plant with respect to a target goal. Examples of constraint types include hard constraint and soft constraint.

The term "uncertainty" with respect to a variable, feature, factor, and/or similar terms used herein interchangeably may refer to a data construct that describes attributes (e.g., data value, measure, and/or the like) of a variable, such as input variable to a model, that is not fixed, may change over a given time window, and/or is unknown.

The term "optimization pathway" refers to electronically managed data representing any schedule, timetable, docket, checklist, agenda, sequence, list, and/or other set of actions, decarbonization tasks, or other events directed to generate a reduction in effective carbon emissions and/or costs associated with operation of at least one asset. For example, in some embodiments an optimization pathway reduces an asset's carbon emissions value, for example, to meet a carbon emissions target value. An optimization pathway may be determined in view of at least configuration inputs, including both static configuration inputs and dynamic configuration inputs. In some embodiments, an optimization pathway includes or represents any number of transformation actions determined by an optimization model as described herein, and/or associated timestamps associated with such transformation actions representing a time or period of time indicated for performance of the transformation action. An optimization pathway may further comply with constraints, including both hard constraints and soft constraints. For example, in an instance in which hard and soft constraints are provided, an optimization pathway may not violate hard constraints, however, the provided optimization pathway may violate soft constraints as necessary to satisfy one or more hard constraint(s) and/or optimize data value(s) corresponding to one or more target parameter(s).

In addition, an optimization pathway may further comprise a schedule. A schedule indicates not only the actions (e.g., decarbonization tasks) that will be performed to reach a decarbonization target, but also when each of the proposed tasks can or must be performed. Scheduling may be an important aspect of operations research and optimization domains.

An optimization pathway may be optimized in accordance with one or more input optimization parameters in producing a path to a carbon emissions target value. For example, a user or device may specify total project cost as a primary (e.g., highest priority or weighted) optimization parameter. In such an example, an optimization pathway achieving a carbon emissions target value at a minimum cost may be generated. In some embodiments, a plurality of optimization parameters may be provided with a corresponding optimization weight. In such an instance, the highest priority optimization parameter as specified by the optimization weight may be optimized first or otherwise prioritized in generating an optimization pathway. The optimization pathway may then be further optimized based on the next highest priority optimization parameter, and so on. Depending on the optimization weights provided, in some embodiments, the optimization pathway may not be modified with respect to the highest priority optimization parameter when further optimizing according subsequent optimization parameters, or in some embodiments the model is configured such that sufficient improvements in the secondary or subsequent optimization parameters is required to offset decrease in the optimization of the higher priority optimization parameter(s). In some embodiments, the optimization pathway may be modified with respect to the highest priority optimization parameter as further optimization parameters are considered.

In some embodiments, the optimization pathway may be further updated based on feedback (e.g., observed values, historian data) embodied in data available to the model for subsequent processing. For example, in some embodiments, the optimization pathway is updated based at least in part on data from the optimization system, sensor data input, and other dynamic configuration inputs.

The optimization pathway may take any data format capable of communicating the selected decarbonization tasks. For example, in some embodiments, the optimization pathway may include one or more data object(s) embodying a list of decarbonization tasks. In some embodiments, the optimization pathway may include one or more data object(s) embodying a schedule, sequence, or calendar of decarbonization tasks. In some embodiments, the optimization pathway may include or be embodied by a file, program, script, executable, or other electronically-maintained data, such that the decarbonization tasks may generate automatic reminders or may be automatically added to or utilized to generate a configured a calendar, sheet, or other time-based list. In some embodiments, automatically executed tasks may be initiated based at least in part on the optimization pathway, for example by automatically one or more decarbonization task(s) thereof, such as monitoring and reporting on assets, adjusting asset settings, and other similar decarbonization tasks.

In some embodiments, the optimization pathway includes or indicates additional characteristics related to the optimization pathway. Such additional characteristics may include information related to the timing or schedule of the optimization pathway or subcomponents thereof, for example, start time and end time of each decarbonization task; start time and end time of the overall optimization pathway; optimization pathway duration; decarbonization task duration; sequence of decarbonization tasks; and so on. Additionally or alternatively, such additional characteristics may include information related to the cost of the optimization pathway, for example, total and periodic (e.g., month-by-month cost, year-by-year cost, etc.) project cost; total and periodic operational costs; marginal abatement cost (MAC) per decarbonization task; overall MAC, cost per decarbonization task; and other similar cost characteristics. Additional characteristics may also include characteristics related to carbon emissions, for example, total and periodic carbon emissions values; emissions reduction per decarbonization task; emissions reduction per time period; model carbon emissions output value; and other characteristics related to emissions. Additional characteristics may also include benchmarks, for example, periodic carbon emissions target values.

The term "decarbonization task" may refer to any task determined to, upon execution, effectuate a likely reduction in the carbon emissions value associated with operation of one or more asset(s). For example, a decarbonization task represents performing a modification of an existing asset. In some embodiments, modifying an existing asset may include replacing components of an asset (e.g., valves) with components that help to reduce the carbon emissions value of the asset. Modifying an existing asset may further include modifying equipment (e.g., boilers, furnaces, dryers, etc.) to burn a different fuel that releases fewer carbon emissions. In some embodiments, modifying an existing asset may include updating controls and strategy of an asset such that the carbon emissions value is reduced, for example adjusting meters, sensors, and valves to improve the operation of the asset. In some embodiments, modifying an existing asset may include updating the infrastructure in and around the asset, such as upgrading the electrical infrastructure of an asset or group of assets. A "decarbonization task" refers specifically to a likely reduction in carbon emissions value. As such, a decarbonization task is a specific example of an "emissions reduction task," which refers to any transformation action that is determined to, upon execution, effectuate a likely reduction in an emissions value for a particular plant or processing unit(s) thereof for a particular GHG or combination resulting in emissions generally.

In addition, a decarbonization task may include installing an additional asset. Installing additional assets may include changes to the surrounding environment, such as planting trees, managing the soil, or other carbon offset activities in the surrounding environment. Installing additional assets may further include installing equipment to make operations with the asset more efficient, for example, installing heat recovery equipment. Installing additional assets may further include equipment to capture carbon emissions from and around the asset.

Further, a decarbonization asset may include replacing an existing asset. Assets may be replaced with assets that use a different fuel source, or assets that produce fewer carbon emissions during operation. In some embodiments, replacing an existing asset includes replacing an asset of a particular asset type, model, and/or the like, with a newer asset of the same asset type, a newer model of the same asset type, and/or the like.

Decarbonization tasks may further include tasks in preparation for or management of modifying, replacing, and/or adding an asset. For example, a decarbonization task may include performing tasks and obtaining equipment designed to detect, report, and repair leaks, or other anomalies in operations of one or more asset(s).

The term "target asset" may refer to the asset or set of assets that is affected by or otherwise associated with a decarbonization task in an optimization pathway.

The term "monitored asset" may refer to the asset or set of assets for which sensor data input may provide data related to at least one physical characteristic of the asset. In some embodiments, a sensing device may be placed on or near a monitored asset.

The term "carbon emissions value" may refer to any numeric quantity, index, or other indicator quantifying the amount of greenhouse gases, such as carbon dioxide gas or methane, emitted by a particular asset or group of assets, and/or the cost of a particular amount of greenhouse gases. Various activities may emit greenhouse gases, including but not limited to burning fossil fuels such as coal, oil, and natural gas; fertilization; livestock; and other activities. In some embodiments, the carbon emissions value may be measured in metric tons of carbon dioxide equivalent per year (MTCO2e/year). For example, a processing plant may produce 715,000 MTCO2/year.

The term "carbon emissions target value" may refer to any numeric quantity, index, or other indicator quantifying an amount of greenhouse gasses emitted by an asset or group of assets (e.g., an industrial control system) that is to be reached by a particular time. For example, a processing plant may set a carbon emissions target value of 357,000 MTCO2/year. In some embodiments, carbon emissions target values may be associated with a carbon emissions target value and corresponding time target. For example, a processing plant may set a carbon emissions target value to have a carbon emissions value below 357,000 MTCO2/year within 5 years. Carbon emissions target values may further include one or more intermediary benchmarks. A benchmark may be any preliminary goal indicating progress toward the end carbon emissions target value. For example, a processing plant may set a carbon emissions target value of 0 MTCO2/year in ten years, with a benchmark of 357,000 MTCO2/year within 5 years.

In some embodiments, the carbon emissions target value may be set by an organization or decision making body associated with the asset. In some embodiments, the carbon emissions target value may be mandated by a public sector organization and/or government entity, for example a regulator and/or environmental governance body. In such cases, a fine or penalty may be issued for not meeting the carbon emissions target value or associated benchmark.

The term "model carbon emissions output value" may refer to any numeric quantity, index, or other indicator quantifying the amount of greenhouse gases, such as carbon dioxide gas or methane, projected to be emitted by a particular asset or group of assets conforming to an optimization pathway. In some embodiments, the optimization pathway may include overall and/or periodic projected carbon emissions values associated with the asset or plurality of assets, if the suggested decarbonization tasks are performed. For example, the optimization pathway may indicate that after the first decarbonization task is complete, the carbon emissions value for an asset currently producing 715,000 MTCO2/year will produce 357,500 MTCO2/year. In some embodiments, the carbon emissions value may be calculated after a decarbonization task is complete and the carbon emissions value may be compared to the model carbon emissions output value. The optimization model may be updated based on the comparison.

The term "configuration input" may refer to any data, measurement, reading, sensor output, user preference, prediction, or other data/information, which is utilized in generating, updating, and optimizing the optimization model. Configuration inputs may include but are not limited to static configuration inputs, dynamic configuration inputs, and sensor data inputs. Configuration inputs may be input by a user through a user interface, automatically uploaded from a configuration file, read from a database or web interface, received from a connected sensing device, or collected, measured, or received via other electronic means.

The term "static configuration input" may refer to any data, value, or set of values indicating a condition or characteristic of the optimization pathway generator, the assets, and/or the surrounding environment that are unable or unlikely to change. For example, static configuration inputs may include but are not limited to electronically managed data representing asset(s) of an industrial plant; geographic location of an asset or group of assets; decarbonization tasks; cost of decarbonization tasks; time of decarbonization tasks; starting carbon emissions value; available resources; overall budget; periodic budget; and other similar tasks that are unlikely to change.

Static configuration inputs may be input by a user, for example through a user interface, by creating and uploading a configuration file, by reading a database or web-interface, or other similar means. The static configuration inputs may be entered before start-up of the processor, at start-up, or after the optimization pathway generator is operating.

In some instances, the static configuration inputs may be updated. Static configuration inputs may be updated via a user interface, configuration file, and/or from observed values providing feedback from the sensors and other monitoring devices.

The term "dynamic configuration input" may refer to any data, value, or set of values indicating a condition or characteristic of the optimization pathway generator, the assets, and/or the surrounding environment that may change during the execution of the optimization pathway. For example, dynamic configuration inputs may include cost of fuel (e.g., natural gas, hydrogen gas, crude oil, etc.) and other consumable materials; cost of operations (e.g., salary, electricity, maintenance); budgets; regulatory requirements (e.g., maximum carbon emissions value, carbon emissions target value, etc.); available resources (e.g., laborers, availability of materials, etc.); implementation timelines (e.g., time for project completion); and other dynamic data.

In some embodiments, the dynamic data may be received directly from a connected device such as mobile communication device or other computing device, through a communication network. In some embodiments, the optimization pathway generator may monitor values in a database and update the optimization model based on updated values. In some embodiments, the optimization pathway generator may periodically access a web-interface or other connected device and update the optimization model based on the transmitted data. In some embodiments, connected computing devices may be configured to transmit updates related to dynamic configuration inputs to the optimization pathway generator. In some embodiments, dynamic configuration inputs may represent real-time data values pertinent to the optimization model and subsequent optimization pathway.

The term "sensor data input" may refer to any data, value or set of values transmitted from a sensor, indicating a physical condition of a monitored asset or other environment variable. For example, sensor data input may include but is not limited to current carbon emissions values; operating parameters of the assets (e.g., temperature, pressure, flow rate); detected leaks; detected gases; power readings. In some embodiments, sensing devices may be distributed in, on, and/or around assets to monitor the physical condition of the asset and the surrounding environment. Measurements obtained by the sensing devices may indicate the efficiency, state, and/or emissions of a particular asset or set of assets. Further, measurements obtained by sensing devices may enable the optimization pathway generator to compare assets to other similar assets both in the industrial control system and outside the industrial control system. Such comparisons may enable the optimization pathway generator to identify poor performing assets and adjust performance of the asset or provide notification of the poor performance.

Sensing devices may include optical sensors (e.g., imaging sensors, infrared sensors), gas sensors, sound sensors, pressure sensors, voltage sensors, current sensors, and other similar sensors. Data transmitted to the optimization pathway generator may have an effect on the optimization model. For example, in some embodiments, a voltage sensor may indicate a low-voltage in a particular component of an asset. The low-voltage reading may be an indicator that a device is running inefficiently and producing more greenhouse gases than originally projected. Sensing devices may also be utilized to execute particular decarbonization tasks. For example, sensing devices may be installed and monitored to detect leaks causing additional carbon emissions. Further, sensing devices and sensor data input may be utilized for feedback in an effort to update the optimization model. For example, an optical sensor may measure the carbon emissions value of an asset after a decarbonization task has been performed. In an instance in which the carbon emissions value is greater that the projected model carbon emissions output value, the optimization model may need to be adjusted and the optimization pathway re-generated.

The term "uncertainty model" may be any data structure, construct, value, equation, graph, chart, distribution, diagram, or other data representing the accuracy of an associated configuration input (e.g., uncertain input). Numerous calculations and projections associated with the optimization pathway are made based on projected values of variables, for example, the projected price of electricity, the projected price of natural gas, the projected interest rate, and so on. In some examples, an uncertainty model may accompany a particular configuration input or set of configuration inputs to represent the probability that a configuration input is a particular value. For example, in some embodiments, the uncertainty model may be a probability distribution modeling the likelihood that a particular configuration input corresponds to a particular value across a range of values. In an instance in which the configuration input is fairly certain, the uncertainty model may be a narrow frequency distribution graph around the predicted value. In an instance in which the configuration input is more uncertain, the uncertainty model may reflect a wider frequency distribution graph around the predicted value. The uncertainty model may be utilized in the optimization model to quantify risk, and or adjust an optimization pathway. A static or rarely-changed input may be represented corresponding to no uncertainty. In some embodiments, the uncertainty model is generated, or uncertainty of particular input(s) is/are handled, as depicted and described herein with respect to FIGS. 27-32.

The term "optimization parameter" may be any element, feature, factor, or other variable aspect of an asset, plurality of assets, or the surrounding operational environment, that may be input in the optimization model and optimized by an optimization system. In some embodiments, an optimization parameter, or a plurality of optimization parameters may be indicated to the optimization system. The optimization parameter may include, but is not limited to one of total cost, periodic cost (e.g., cost per year for a specified year or years), risk, total carbon emissions, MAC, and other similar values. The optimization model may be generated such that the optimization system generates an optimization pathway having a minimum value for the chosen optimization parameter, subject to constraints. In some embodiments, more than one optimization parameter may be selected. In such an embodiment, an optimization weight may be utilized to determine the extent of optimization of each optimization parameter.

The term "variable input" may refer to any element, feature, factor, or other aspect of an asset, plurality of assets, or optimization pathway that may be changed or adapted. For example, budget, cost, risk, schedule, carbon emissions, and other similar values. In some embodiments, an optimization parameter may be associated with a variable input, meaning the selected variable input may be adjusted and adapted to an optimal value in the optimization model by the optimization system.

The term "optimization weight" refers to electronically managed data representing any numeric quantity, index, or other indicator quantifying an objective or relative importance of each optimization parameter in an instance in which a plurality of optimization parameters are indicated. In some embodiments, the optimization weight may indicate an order for the provided optimization parameters. For example, an optimization weight of "1" accompanying an optimization parameter may indicate the highest priority optimization parameter, and a "2" indicates the next highest priority optimization parameter and so on. As a specific example, cost may be assigned an optimization weight of "1," and risk may be assigned an optimization weight of "2." In such an embodiment, the optimization model may be optimized by the optimization system once with the highest priority optimization parameter. The optimization model may then lock the first optimization parameter in the optimization model and run the optimization model through the optimization system again optimizing for the next highest priority optimization parameter. Additionally or alternatively, in some embodiments, multiple optimization parameters are optimized simultaneously based at least in part on their optimization weights, for example such that improvements to a lower weighted optimization parameter require greater amounts of optimization to outweigh lesser improvements to higher weighted optimization parameters.

In some embodiments, an optimization weight may indicate a proportional weight to be given to the optimization parameter. For example, cost may be given with an optimization weight of 0.6 and risk may be accompanied by an optimization parameter of 0.4. The optimization model may account for the relative weight of each optimization parameter and generate an optimization pathway according to the relative weights of each of the optimization pathways.

In some embodiments, the optimization model is embodied by or includes a mathematical model, such as a system of equations may be generated based on the selected optimization parameters, the configuration input data, the hard constraints, and the soft constraints. For example, in an instance in which the cost was indicated as the selected optimization parameter, the optimization model may comprise a set of equations similar to Equations (1)-(15) below:
minimize:

$$C = \sum_{j \in T} v_j c_j^{offset} + \sum_{i \in P} \sum_{j \in T} s_i * c_{ij}^{capital} + b_{ij} c_{ij}^{operating}, \quad (1)$$

subject to:

$$f_j^{\Delta e} = \Delta e_j - \sum_{i \in P} b_{ij} r_j = 0, \; j \in T \quad (2)$$

$$f_j^e = e_j - e_0 + \Delta e_j = 0, \; j \in T \quad (3)$$

$$f_j^{e^v} = e_j^v - e_j + v_j = 0, \; j \in T \quad (4)$$

$$f_{ij}^{capital} = c_{ij}^{capital} - \sum_{i \in P} \sum_{k=1}^{j} \frac{c_{i0}^{capital}}{(1+r)^k} \quad (5)$$

$$f_{ij}^{operating} = c_{ij}^{operating} - \sum_{i \in P} \sum_{k=1}^{j} \frac{c_{i0}^{operating}}{(1+r)^k} \quad (6)$$

$$f_i^s = s_i - b_{iT} + b_{i0} = 0, \; i \in P \quad (7)$$

$$f_i^a = a_i - \sum_{j \in T} b_{ij} = 0, \; i \in P \quad (8)$$

$$f_i^q = q_i = n_T + 1 - d_i = 0, \; i \in P \quad (9)$$

$$f_i^p = p_i - s_i q_i + a_i = 0, \; i \in P \quad (10)$$

$$f_i^p = p_i - s_i q_i + a_i = 0, \; i \in P \quad (11)$$

$$p_i^{min} \leq p_i \leq p_i^{max}, \; i \in P \quad (12)$$

$$0 \leq e_j^v \leq e_j^{max}, \; j \in P \quad (13)$$

$$\sum_{i \in A_k} b_{ij} \leq 1, \; j \in T \quad (14)$$

$$\sum_{i \in B_q} s_i \leq S_{B_q}^{max} \quad (15)$$

where:
 $e_j$=total enterprise emissions in time period j
 $\Delta e_j$=total enterprise emission reduction in time period j
 $r_i$=emissions reduction benefits from project i
 $v_j$=virtual emissions violations in time period j
 $c_{ij}^{capital}$=capital cost for project i in time interval j
 $c_{ij}^{operating}$=operating cost for project i in time interval j
 $b_{ij}$=binary decision variable for benefits from project i in year j
 $a_i$=sum of time periods in which project i benefits are active over the time horizon
 $d_i$=duration of project i before benefits begin
 $q_i$=maximum time period in which project i can start
 $s_i$=project selection decision (0=No, 1=Yes)
 $p_i$=time period in which project i begins
 $p_i^{min}$=minimum time period in which project i can begin
 $p_i^{max}$=maximum time period in which project i can begin
 T=set of indices of time periods in the prediction horizon
 P=set of indices of projects in current problem
 K=set of indices of asset groups
 Q=set of indices of project durations
 $A_k$=set of indices of projects in asset group k
 $B_q$=set of indices of projects of duration q As depicted in Equation (1), the total cost of a particular optimization pathway may be modeled as the sum of the offset costs for each time period of the optimization pathway, plus the sum of all the capital costs for each selected project in each time period of the optimization pathway, plus the operating costs for operating a particular decarbonization task in any time period in which that decarbonization task begins operation. As further depicted in Equations (2)-(15) constraints may be provided, for example embodying particular constraints on desired optimization parameters, as depicted described with respect to any of the constraints herein.

Similar models may be generated to such that the model may be optimized according to total emissions, risk, emissions violations, MAC and other similar values.

In some embodiments, an optimization model may comprise a machine learning model defining parameters, hyper-parameters, and/or operations embedding the configuration input data, sensor data input, uncertainty models, constraint inputs, and optimization parameters. In such an embodiment, the optimization model may utilize a machine learning technique instantiated on an optimization system to produce an optimized pathway.

The term "optimization system" may refer to any circuitry, processing device, and/or integrated circuit comprising hardware, firmware, software, and/or any combination thereof configured to perform optimization based at least in part on an optimization model. In some embodiments, one or more of the configuration inputs may be constrained to be integers (e.g., the number of laborers). In such an embodiment, the optimization system may employ a mixed-integer linear programming (MILP) or similar algorithm to determine an optimized optimization pathway.

It may be appreciated that an optimization pathway may be generated based on the optimization model using a variety of different optimization algorithms, each providing a solution with different accuracies and with different efficiencies. For example, an optimization pathway may be generated using a differential programming algorithm, a gradient descent algorithm, other linear programming algorithms, a brute-force optimization algorithm, a first-fit optimization algorithm, a strongest-fit optimization algorithm, a Tabu-search optimization algorithm, a simulated-annealing optimization algorithm, a late-acceptance optimization algorithm, a hill-climbing optimization algorithm, a strategic oscillation optimization algorithm, and/or the like. In addition, various optimization algorithms may describe algorithms, heuristics, methods, and/or the like for solving an input problem, or determining an exact solution for a problem.

Similarly, the optimization system may utilize a number of machine learning techniques to optimize the optimization model, for example, reinforcement learning (RL) algorithms, Model Predictive Control, Genetic Algorithms, Particle Swarm Optimization, Simulated Annealing, grid search, and/or a variety of other techniques and methodologies to supervised or unsupervised learning, to reach a desired optimization pathway.

The term "hard constraint" may refer to any element, feature, factor, or other variable aspect of an asset, plurality of assets, or the surrounding operational environment, that may not be violated when input into the optimization model and optimized by the optimization system. Any optimization system variable may be designated as hard, for example, the overall cost, or the target timing. In some embodiments, a hard constraint may be indicated by a maximum value, a minimum value, or a range or set of possible values.

The term "soft constraint" may refer to any element, feature, factor, or other variable aspect of an asset, plurality of assets, or the surrounding operational environment, which the optimization system may violate the constraint bounds when determining an optimization pathway. Any optimization system variable may be designated as soft, for example, the overall cost, or the target timing. In some embodiments, a soft constraint may indicate a minimum value, a maximum value, or a range or set of possible values. In such an embodiment, the optimization system may explore and present optimization pathways that are outside the bounds of the soft constraint, for example where necessary to optimize based at least in part on a hard constraint.

The term "observed value" may refer to electronically managed data embodying any data, value, or set of values related to an asset, set of assets, and/or the surrounding environment that may be measured and/or monitored. Various sensing devices may be placed on, in, and/or around the various assets and the surrounding environment to measure physical characteristics of the assets and the surrounding environment. In some embodiments, measurements obtained by the various sensing devices may be compared to the projected characteristics of the optimized optimization pathway. In an instance in which the observed values diverge from the projected characteristics, the model may be updated, such that the model converges toward the observed values. For example, in an instance in which the optimization pathway predicted the total emissions of an asset would be less than 357,000 MTCO2/year within 5 years and the observed total emissions of the asset is actually 400,000 MTCO2/year at 5 years, the optimization model may be adjusted and the optimized optimization pathway updated to coincide with the observed data.

The term "operating environment" may refer to electronically managed data representing any physical characteristic related to an asset and/or a plurality of assets. In some embodiments, the operating environment may refer to the resources available in and around the asset, such as power capabilities, fuel sources, maximum flow of fuel, types and sizes of infrastructure equipment and other parameters related to the operation of a particular asset.

The term "real-time" refers to a first action being performed instantaneously, or almost instantaneously, with respect to a second action. For example, a first action that is performed within one second of a second action being performed is performed in real-time with the second action. As used herein, the term "near real time" refers to a first action being performed within a certain time frame of the second action being performed, but the first action and the second action are not performed instantaneously. For example, a first action that is performed within a day, such as within an hour, such as within a minute of a second action being performed is performed in near real-time with the second action.

Example Systems and Apparatuses of the Disclosure

Referring now to FIG. 1, FIG. 1 illustrates a block diagram of a system that may be specially configured within which embodiments of the present disclosure may operate. Specifically, FIG. 1 depicts an example system 100. As illustrated, the system 100 includes an optimization pathway generator 102, in communication with an industrial control system 104, a dynamic data source 108, and a computing device 110. In some embodiments, the dynamic data source 108 is embodied by or as a sub-system of the optimization pathway generator 102. In some embodiments, the industrial control system 104 communicates with the optimization pathway generator 102, the computing device 110, and/or the dynamic data source 108 over one or more communication network(s), for example a communications network 106.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

Each of the components of the system 100 communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Arca Network (MAN), Wide Area Network (WAN), and/or the like. Additionally, while FIG. 1 illustrate certain system entities as separate, standalone entities communicating over the communications network 106, the various embodiments are not limited to this architecture. In other embodiments, one or more computing entities share one or more components, hardware, and/or the like, or otherwise are embodied by a single computing device such that connection(s) between the computing entities are over the communications network 106 are altered and/or rendered unnecessary. For example, in some embodiments, the computing device 110 includes some or all of the optimization pathway generator 102, such that a connection over an external communications network 106 is not required.

The industrial control system 104 includes any number of computing device(s), system(s), asset(s), sensing device(s), and/or the like, that facilitate the monitoring and production of any number of products, for example utilizing particular configurations that cause processing of particular ingredients available within the industrial control system 104. In some embodiments, the industrial control system 104 includes one or more asset(s), connection(s) between physical asset(s), sensing device(s), and/or computing system(s) that monitor and control operation of each asset therein. For example, in some embodiments, the industrial control system 104 includes or embodies a processing plant including any number of processing unit(s) that perform, alone or in conjunction with one another, one or more industrial processing task(s) by manipulating input ingredient(s) and producing a particular final product for output. In one example context, the industrial control system 104 embodies an oil refinery, which includes asset(s) embodying rundown blender(s), batch blender(s), product tank(s), boilers, catalytic combustor(s), carbon capture system(s), or other asset(s) that perform particular process(es), or support those process(es), to alter properties of inputs to the asset, crude flow unit(s), piping between such physical asset(s), valve(s) controlling flow between the physical asset(s), and/or the like. Additionally or alternatively, in some embodiments the industrial control system 104 includes one or more computing system(s) that are specially configured to operate the asset(s) in a manner that produces one or more particular product(s) simultaneously. In some embodiments, an industrial control system 104 includes one or more computing device(s) and/or system(s) embodied in hardware, software, firmware, and/or a combination thereof, that configure and/or otherwise control operation of one or more physical asset(s) of the processing plant. For example, in some embodiments, such computing device(s) and/or system(s) include one or more programmable logic controller(s), MPC(s), application server(s), centralized control system(s), and/or the like, that control(s) configuration and/or operation of at least one physical asset. It will be appreciated that different industrial control system(s) 104 may include or otherwise be associated with different asset(s), computing system(s), and/or the like. For example, different industrial plants may include different assets, different number of assets, different types of assets, and/or the like, that cause the industrial control system 104 to operate differently from industrial control systems 104 at other industrial plants.

The optimization pathway generator 102 includes one or more computing device(s) and/or system(s) embodied in hardware, software, firmware, and/or a combination thereof, that receive various inputs, such as from sensing device(s) in communication with the industrial control system 104, computing devices 110, and/or dynamic data sources 108, and generate an optimization model based on the various inputs. Additionally or alternatively, in some embodiments, the optimization pathway generator 102 may utilize an optimization system to generate an optimization pathway. Additionally or alternatively, in some embodiments, the optimization pathway generator 102 receive feedback in the form of observed values from the industrial control system 104, computing devices 110, and/or dynamic data sources 108 and update the optimization pathway based on the observed values. In some embodiments, the optimization pathway generator 102 includes one or more client device(s), user device(s), and/or the like, that enable access to the functionality provided via the optimization pathway generator 102, for example via a web application, a native application, and/or the like executed on the client device. Additionally or alternatively, in some embodiments, a client device is embodied by an external device, for example at least one of the computing devices 110 as described herein.

The one or more dynamic data sources 108 may be configured to receive, store, and/or transmit data. In various embodiments, the one or more dynamic data sources 108 may be associated with dynamic configuration data, for example real-time costs, budgets, and regulations. The dynamic configuration data stored by the one or more dynamic data sources 108 may include historical dynamic configuration data as well as current and/or real-time dynamic configuration data. Additionally or alternatively, in some embodiments the one or more dynamic data sources 108 store user input data associated with operations and/or data related to one or more industrial control system(s) 104. In some embodiments, the one or more dynamic data sources 108 store data associated with multiple industrial control system(s) 104, for example multiple industrial control system(s) 104 associated with the same enterprise entity but located in different geographic locations across the world. Additionally or alternatively, in some embodiments, the optimization pathway generator 102 includes or otherwise communicates with at least one data source, or data storage (e.g., a local or remotely accessible data repository), that includes current or otherwise static data for processing associated with the industrial control system 104, a processing plant associated therewith, and/or the like.

The one or more computing devices 110 may be associated with users of the optimization pathway generator 102. In various embodiments, a computing device 110 may be utilized by a user to remotely access an optimization pathway generator 102. This may be by, for example, an application operating on the computing device 110. A user may access the optimization pathway generator 102 remotely via a user interface, including one or more visualizations, dashboards, reports, and/or real-time displays. In some embodiments, a user may use a computing device 110 to enter static configuration inputs, specify optimization parameters and associated optimization weights, load static configuration files, specify hard and soft constraints, and specify other data necessary to the operation of the optimization pathway generator 102.

In some embodiments, the optimization pathway generator 102, the computing device 110, and/or the industrial control system 104 communicate with one another to perform the various actions described herein. For example, in some embodiments, the optimization pathway generator 102, the computing device 110, and the industrial control system 104 communicate to generate and display an optimization pathway based on various static configuration inputs, dynamic configuration inputs, and sensor input data.

Figure 2:
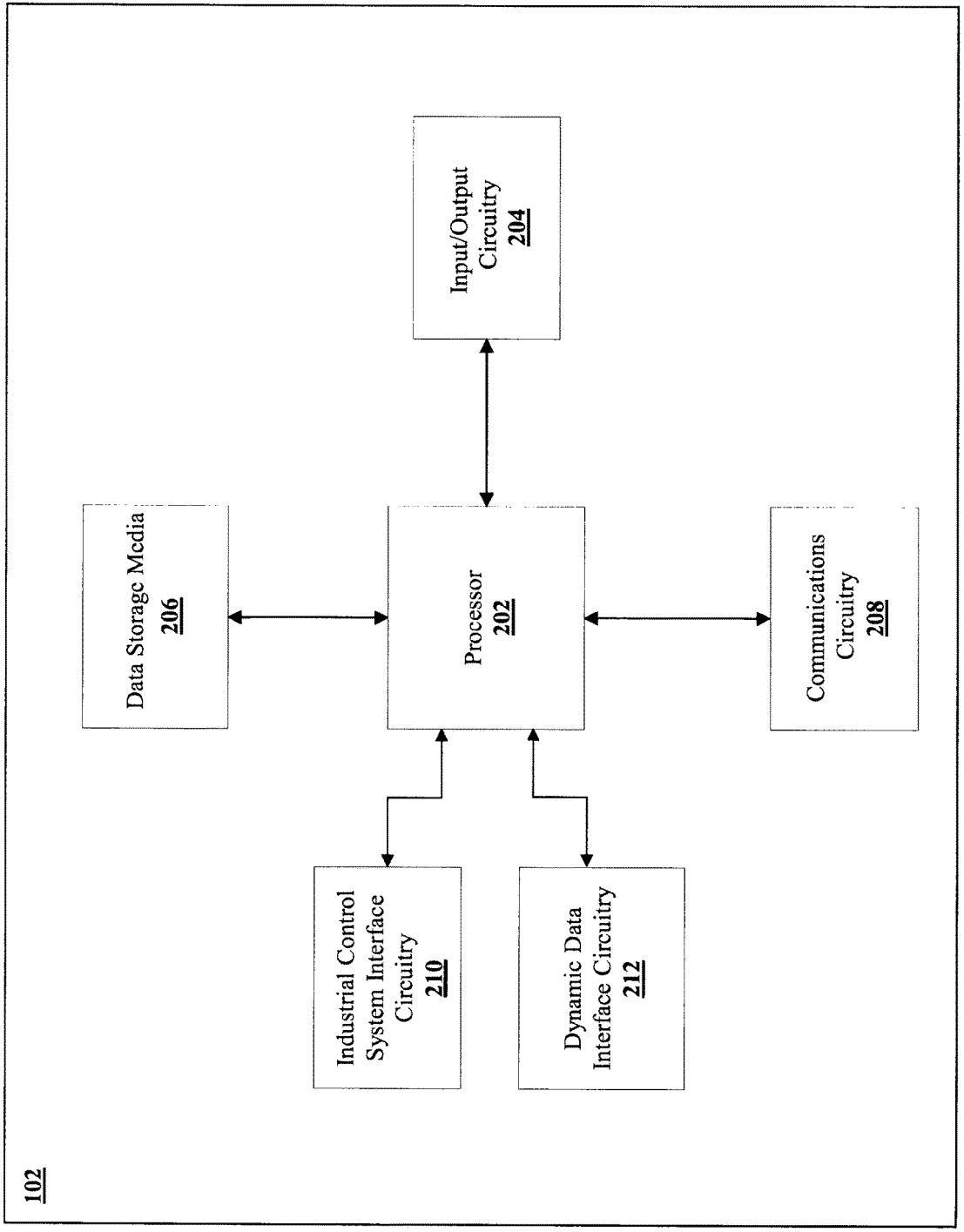
FIG. 2 illustrates an example block diagram of an example apparatus that may be specially configured in accordance with an example embodiment of the present disclosure.

Referring now to FIG. 2, FIG. 2 illustrates an example optimization pathway generator apparatus 200 ("apparatus"), for example embodying an example implementation of the optimization pathway generator 102, in accordance with at least some example embodiments of the present disclosure. The apparatus 200 includes processor 202, input/output circuitry 204, data storage media 206, communications circuitry 208, industrial control system interface circuitry 210, and dynamic data interface circuitry 212. In some embodiments, the apparatus 200 is configured, using one or more of the sets of circuitry 202, 204, 206, 208, 210, and/or 212, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of other particular sets of circuitry. For example, the processor 202 in some embodiments provides processing functionality to any of the sets of circuitry, the data storage media 206 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the data storage media 206 via a bus for passing information among components of the apparatus 200. In some embodiments, for example, the data storage media 206 is non-transitory and may include, for example, one or more volatile and/or non-volatile memories. In other words, for example, the data storage media 206 in some embodiments includes or embodies an electronic storage device (e.g., a computer readable storage medium). In some embodiments, the data storage media 206 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the data storage media 206 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with receiving a carbon emissions value representing a net carbon emission for the plurality of assets. In some embodiments, the processor 202 includes hardware, software, firmware, and/or a combination thereof, that receive a plurality of configuration inputs.

In some embodiments, the processor 202 includes hardware, software, firmware, and/or a combination thereof, that receiving sensor data inputs, wherein the sensor data inputs represent a physical characteristic of an asset of the plurality of assets.

In some embodiments, the processor 202 includes hardware, software, firmware, and/or a combination thereof, that receiving an input uncertainty model associated with an uncertain input of the plurality of configuration inputs, wherein the uncertainty model represents a predicted accuracy of the uncertain input. In some embodiments, the processor 202 includes hardware, software, firmware, and/or a combination thereof, that receives a plurality of decarbonization tasks associated with the plurality of assets. In some embodiments, the processor 202 includes hardware, software, firmware, and/or a combination thereof, that receive a plurality of selected optimization parameters. In some embodiments, the processor 202 includes hardware, software, firmware, and/or a combination thereof, that generating an optimization model, wherein the optimization model comprises a plurality of variables associated with the selected optimization parameters, and wherein the optimization model further comprises the plurality of inputs, the input uncertainty model, a hard constraint, and a soft constraint. In some embodiments, the processor 202 includes hardware, software, firmware, and/or a combination thereof, that generate an optimization pathway based at least in part on the optimization model, wherein the optimization pathway is optimized according to the plurality of selected optimization parameters, wherein the optimization pathway includes at least one scheduled decarbonization task associated with one or more assets of the plurality of assets, and wherein the optimization pathway conforms to all of the one or more hard constraints. In some embodiments, the processor 202 includes hardware, software, firmware, and/or a combination thereof, that update the optimization pathway based at least in part on observed values, wherein the observed values comprise measured values captured by one or more sensing devices positioned to capture a physical characteristic of the asset of the plurality of assets.

In some embodiments, the apparatus 200 includes input/output circuitry 204 that provides output to the user and, in some embodiments, to receive an indication of a user input. In some embodiments, the input/output circuitry 204 is in communication with the processor 202 to provide such functionality. The input/output circuitry 204 may comprise one or more user interface(s) (e.g., user interface) and in some embodiments includes a display that comprises the interface(s) rendered as a web user interface, an application user interface, a user device, a backend system, or the like. The processor 202 and/or input/output circuitry 204 comprising the processor may be configured to control one or more functions of one or more user interface elements through computer program instructions (e.g., software and/or firmware) stored on a memory accessible to the processor (e.g., data storage media 206, and/or the like). In some embodiments, the input/output circuitry 204 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the apparatus 200.

The industrial control system interface circuitry 210 includes hardware, software, firmware, and/or a combination thereof, that supports various functionality associated with interfacing with the industrial control system 104 and the assets and/or plurality of assets associated with the industrial control system. For example, in some embodiments, the industrial control system interface circuitry 210 includes hardware, software, firmware, and/or a combination thereof to communicate with the industrial control system 104 and associated sensing devices to provide sensor input data to the apparatus 200. Additionally or alternatively, in some embodiments, the industrial control system interface circuitry 210 includes hardware, software, firmware, and/or a combination thereof, that enables the apparatus 200 to transmit command and control messages to the industrial control system 104 and associated assets and sensing devices, for example in order to execute a decarbonization task.

The dynamic data interface circuitry 212 includes hardware, software, firmware, and/or a combination thereof, that supports various functionality associated with communicating with an external dynamic data source 108. For example, in some embodiments, the dynamic data interface circuitry 212 includes hardware, software, firmware, and/or a combination thereof to access dynamic data from a remote database or web-based application. Additionally or alternatively, in some embodiments, the dynamic data interface circuitry 212 includes hardware, software, firmware, and/or a combination thereof to read from and write to an external database including dynamic configuration data.

Additionally or alternatively, in some embodiments, one or more of the sets of circuitry 202-212 are combinable. Additionally or alternatively, in some embodiments, one or more of the sets of circuitry perform some or all of the functionality described associated with another component. For example, in some embodiments, one or more sets of circuitry 202-212 are combined into a single module embodied in hardware, software, firmware, and/or a combination thereof. Similarly, in some embodiments, one or more of the sets of circuitry, for example industrial control system interface circuitry 210, and/or dynamic data interface circuitry 212, is/are combined such that the processor 202 performs one or more of the operations described above with respect to each of these circuitry individually.

Figure 3:
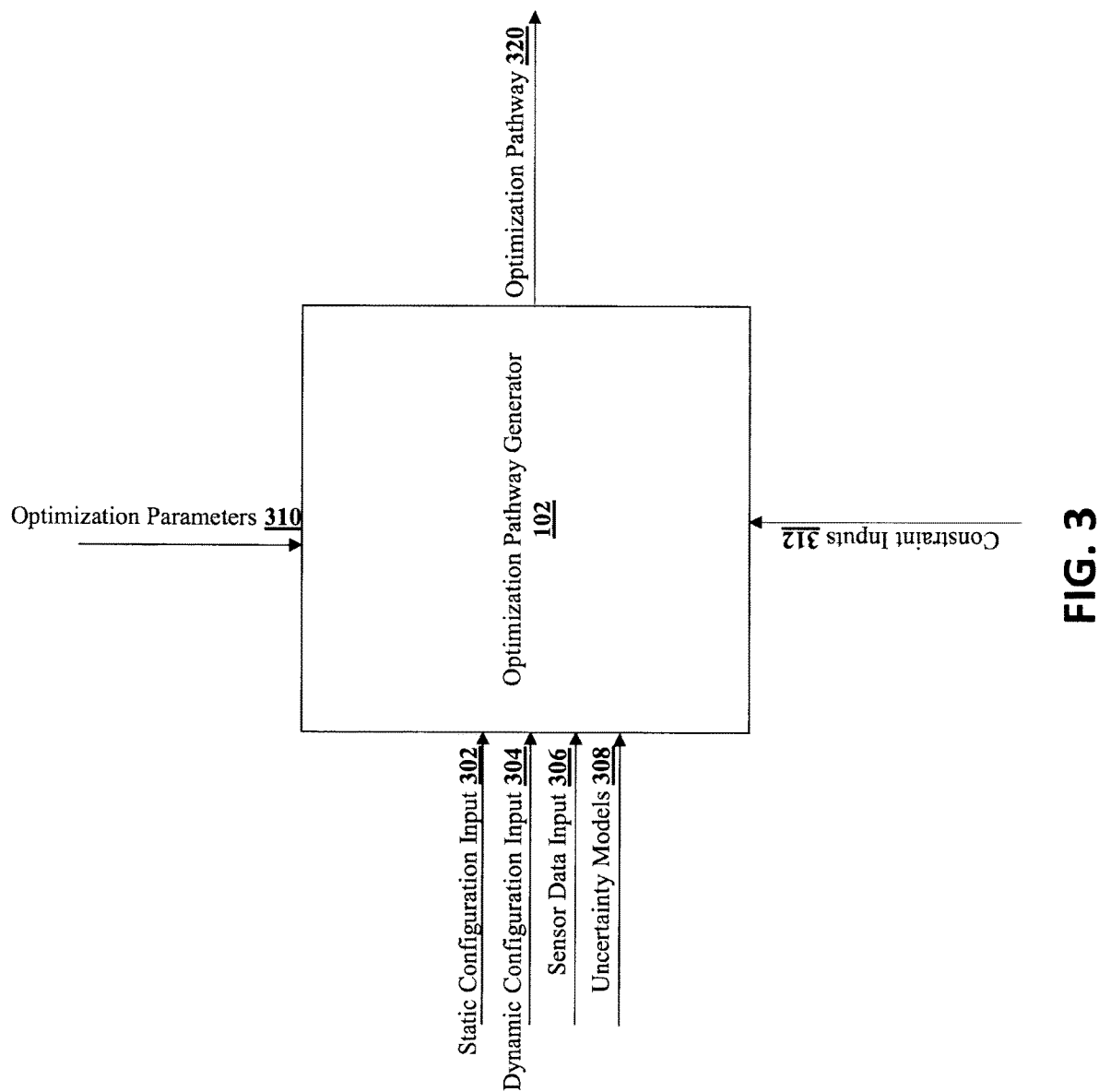
FIG. 3 illustrates an example block diagram featuring various inputs and outputs of the optimization pathway generator in accordance with an example embodiment of the present disclosure.

Referring now to FIG. 3, an example optimization pathway generator 102, for example embodied by the apparatus 200 as depicted and described herein, and the various inputs and outputs is provided. As depicted in FIG. 3, the example optimization pathway generator 102 receives various inputs including static configuration inputs 302, dynamic configuration inputs 304, sensor data inputs 306, and uncertainty models 308. As further depicted in FIG. 3, the optimization pathway generator 102 may receive one or more optimization parameters 310 and one or more constraint inputs 312. Utilizing the various inputs, the optimization pathway generator 102 outputs an optimization pathway 320. The operation of the optimization pathway generator is further described in relation to FIG. 4.

As depicted in FIG. 3, the example optimization pathway generator 102 receives static configuration inputs 302. As described herein, although static configuration inputs 302 may be updated, static configuration inputs 302 are unlikely to change and remain primarily unchanged during the initial generation of the initial optimization pathway 320 and through subsequent updates to the optimization pathway 320. In general, static configuration inputs 302 may be provided to the optimization pathway generator 102 by a user, for example, through a user interface or through a configuration file, for example, provided on a computing device (e.g., computing device 110). In some embodiments, one or more static configuration inputs 302 may be associated with an uncertainty model 308, representing the accuracy of the static configuration input 302 over time. Some example static configuration inputs 302 are further described with reference to FIG. 4.

As further depicted in FIG. 3, the example optimization pathway generator 102 receives dynamic configuration inputs 304. As described herein, dynamic configuration inputs 304 may change during the execution of the optimization pathway 320. Dynamic configuration inputs 304 may be received through user input to a user interface and/or configuration files provided to the optimization pathway generator 102 through, for example, a computing device (e.g., computing device 110), through web interfaces and databases (e.g., dynamic data sources 108), through various connected devices, for example sensing devices associated with an industrial control system 104, and/or any other data source. In some embodiments, the optimization pathway generator 102 may be configured to periodically query sources of dynamic data and update the optimization model and optimization pathway 320 based on the received dynamic configuration inputs 304. In some embodiments, the optimization pathway generator 102 may be configured to periodically receive dynamic configuration inputs 304 from connected sources of dynamic data and update the optimization model and optimization pathway 320 based on the received dynamic configuration inputs 304. Some example dynamic configurations inputs 304 are further described with reference to FIG. 4.

As further depicted in FIG. 3, the example optimization pathway generator 102 receives sensor data input 306. As described herein, sensor data input 306 may be utilized to provide and monitor the physical condition of one or more assets in an industrial control system (e.g., industrial control system 104) pertinent to the generation and regeneration of the optimization pathway 320. Sensor data input 306 may be input manually by a user, such as through a user interface or configuration file on a computing device (e.g., computing device 110). In some embodiments, sensor data input 306 may be transmitted by a sensing device of an industrial control system (e.g., industrial control system 104) to the optimization pathway generator 102 through a network connection or other communication mechanism.

In some embodiments, the sensor data input 306 includes particular data representing results of subsequent processing and/or derivation(s) of sensor data. For example, in some embodiments, the sensor data input 306 includes flaring data associated with operation of one or more asset(s) (e.g., processing unit(s)) and/or a processing plant generally. Additionally or alternatively, in some embodiments, the sensor data input 306 includes segregation of flaring and venting volume(s) as determined via one or more algorithm(s), machine learning model(s), and/or the like. Additionally or alternatively, in some embodiments, the sensor data input 306 includes data representing one or more detected and/or predicted fugitive leak(s), or other emission(s), associated with operation of an asset (e.g., a processing unit) and/or a processing plant generally. In some such embodiments, the fugitive leak determination(s) (e.g., whether predicted and/ or determined) is performed based at least in part on AI, machine-learning, and/or other model(s) specially configured to perform such determination(s).

As further depicted in FIG. 3, the example optimization pathway generator 102 receives one or more uncertainty models 308. As described herein, an uncertainty model may be any data construct representing the accuracy of an associated configuration input (e.g., static configuration input 302, dynamic configuration input 304, sensor data input 306). In some embodiments, the uncertainty models 308 may indicate an uncertainty of a present value and/or an uncertainty of a future projected value for the associated configuration input. The uncertainty model may be utilized by the optimization pathway generator 102 to determine a optimal optimization pathway 320 given the configuration inputs. For example, if a user chooses to minimize risk, an optimal optimization pathway 320 may be generated accounting for configuration inputs with higher uncertainty. In such an example, in an instance in which the uncertainty model 308 associated with the price of natural gas indicates a high uncertainty, decarbonization tasks may be chosen that allow flexibility in the budget to account for the uncertainty of the price of natural gas in the future. In some embodiments, the uncertainty model is configured as depicted and described with respect to FIGS. 27-32.

As further depicted in FIG. 3, the example optimization pathway generator 102 receives one or more optimization parameters 310. In some embodiments, optimization parameters 310 may be provided to the optimization pathway generator 102 by a user, for example, through a user interface or through a configuration file, for example, provided on a computing device (e.g., computing device 110). As described herein, optimization parameters 310 indicate to the optimization pathway generator 102 for which variables the optimization pathway 320 may be optimized. Optimization parameters 310 may include but are not limited to total cost of an optimization pathway 320; periodic cost of an optimization pathway 320, for example the cost per year/month and/or the cost broken down by year/month/week, etc.; risk; total carbon emissions; MAC; regulatory violations; and other similar variables.

In some embodiments, the optimization parameters 310 may be accompanied by an optimization weight indicating the priority of one or more of the optimization parameters 310. As described herein, the optimization pathway generator 102 may generate an optimization pathway 320 optimized according to the received optimization parameters 310 and associated weights.

As further depicted in FIG. 3, the example optimization pathway generator 102 receives one or more constraint inputs 312. In some embodiments, constraint inputs 312 may be provided to the optimization pathway generator 102 by a user, for example, through a user interface or through a configuration file, for example, provided on a computing device (e.g., computing device 110). As described herein, constraint inputs 312 provide bounds on one or more variables associated with the optimization pathway 320. For example, a constraint input may confine the total cost of the optimization pathway 320 to a max value. In such an example, the optimization pathway generator 102 may generate an optimization pathway 320 with a cost less than a corresponding portion of the constraint inputs 312. As described in relation to FIG. 4, the constraint inputs 312 may be hard constraints 418 or soft constraints 420.

As further depicted in FIG. 3, the optimization pathway generator 102 generates an optimization pathway 320. As described herein, the optimization pathway 320 may be any representation of decarbonization tasks determined to meet the constraint inputs 312 and optimized according to the optimization parameters 310 to meet a carbon emissions target value. The optimization pathway 320 may be represented as a list, calendar, and/or schedule of decarbonization tasks. As described herein, in some embodiments, the optimization pathway may include additional characteristics, such as characteristics related the timing of decarbonization tasks, characteristics related to the cost, characteristics related to the emissions of the target assets of the optimization pathway 320 and so on.

Figure 4:
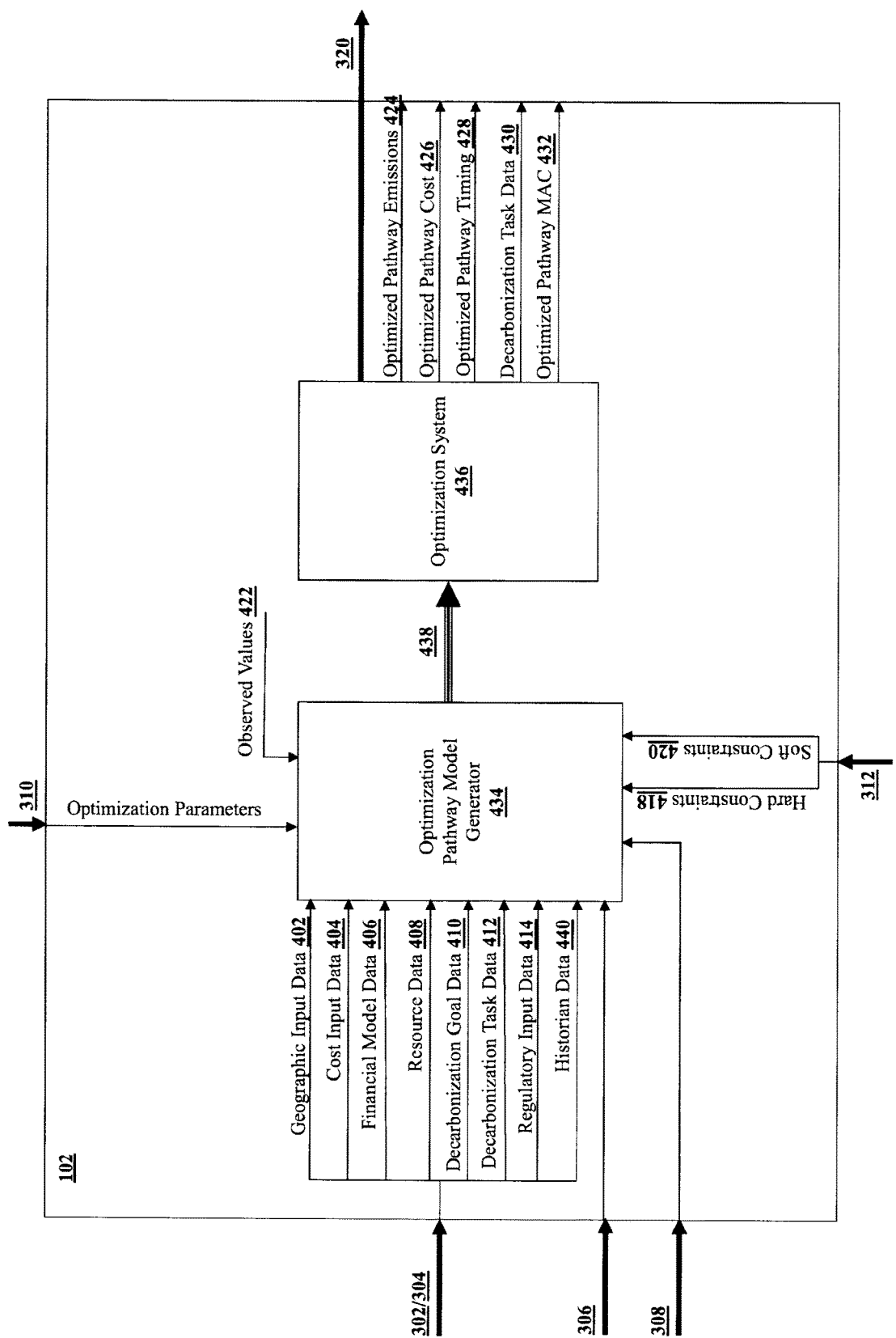
FIG. 4 illustrates an example block diagram featuring the various internal components of the optimization pathway generator in accordance with an example embodiment of the present disclosure.

Referring now to FIG. 4, FIG. 4 depicts example internal components of an example optimization pathway generator 102, for example embodied by the apparatus 200. As depicted in FIG. 4, the example optimization pathway generator 102 includes an optimization pathway model generator 434 communicatively connected to an optimization system 436. The example optimization pathway model generator 434 receives various static configuration inputs 302 and dynamic configuration inputs 304 from various sources, such as geographic input data 402, cost input data 404, financial model data 406, resource data 408, decarbonization goal data 410, decarbonization task data 412, regulatory input data 414, and historian data 440. The optimization pathway model generator 434 additionally receives sensor data inputs 306. As further depicted in FIG. 4, the optimization pathway model generator receives various constraint inputs 312, such as hard constraints 418 and soft constraints 420. The optimization pathway model generator 434 further receives uncertainty models 308 and optimization parameters 310. In addition, the optimization pathway model generator 434 receives observed values 422. As depicted in FIG. 4, the optimization pathway model generator 434 generates an optimization model 438 that is transmitted to the optimization system 436. The optimization system 436 receives the optimization model 438 and generates an optimization pathway 320 based on the optimization model 438. The optimization system 436 further generates characteristic data of the optimization pathway 320, such as, optimized pathway emissions 424, optimized pathway cost 426, optimized pathway timing 428, decarbonization task output 430, and optimized pathway MAC 432.

As depicted in FIG. 4, the example optimization pathway generator 102 includes an optimization pathway model generator 434. The optimization pathway model generator 434 may be any circuitry, processing device, and/or integrated circuit comprising hardware, firmware, software, and/or any combination thereof configured to generate an optimization model 438 based on various received inputs. As described herein, in some embodiments, the optimization pathway model generator 434 may generate an optimization model 438 consisting of a statistical, mathematical, algorithmic, and/or machine learning model, encoding the various configuration inputs, hard constraints 418, soft constraints 420, optimization parameters 310, uncertainty models 308, sensor data inputs 306, historian data 440, and/or other data. In addition, the optimization pathway model generator 434 may receive observed values 422, utilized to update an optimization model 438 based on measurements and results of the optimization pathway 320. For example, an optimization pathway model generator 434 may generate an optimization model 438 representing a machine learning model encoding the various inputs. As another example, an optimization pathway model generator 434 may generate an optimization model 438 consisting of a system of equations. Such optimization models 438 may be operated on by the optimization system 436 to produce an optimization pathway 320.

As further depicted in FIG. 4, the optimization pathway model generator 434 may receive numerous static configuration inputs 302 and dynamic configuration inputs 304. These configuration inputs may include but are not limited to geographic input data 402, cost input data 404, financial model data 406, resource data 408, decarbonization goal data 410, decarbonization task data 412, and regulatory input data 414. In some embodiments, configuration inputs may be modeled and received as static configuration inputs 302, while in other embodiments, the same inputs may be modeled and received as dynamic configuration inputs 304.

Geographic input data 402 may refer to any data, value or set of values transmitted to the optimization pathway model generator 434 indicating one or more geographic characteristics of a target asset or assets. Such geographic input data 402 may include the city, state, region, zip code, or other similar location data. Location data may be an important factor in the determination of an optimization pathway 320 due to geography specific regulations, laws, codes, and/or consequences for violations. Geographic input data 402 may further include region data such as the accessibility of water, gas, and other resources. Such data may affect the cost and ability to perform certain decarbonization tasks.

Cost input data 404 may refer to any data, value or set of values transmitted to the optimization pathway model generator 434 indicating cost information related to an optimization pathway 320. Cost input data 404 may include data related to costs of resources, such as natural gas price/projected price, hydrogen gas price/projected price, electricity price/projected price, interest rates, offset prices, price/projected price of labor, and so on. Cost input data 404 may further include data related costs for particular decarbonization tasks, including total costs and costs broken down by time period. Such cost input data 404 may be an important factor in formulating an optimization model 438.

In some embodiments, cost input data 404 includes carbon credit cost data. In some embodiments the carbon credit cost data represents a market cost to obtain carbon credit(s) corresponding to a particular metric of CO2e (or equivalent greenhouse gas emission). In some embodiments, the carbon credit cost data representing the market cost is pulled from an external system, retrieved from a database, received via user input, and/or the like.

In some embodiments, the cost carbon credit cost data additionally or alternatively includes other costs associated with an enterprise's specific competitive advantages to obtain or create carbon credits. For example, in some embodiments, the carbon credit cost data represents an entity-specific cost of carbon credits. In some embodiments, the entity-specific cost of carbon credits is based at least in part on any of a myriad of determined or user-inputted advantages associated with an enterprise. Additionally or alternatively, for example, in some embodiments the carbon credit cost data represents an opportunity cost of generating carbon credits. In some embodiments, a particular enterprise is capable of generating carbon credits with a particular competitive advantage, such that the opportunity cost of generating carbon credits may outweigh other decarbonization tasks at particular timestamps and/or during particular time intervals. In this regard, utilizing any or all of such carbon credit cost data, the optimization model described herein enables factoring in the cost of obtaining and/or generating carbon credits as compared to other decarbonization task(s) at particular times, as well as compared to projected future decarbonization task(s) and/or capital expenditures associated with such projects at future timestamps of a decarbonization pathway.

Financial model data 406 may refer to any data, value or set of values transmitted to the optimization pathway model generator 434 indicating one or more characteristics related to financial data associated with inputs to the optimization model, financial models that generate inputs to the optimization model, and/or the like. The optimization pathway model generator 434 may further consider financial models expressed in financial model data 406 in generating an optimization model 438. Financial model data 406 may include data representing a net present value of a particular accumulation of a currency (e.g., money), predictions modeling inflation, investment data and predictions, measurements and/or predictions related to carbon emissions per dollar invested, break-even modeling on carbon capture systems and other financial modeling data.

Resource data 408 may refer to any data, value or set of values transmitted to the optimization pathway model generator 434 indicating available resources for a target asset or assets. Resource data 408 may include infrastructure, labor, power, and other resources necessary to perform a decarbonization task and maintain an asset or assets.

Additionally or alternatively, in some embodiments, the resource data 408 embodies or includes data representing or otherwise indicating the existence of particular asset(s) themselves, current configuration(s) associated with such asset(s), possible configuration(s) associated with such asset(s), and/or connection(s) between such asset(s). In this regard, in some embodiments the optimization pathway model generator 434 generates an optimization model that accounts for particular asset(s), configuration(s) of asset(s), and/or the like. Additionally or alternatively, in some embodiments, the resource data 408 includes or indicates industry type data associated with a particular processing plant. For example, in some embodiments, the resource data 408 includes at least one data value that represents an industry type associated with a processing unit and/or processing plant. In this regard, different processing plants may be processed based at least in part on their specific industry type. For example, in some contexts, different industry types may include different types of processing unit(s), configurations of processing unit(s), layouts of processing unit(s), and/or the like. Additionally or alternatively still, in some contexts, different industry types limit the feasibility of including particular asset(s) embodying particular processing unit(s), configuration(s) of processing unit(s), and/or the like. The resource data 408 in some such embodiments enables an optimization model to consider the specificities of a processing plant, and/or industry type associated therewith, to accurately reflect an optimization path that is optimized and feasible for that particular processing plant and/or industry type. In this regard, it will be appreciated that different industry types—for example petrochemical plants versus specialty chemical spaces versus oil refinery plants—may each be optimized differently due to having a diverse asset mix from one another. Additionally, such distinctions may be compounded by other input data, for example location data, that limits the availability of particular asset(s) between jurisdictions, configurations for operation of such assets, and/or the like. By considering such resource data 408, the optimization model(s) depicted and described herein may provide an integrated, closed-loop optimization methodology for any and/or all of such contexts despite their various differences. Additionally or alternatively, in some embodiments, the resource data 408 is limited by feasibility determinations with respect to one or more other portion(s) of input data. For example, in some embodiments, location data associated with a processing unit and/or processing plant is determined to limit availability of particular asset(s), resource(s), and/or the like. In one example context, a processing plant located in the middle of a desert may be determined to not feasibly have sufficient access to high-water usage as a resource. In this regard, embodiments may make such determination(s) include resource data 408 and/or other input data that is limited accordingly based on such location-based feasibility determination(s).

Decarbonization goal data 410 may refer to any data, value or set of values transmitted to the optimization pathway model generator 434 indicating one or more goals of the optimization task, such as decarbonization. Decarbonization goal data 410 may indicate total emissions goals, benchmark emissions goals, timeframes for meeting emissions goals, MAC goals, and other similar data. Decarbonization goal data 410 may be an important factor in formulating an optimization model 438.

Decarbonization task data 412 may refer to any data, value or set of values transmitted to the optimization pathway model generator 434 indicating one or more aspects of a decarbonization task. Decarbonization task data 412 may include duration of a decarbonization task, resources necessary to execute a decarbonization task, cost of a decarbonization task, sequence of decarbonization tasks, change in carbon emissions as a result of the decarbonization task, MAC of a decarbonization task, and so on. Decarbonization task data 412 may be utilized by the optimization pathway model generator 434 in formulating an optimization model 438.

In some embodiments, the decarbonization task(s) are optimized at least in part to reduce overall emissions of a processing plant or particular asset (e.g., a processing unit) thereof. For example, in some embodiments, the decarbonization task(s) are determined to reduce an amount of carbon emissions (or equivalent) produced by a particular processing plant and/or processing unit. Additionally or alternatively, in some embodiments, the decarbonization task(s) are determine to reduce an amount of methane emissions (or equivalent) produced by a particular processing plant and/or processing unit. In some embodiments, the decarbonization task(s) are determined to reduce an amount of other GHG emission(s). It will be appreciated that different emissions types may be associated with different factors, costs, and/or the like. In this regard, the optimization as described herein may utilize actual (e.g., measured) emissions together with corresponding emissions factor(s) and/or other data corresponding to a particular type of emissions to be processed.

Regulatory input data 414 may refer to any data, value or set of values transmitted to the optimization pathway model generator 434 indicating one or more regulations applicable to the target asset or set of assets. Regulatory input data 414 may include carbon emissions target values, consequences for violation of a regulation, benchmarks required by regulation and so on. In some embodiments, regulatory input data 414 may dictate an asset or plurality of assets goals.

As further depicted in FIG. 4, the example optimization pathway model generator 434 may further receive historian data 440. Historian data 440 may be any data, value or set of values indicating the historical results of actions pertinent to the management and/or decarbonization of an asset or set of assets. Historian data 440 may indicate the effect of past decarbonization tasks on the managed assets and other similar assets. In some embodiments, historian data 440 may be utilized as initial inputs to the optimization pathway model generator 434 in generating the optimization model 438. In some embodiments, the optimization pathway model generator 434 may be utilized to update a generated optimization model 438 based on historical results on the target asset and other similar assets.

In some embodiments, the historian data 440 and/or decarbonization task data 412, and/or other input data, includes or embodies data retrieved from an ESG repository. In some embodiments, the ESG repository is specially configured to include particular environmental, social, and/or governance data pertinent to performance of the optimization model. In some such embodiments, the optimization pathway generator, for example embodied by the apparatus 200, stores particular data to the ESG repository that has been received, generated, and/or otherwise derived via the apparatus 200 during or via use of an optimization model. For example, in some embodiments, the ESG repository includes one or more specially configured database(s) that store data embodying an optimization pathway and/or timestamp data associated with particular decarbonization task(s) represented in the optimization pathway. In some such embodiments, the ESG repository may be configured to store data representing work order(s) for an ERP system (e.g., similarly embodied by the apparatus 200 or embodied as a separate system) to schedule, which may be performed automatically or in some embodiments via an operator. Additionally or alternatively, in some embodiments, the ESG repository is configured to receive and store updates as particular decarbonization task(s) is/are initiated and/or completed.

In some embodiments, the ESG repository includes data corresponding to a plurality of types of events associated with improvements in, or activities for, decarbonization. For example, as inputs change, a user makes repairs, performs work orders, or otherwise invests in capital or operational investments, in some embodiments the ESG repository is updated (e.g., automatically in response to sensed data or manually in response to user input, manually submitted reports, and/or the like) that record such updates. As each event is detected, submitted, or otherwise stored, the ESG repository may maintain such data together with corresponding timestamp data. In some such embodiments, the optimization model as described herein may utilize such opti data from the ESG repository to optimize based at least in part on such events, and/or data associated therewith. For example, timestamps associated with events may be utilized to determine the effectiveness of action(s) (e.g., performance of decarbonization task(s)) corresponding to such event(s), and optimize based at least in part on such data. Additionally or alternatively, in some embodiments, the ESG repository is maintained utilizing particular standards corresponding to a particular domain, region, industry, market dynamics, and/or the like. In this regard, in some such embodiments the ESG repository is configured to manually or automatically store and/or configure data in a manner that sufficiently meets requirements of a particular location or jurisdiction corresponding to a particular industrial plant, for example a processing plant. Additionally or alternatively, in this regard, such embodiments enable detailed procedures for conducting maintenance or other operational changes and/or repairs that align with plant and/or enterprise-specific protocol(s), location(s), industry type(s0, and/or the like. Additionally or alternatively still, in some embodiments the ESG repository leverages some or all of the real-time or otherwise sensed data that reflects actual operations of a particular processing unit or processing plant, for example rather than fixed or generalized ranges of data generally utilized in ESG reporting protocols.

Similarly, the example optimization pathway model generator 434 may further receive observed values 422 and utilize observed values 422 to update the optimization model 438. As described herein, observed values 422 may be real-time values related to the performance of the optimization pathway 320. Observed values 422 may include various aspects of the operating optimization pathway such as observed emissions, cost, timing, MAC, etc. The observed values 422 may be compared to the model projections, and the optimization model 438 may be adjusted based on the current performance of the optimization pathway 320.

As further depicted in FIG. 4, the optimization model 438 is transmitted to the optimization system 436. As described herein, the optimization system 436 may refer to any circuitry, processing device, and/or integrated circuit comprising hardware, firmware, software, and/or any combination thereof configured to perform optimization on the optimization model 438. In some embodiments, the optimization system 436 may be embodied on the same component or device as the optimization pathway model generator 434. In some embodiments, the optimization system 436 may comprise a computing device or system of computing devices separate from the optimization pathway model generator 434. The optimization system 436 may utilize optimization techniques based on the format of the optimization model 438. For example, in an instance in which the optimization model 438 is a mathematical representation of the received data, the optimization system may execute an optimization algorithm, such as a mixed-integer linear program (MILP) or similar algorithm. In an instance in with the optimization model 438 is a machine learning model encoding the received data, the optimization system 436 may execute a machine learning algorithm, such as a reinforcement learning algorithm, an unsupervised learning algorithm, or even a supervised learning algorithm.

As further depicted in FIG. 4, the example optimization system 436 produces an optimization pathway 320, along with a number of data outputs representing characteristics of the optimization pathway 320, for example, optimized pathway emissions 424, optimized pathway cost 426, optimized pathway timing 428, decarbonization task output 430, and optimized pathway MAC 432.

Optimized pathway emissions 424 may refer to any data, value, or set of values generated by the optimization system 436 to indicate one or more projections related to emissions of the optimization pathway 320. For example, the optimized pathway emissions 424 may indicate the projected overall emissions, or emissions over time, of a target asset or set of assets complying with the optimization pathway 320.

Optimized pathway cost 426 may refer to any data, value, or set of values generated by the optimization system 436 to indicate one or more projections related to costs associated with the optimization pathway 320. For example, the optimized pathway cost 426 may indicate the projected overall cost, or cost over time, of a implementation of the optimization pathway 320.

Optimized pathway timing 428 may refer to any data, value, or set of values generated by the optimization system 436 to indicate one or more projections related to the timing of the optimization pathway 320. For example, the optimized pathway timing 428 may indicate the projected duration, and/or projected start and stop time of the optimization pathway 320.

Decarbonization task output 430 may refer to any schedule, timetable, docket, checklist, agenda, sequence, and/or other list of decarbonization tasks included in the optimization pathway 320.

Optimized pathway MAC 432 may refer to any data, value, or set of values generated by the optimization system 436 to indicate one or more projections related to the MAC of the optimization pathway 320. For example, the optimized pathway MAC 432 may indicate the projected overall MAC for the target assets, and/or the projected MAC for each decarbonization task in the optimization pathway 320.

In some embodiments, the optimization model is configured to utilize one or more pre-optimized inputs. In one example context, the optimization system (utilizing the optimization model) outputs to a production model with fuels blending to optimize site-wide operations at a lowest equivalent CO2 (CO2e) ton per metric (e.g., ton or bbl) of product. In some embodiments, the various effects of fuel switching and/or otherwise reconfiguring operation of a particular asset (e.g., a processing unit) and/or processing plant are previously determined or statically known, for example based on user input or other data submitted via knowledge expert(s). Additionally or alternatively, in some embodiments, such industry knowledge enables particularized placement of sensor(s) to ensure a high level of accuracy, efficient and/or effective deployment of sensors, emissions monitoring, leak detection, and/or the like. In this regard, such predetermined or otherwise pre-optimized inputs considered by the optimization model may be associated with risk mitigation factor(s) and/or mitigation action(s) that minimize or otherwise reduce unplanned releases, process shut down(s), and/or other impact(s) to operation of an asset and/or processing plant that may affect GHG emission.

Additionally or alternatively still, in some embodiments, the optimization system (utilizing the optimization model) outputs financial metrics that embody a value of CO2e per value of currency invested or otherwise expended to reach current operations of a particular processing plant. Additionally or alternatively, in some embodiments, the optimization system (utilizing the optimization model) outputs a break-even model of carbon capture and storage together with electrification on primary assets (e.g., particularly associated with indicated or otherwise predetermined primary units) as the CO2e changes based on the input data, for example based at least in part on electrical power charges change over time. Additionally or alternatively, in some embodiments, the optimization system (utilizing the optimization model) predicts emission costs and/or optimizations for various fuel specifications, for example to account for possible fuel alternatives available in a particular industry type, location, and/or the like. Additionally or alternatively, in some embodiments, the optimization system (utilizing the optimization model) outputs optimized catalyst reloads based on minimization of capital expenditure for emissions costs associated therewith. In this regard, the optimization system (utilizing the optimization model) may perform various calculation(s) of emissions factor(s) for projected optimization pathway(s), and/or portion(s) thereof, and benchmark against a particular baseline, for example the currently installed base of processing units for a particular processing plant. In some embodiments, knowledge sharing between enterprise(s) and/or processing plant(s) of a particular enterprise may be leveraged to ensure that bad actor(s) (e.g., particular asset(s), types of asset(s), configuration(s), and/or the like) may be identified and shared via a mutually accessible knowledge base, database, and/or the like. Additionally or alternatively, data associated with performed decarbonization task(s) may similarly be shared between enterprise(s) and/or processing plant(s) in some embodiments, for example such that best practices in performing decarbonization may be identified and shared between such entities.

Referring now to FIG. 5, an example static configuration input mechanism 500 for indicating static configuration inputs (e.g., static configuration input 302) to an example optimization pathway generator (e.g., optimization pathway generator 102) is provided. In some embodiments, the static configuration input mechanism is embodied by one or more other specially configured user interface(s). For example, in some embodiments, the static configuration input mechanism comprises or is embodied by a specially configured user interface rendered to a client device that includes one or more control(s), input element(s), and/or the like visually depicted within the user interface. The user interface may be renderable via a user-facing application associated with the apparatus 200, for example via a native application executed via the apparatus 200 or a client device associated therewith, or via a web application executed via the apparatus 200 or a client device associated therewith. It will be appreciated that in some embodiments the static configuration input mechanism includes a subset of the control(s) as depicted and/or described, alternative control(s) as depicted and/or described, and/or other configurations of the control(s) as depicted and/or described.

As illustrated in FIG. 5, various static configuration inputs may be provided to the optimization pathway generator. For example, in column 502 a list of decarbonization tasks is provided as a configuration input with corresponding configuration input parameters, such as, cost of the decarbonization task (column 506), operating cost once the decarbonization task is performed (column 508), emissions per year of the asset associated with the decarbonization task (column 510), the MAC cost of the decarbonization task (column 512), and the duration of the decarbonization task (column 514).

Further illustrated in the example static configuration input mechanism 500 of FIG. 5, constraint inputs (e.g., constraint inputs 312) may be associated with a decarbonization task, such as, the earliest start date of the decarbonization task (column 504). Additionally, project constraints depicted include the optimization pathway earliest start time and latest end time (rows 516), and the maximum number of decarbonization tasks that can be performed in a time period (rows 518).

As further depicted in the example static configuration input mechanism 500 of FIG. 5, optimization parameters (e.g., optimization parameters 310) are provided to the optimization pathway generator, such as the MAC, the total cost of the project, and the minimum time to carbon neutrality, as shown in row 520.

In some embodiments, a user provides user input to initiate generation of an optimization pathway (e.g., via the optimization model(s) described herein). For example, in some embodiments, a user interface such as the static configuration input mechanism 500 includes one or more control(s) specially configured to, upon receiving user input associated with the control(s), initiate generation of the optimization pathway.

Referring now to FIG. 6, an example optimization pathway characteristics interface 600 for indicating characteristics of an optimization pathway (e.g., optimization pathway 320) is provided.

As illustrated in FIG. 6, various characteristics related to the optimization pathway over a period, and in total, are provided through a user interface. For example, the projected total emissions of an asset (e.g., optimized pathway emissions 424) for each year of the optimization pathway, as shown in row 602. Further, as shown in row 604, the example optimization pathway characteristics interface 600 provides the total emissions reduction over the lifetime of the optimization pathway. In addition, as shown in row 606, the example optimization pathway characteristics interface 600 provides the projected cost of a decarbonization task suggested by the optimization pathway for a particular year. As further indicated in row 608, the example optimization pathway characteristics interface 600 provides the projected operating cost change for the target asset implementing the optimization pathway.

As further depicted in FIG. 6, the projected total cost of the optimization pathway (row 610) and the projected carbon emissions value (row 612) are also indicated by the example optimization pathway characteristics interface 600.

Referring now to FIG. 7, an example optimization pathway decarbonization task schedule interface 700 is provided. As depicted in the example optimization pathway decarbonization task schedule interface 700, an optimization pathway (e.g., optimization pathway 320) may indicate a list of decarbonization tasks and the timing or schedule associated with each of the decarbonization tasks (e.g., decarbonization task output 430) such that the target carbon emissions value may be obtained. For example, as depicted in FIG. 7, the start time and duration of decarbonization tasks indicated by the optimization pathway may be displayed.

Referring now to FIG. 8, an example optimization pathway projected project costs interface 800 is provided. As depicted in the example optimization pathway projected project costs interface 800, an optimization pathway (e.g., optimization pathway 320) may indicate projected costs associated with the decarbonization tasks of an optimization pathway (e.g., optimized pathway cost 426). The optimization pathway generator may utilize the various configuration inputs, including uncertainty models (e.g., uncertainty models 308) to determine costs associated with the optimization pathway. For example, as depicted in the example optimization pathway projected project costs interface 800 of FIG. 8, the optimization pathway generator may provide the periodic cost of a particular decarbonization task (as shown in box 802) and the total cumulative cost of an optimization pathway (as shown in box 804).

Similarly, in the example optimization pathway projected operational costs interface 900 as provided in FIG. 9, the optimization pathway may indicate operational costs associated with a target asset. In an instance in which the target asset performs a decarbonization tasks, there may be a change in operational costs, for example, the modified asset may utilize more fuel or power. In such an instance, the operational costs may change. The optimization pathway may utilize the various configuration inputs, to determine the operating costs associated with the particular decarbonization task. For example, as depicted in the example optimization pathway projected operational costs interface 900 of FIG. 9, the optimization pathway generator may provide the change in operational costs of a target asset (as shown in box 902).

Figure 10:
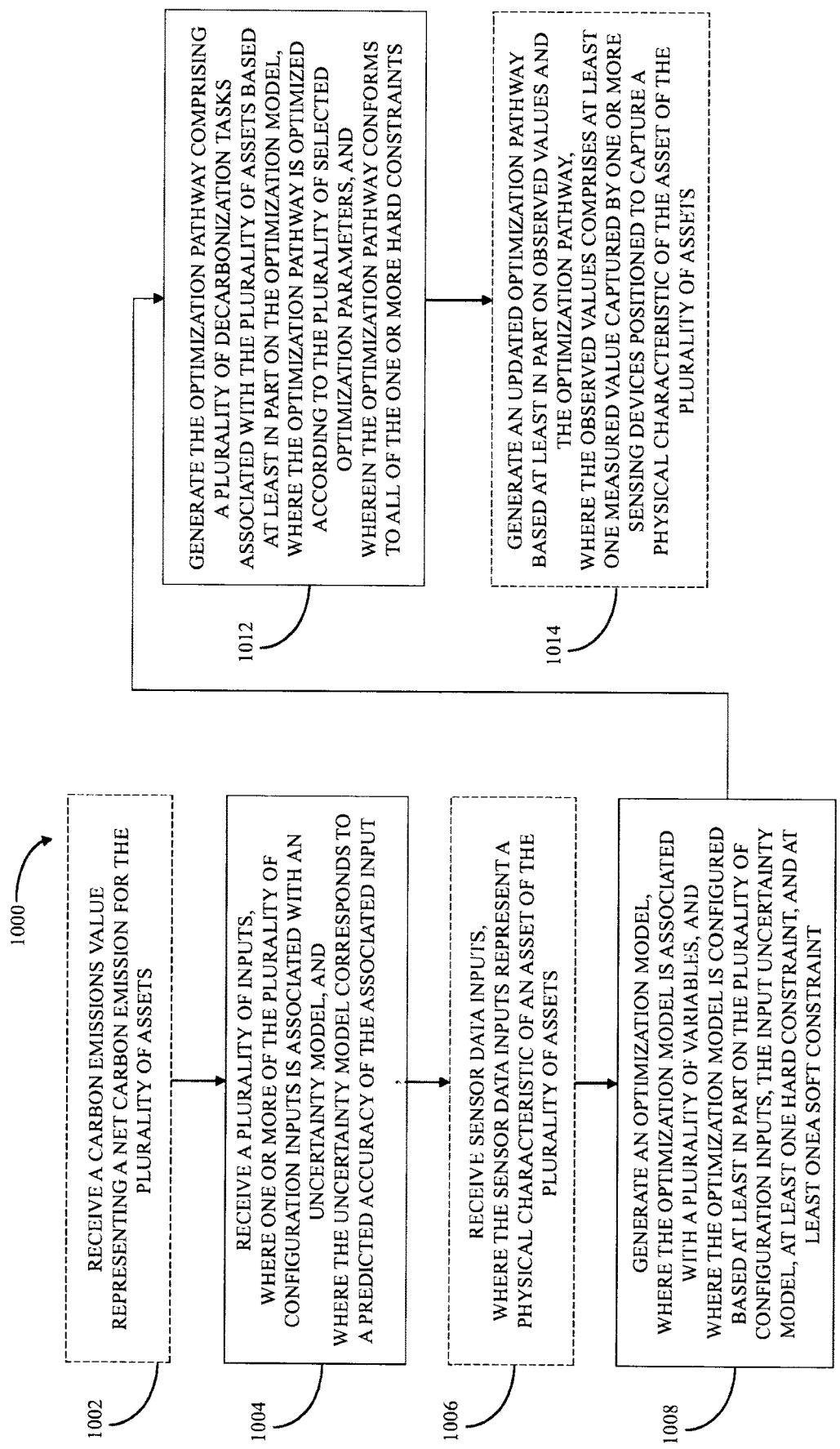
FIG. 10 illustrates an example flowchart including example operations of an example process for producing a carbonization pathway for a plurality of assets in accordance with at least one example embodiment of the present disclosure.

Referring now to FIG. 10, an example process 1000 for producing an optimization pathway is provided. Specifically, the example process 1000 embodies a computer-implemented process executable via any of the device(s) described herein that produce an optimization pathway, for example device(s) embodied in hardware, software, firmware, and/or any combination thereof. In some embodiments, the process 1000 is embodied by computer program code stored via at least one non-transitory computer-readable storage medium. In some embodiments, the at least one non-transitory computer-readable storage medium having the computer program code stored thereon embodies a computer program product that, in execution with at least one processor, is configured for performing the example process 1000. In some embodiments, the computer program code is stored to at least one memory of an apparatus. In some such embodiments, the apparatus includes at least one processor together with the at least one memory, such that upon execution of the computer program code via the at least one processor, the apparatus is caused to perform some or all steps of the process 1000.

At optional step 1002, an optimization pathway generator (e.g., optimization pathway generator 102 embodied by the apparatus 200) may receive a carbon emissions value representing a net carbon emission for the plurality of assets. As described herein, the carbon emissions value may represent the current carbon emissions of an asset(s). In some embodiments, the carbon emissions value may be received from a sensing device associated with the asset(s). In some embodiments, the carbon emissions value may be input through a user interface, configuration file, or similar mechanism.

At step 1004, an optimization pathway generator (e.g., embodied by the apparatus 200) may receive a plurality of inputs. In some embodiments, the inputs include at least one configuration input (e.g., static configuration input 302, dynamic configuration input 304) comprising at least one uncertain input and a plurality of variable inputs, where the at least one uncertain input is associated with an uncertainty model (e.g., uncertainty models 308), and where the uncertainty model corresponds to a predicted accuracy of the uncertain input. As described herein, the plurality of configuration inputs received by the optimization pathway generator may include static configuration inputs and dynamic configuration inputs. In some embodiments, one or more of the configuration inputs may be associated with an uncertainty model representing the accuracy of the associated configuration input. Configuration inputs may be received through a user interface, a configuration file, a database or web interface, or by similar means.

At optional step 1006, an optimization pathway generator (e.g., embodied by the apparatus 200) may receive a sensor data input (e.g., sensor data input 306), where the sensor data input represent a physical characteristic of an asset of the plurality of assets. In some embodiments, connecting sensing devices may transmit information related to the operation of the target asset, for example, information related to carbon emissions values, temperature, pressure, flow rate, detected leaks, detected gases, power readings, etc. An optimization pathway generator may receive sensor data inputs during initial configuration and may further receive sensor data inputs during operation, as dynamic configuration inputs.

At step 1008, an optimization pathway generator (e.g., embodied by the apparatus 200) may generate an optimization model (e.g., optimization model 438). In some embodiments, the optimization model is associated with a plurality of optimization parameters, which may be associated with the plurality of variable inputs. Additionally or alternatively, in some embodiments, the optimization model is configured based at least in part on the plurality of configuration inputs, the input uncertainty model, at least one hard constraint, and at least one soft constraint. Additionally or alternatively, in some embodiments, the optimization model is configured based at least in part on the carbon emissions value and/or the sensor data input as described with respect to a prior step. As described herein, the optimization model may comprise any statistical, algorithmic, mathematical, and/or machine learning data construct configured to represent the various configuration inputs, hard constraints, soft constraints, optimization parameters, uncertainty models, and other data pertinent to the formulation of an optimization pathway. For example, in some embodiments, the optimization pathway generator may utilize software, programs, and/or circuitry to determine a mathematical model representing the received input data.

At step 1010, an optimization pathway generator (e.g., embodied by the apparatus 200) may generate the optimization pathway comprising a plurality of decarbonization tasks associated with the plurality of assets based at least in part on the optimization model, where the optimization pathway is optimized according to the optimization parameters, and where the optimization pathway conforms to each of the one or more hard constraints. As described herein, the optimization pathway generator may utilize an optimization system (e.g., optimization system 436) to generate an optimization pathway for a particular asset(s) considering any carbon emissions target, strictly complying with any hard constraints, and flexibly complying with any soft constraints. The optimization system may utilize any optimization algorithm, depending on the optimization model, including but not limited to a mixed-integer linear programming (MILP) algorithm, a machine learning algorithm, or another optimization algorithm.

At optional step 1012, an optimization pathway generator (e.g., embodied by the apparatus 200) may generate an updated optimization pathway based at least in part on an observed value and the optimization pathway. In some embodiments the updated optimization pathway represents the optimization pathway based at least in part on an observed value (e.g., observed values 422), where the observed value comprises at least one measured value captured by one or more sensing devices positioned to capture a physical characteristic of a monitored asset of the plurality of assets. As described herein, the optimization pathway generator may utilize measurements obtained from sensing devices measuring data at or near the target assets to make a determination in relation to the optimization pathway. For example, an optimization pathway generator may utilize a measured carbon emissions value to determine if a target asset(s) is operating at or near the level projected by the optimization pathway. If a target asset(s) is not operating at or near the projected outcomes, the optimization pathway generator may update the optimization model and regenerate an updated optimization pathway. In this regard, the optimization pathway generator (e.g., embodied by the apparatus 200) may periodically re-run or otherwise re-execute the optimization model to generate updated paths as the various input data is updated, including input data that represents or otherwise corresponds to previously-generated optimization pathway(s) that may have been implemented, partially implemented, or otherwise further processed.

Emissions Optimization Embodiments

Particular embodiments of the present disclosure with respect to emissions optimization generally will now be discussed. It will be appreciated that such embodiments may describe sub-embodiments, or in some contexts super-embodiments, of those described above with respect to FIGS. 1-10. In this regard, the example system 100 for example in some embodiments is embodied by, includes, or otherwise is represented by the networked computing environment 1100. Similarly, additionally or alternatively in some embodiments the apparatus 200 embodies, is included as a subcomponent, or otherwise represents an example of the emissions optimization computer system 1302. In this regard, it will be appreciated that any of the functionality performed by the apparatuses, computing systems, and/or the like as depicted and described with respect to FIGS. 1-10 may similarly be performed by apparatuses, computing systems, and/or other embodiments as depicted and described with respect to FIGS. 11-19.

Industrial processes are often managed using industrial control systems. However, traditional industrial control systems typically utilize historical data and/or static control measures to manage emissions related to industrial processes that is open-looped. Additionally, emissions calculations used for optimization, asset planning including capital investment and reporting related to industrial processes typically rely on simulation-based approach which includes theoretical calculations and/or emission estimates for a single point in time. As a result, actual emissions versus calculated emissions for an industrial process may differ by as much as +/−1500%. Reduction benefits dilutive overtime and misaligned with overarching industrial performance goals including financial and emissions management. Accordingly, typical industrial processes are often executed in an inefficient and/or undesirable manner, especially with respect to emissions. For example, execution and/or changes to industrial processes and/or control systems are typically conducted through single variable or select traditional multi-variable optimization methods that require manual intervention by a user. The current optimization methods often do not take in account internal and external uncertainty factors (e.g., shift in regulations, changing emissions accounting methodologies, technology landscape changes, associated adjacent, enabling infrastructure and sources etc.) over a long-term time frame (e.g., 10-15 years). Furthermore, the current approach to variable optimizations methods is often open-loop and applied to a single process unit, a specific process, and/or a sub section of a single site. Current emissions management approach of measure-monitor-reduce is applied to current process. Few companies plan and/or take into account emissions implication resulting from growth strategies requiring operational expansions new asset acquisitions, new product line introductions, regulatory changes, feedstock and other process material changes due to changing market needs, implementation of digital and autonomous capabilities and incremental emissions due as a result of implementing emissions management systems and technologies requiring incremental power. It is therefore advantageous to optimize an industrial process via closed loop, automated, and/or real-time process management includes a long-term multi-variable planning algorithm with a problem formulation that incorporates all the important factors can identify the most optimal pathways to ensure effective emissions management specific users operating context and performance objectives cross-site, cross-different assets and at an aggregated enterprise level.

Thus, to address these and/or other issues, emission planning, optimization, and/or execution for industrial processes is provided. In one or more embodiments, an industrial process is optimized via closed loop, automated, and/or real-time industrial process management. The emission optimization disclosed herein can employ single-variable objectives and/or simultaneous multi-variable objectives to direct the emission optimization via closed loop scenarios over certain periods of time for planning optimization, management and/or execution related to industrial processes. In one or more embodiments, an industrial process is integrated with measurement, management, and/or planning tools for emission optimization to provide evaluation, planning and/or execution of emission management and/or industrial process automation.

In one or more embodiments, the emission optimization disclosed herein enables modification of operational effects related to emissions and leak detection to reduce the impact of carbon emissions and/or to satisfy emission compliance requirements. In one or more embodiments, the emission optimization disclosed herein is based on domain-specific optimized pre-inputs and/or automated external inputs. Additionally, the emission optimization disclosed herein is a digital solution that utilizes multivariable inputs from internal and/or external sources that can be repeatedly updated based on real-time industrial process operations.

In one or more embodiments, the emission optimization disclosed herein is additionally or alternatively based on a set of emission objectives, a set of emission constraints, real-time input data and/or static input data to obtain emission management goals for industrial processes. The real-time input data can be automatically received, collected, and/or extracted from one or more data sources and/or can dynamically change over time based on operation of industrial processes. Examples of real-time input data include, but not limited to, process data, measurement data, sensor data, camera data, market data (e.g., cost of natural gas, electricity, green hydrogen, interest rates, etc.), and/or other real-time data. The static input data can be manually entered by a user and/or can be constant over time. The static input data can additionally or alternatively be updated by a user. Examples of static input data include, but not limited to, annual emissions data, project quote data, a number of resources, and/or other static data.

In one more embodiments, a model is utilized to provide the emission optimization. The model can be an algorithmic model, a statistical model, a machine learning model, or another type of model configured to provide insights, predictions, and/or recommendations related to emission optimization. In one or more embodiments, the model is automatically configured to update and/or otherwise learn as real-time input data changes over time. In one or more embodiments, the real-time input data and/or the static input data can be provided as input to the model.

Additionally, the model can process the real-time input data and/or the static input data within the set of emission objectives and/or the set of emission constraints to output an emissions management path related to modification of process automation and/or controls for one or more industrial processes. The emissions management path provided by the model can additionally or alternatively be related to modification of operational planning activities for one or more industrial process.

In one or more embodiments, multi-variable inputs related to industrial assets and/or industrial processes are aggregated according to an industrial domain to provide aggregated multi-variable data. The aggregated multi-variable data can be provided as input to the model to provide an optimized emissions management pathway for the industrial domain based on a set of emission objectives and/or a set of emission constraints. In various embodiments, the model can quantify associated risks and/or uncertainties including impact on variables (e.g., interdependency and/or dependency impact on variables). Additionally or alternatively, in one or more embodiments, real-time market data is monitored and provided as input to the model to facilitate determination of the optimized emissions management pathway for the industry domain. In certain embodiments, the optimized emissions management pathway can be communicated to an enterprise resource planning (ERP) system and/or a control system (e.g., an operational control system) to initiate one or more adjustments with respect to one or more industrial processes to provide optimized emissions related to the one or more industrial processes. Additionally or alternatively, the one or more adjustments can be provided to an emissions management historian and/or a master decarbonization historian to facilitate future adjustments to industrial processes and/or adjustments to the model. This can enable increased transparency for audition and/or "say-do ratio" utilization to reduce emission inaccuracies for an industrial domain and/or to improve emissions management credibility while also improving alignment with regulatory and compliance requirements to capture emission incentives and/or to generate machine readable reports related to emissions.

In one or more embodiments, a real-time feedback loop for reliable emissions control and/or management is provided via a two layered continuous gas emissions monitoring and measurement system. For example, the gas emissions monitoring and measurement system can include a mesh network of point measurement gas sensors, a weather monitoring system, and/or a set of gas cloud imaging (GCI) cameras associated with hyperspectral imaging technology. The respective point measurement gas sensors can be positioned within an industrial facility in close proximity to potential leak sources. Additionally, based on a combination of data streams associated with the point measurement gas sensors, gas emissions related to respective industrial asset components at the industrial facility can be measured in real-time. The measurements related to the gas emissions can then be utilized to evaluate total emissions at the industrial facility via a summation of all of emission sources. The GCI cameras can be positioned separate from industrial components monitoring for total emissions related to the industrial facility in order to determine gross emissions from all of the industrial components in real-time. Additionally or alternatively, in some embodiments, the results from the model are stored and/otherwise maintained in a manner usable as input to the model. In this regard, embodiments of the present disclosure may determine and/or otherwise utilize previous results from the model, as well as subsequent portion(s) of captured input data, to determine the effectiveness of the results outputted by the model (e.g., modifications to perform to optimize particular target parameter(s)) to determine whether implemented results were effective, more effective, or less expected than previous determined in affecting the target parameters for optimization.

Accordingly, accuracy of gas emission calculations, or equivalents of gas emissions, for an industrial facility can be improved and/or performance of one or more industrial processes related to the industrial facility can be improved. Moreover, by employing one or more techniques disclosed herein, industrial process efficiency can be optimized in a myriad of manners that satisfy particular constraints, and optimize multiple parameters simultaneously (e.g., emissions reduction together with overall cost over a particular time interval). Additionally, in one or more embodiments, performance of a processing system (e.g., a control system) associated with an industrial process is improved by employing one or more techniques disclosed herein. For example, in one or more embodiments, a number of computing resources, a number of a storage requirements, and/or number of errors associated with a processing system (e.g., a control system) for an industrial process is reduced by employing one or more techniques disclosed herein.

Figure 11:
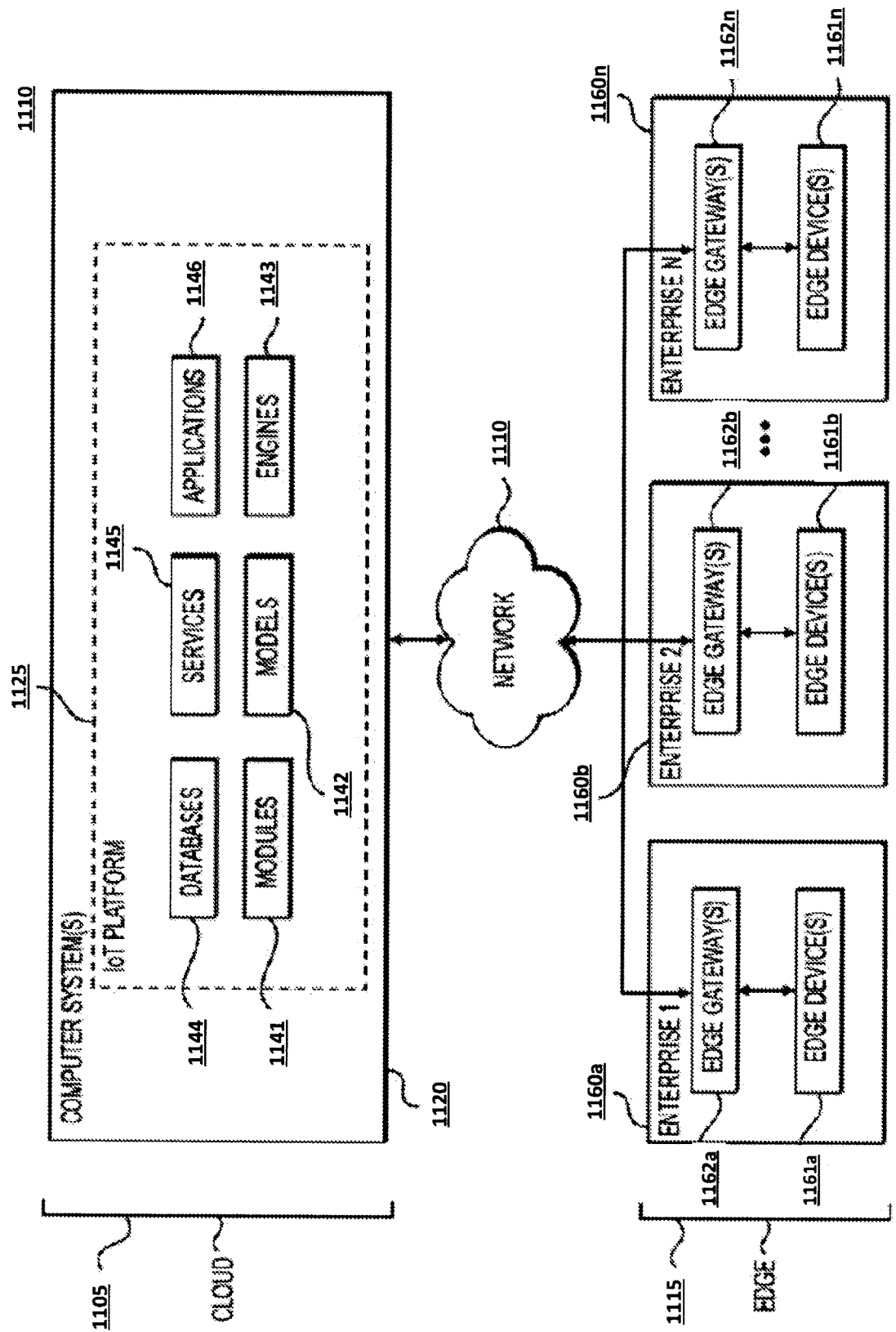
FIG. 11 illustrates an exemplary networked computing system environment, in accordance with one or more embodiments described herein.

FIG. 11 illustrates an exemplary networked computing system environment 1100, according to the present disclosure. As shown in FIG. 11, networked computing system environment 1100 is organized into a plurality of layers including a cloud layer 1105, a network 1110, and an edge 1115. As detailed further below, components of the edge 1115 are in communication with components of the cloud 1105 via the network 1110. In one or more embodiments, the network 1110 is a network layer and/or the edge 1115 is an edge layer.

In various embodiments, network 1110 is any suitable network or combination of networks and supports any appropriate protocol suitable for communication of data to and from components of the cloud 1105 and between various other components in the networked computing system environment 1100 (e.g., components of the edge 1115). According to various embodiments, network 1110 includes a public network (e.g., the Internet), a private network (e.g., a network within an organization), or a combination of public and/or private networks. According to various embodiments, network 1110 is configured to provide communication between various components depicted in FIG. 11. According to various embodiments, network 1110 comprises one or more networks that connect devices and/or components in the network layout to allow communication between the devices and/or components. For example, in one or more embodiments, the network 1110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 1110 is implemented using cellular networks, satellite, licensed radio, or a combination of cellular, satellite, licensed radio, and/or unlicensed radio networks.

Components of the cloud 1105 include one or more computer systems 1120 that form a so-called "Internet-of-Things" or "IoT" platform 1125. It should be appreciated that "IoT platform" is an optional term describing a platform connecting any type of Internet-connected device, and should not be construed as limiting on the types of computing systems usable within IoT platform 1125. In particular, in various embodiments, computer systems 1120 includes any type or quantity of one or more processors and one or more data storage devices comprising memory for storing and executing applications or software modules of networked computing system environment 1100. In one embodiment, the processors and data storage devices are embodied in server-class hardware, such as enterprise-level servers. For example, in an embodiment, the processors and data storage devices comprises any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 1100.

Computer systems 1120 further include one or more software components of the IoT platform 1125. For example, in one or more embodiments, the software components of computer systems 1120 include one or more software modules to communicate with user devices and/or other computing devices through network 1110. For example, in one or more embodiments, the software components include one or more modules 1141, models 1142, engines 1143, databases 1144, services 1145, and/or applications 1146, which may be stored in/by the computer systems 1120 (e.g., stored on the memory), as detailed with respect to FIG. 12 below. According to various embodiments, the one or more processors are configured to utilize the one or more modules 1141, models 1142, engines 1143, databases 1144, services 1145, and/or applications 1146 when performing various methods described in this disclosure.

Accordingly, in one or more embodiments, computer systems 1120 execute a cloud computing platform (e.g., IoT platform 1125) with scalable resources for computation and/or data storage, and may run one or more applications on the cloud computing platform to perform various computer-implemented methods described in this disclosure. In some embodiments, some of the modules 1141, models 1142, engines 1143, databases 1144, services 1145, and/or applications 1146 are combined to form fewer modules, models, engines, databases, services, and/or applications. In some embodiments, some of the modules 1141, models 1142, engines 1143, databases 1144, services 1145, and/or applications 1146 are separated into separate, more numerous modules, models, engines, databases, services, and/or applications. In some embodiments, some of the modules 1141, models 1142, engines 1143, databases 1144, services 1145, and/or applications 1146 are removed while others are added.

The computer systems 1120 are configured to receive data from other components (e.g., components of the edge 1115) of networked computing system environment 1100 via network 1110. Computer systems 1120 are further configured to utilize the received data to produce a result. According to various embodiments, information indicating the result is transmitted to users via user computing devices over network 1110. In some embodiments, the computer systems 1120 is a server system that provides one or more services including providing the information indicating the received data and/or the result(s) to the users. According to various embodiments, computer systems 1120 are part of an entity which include any type of company, organization, or institution that implements one or more IoT services. In some examples, the entity is an IoT platform provider.

Components of the edge 1115 include one or more enterprises 1160*a*-1160*n* each including one or more edge devices 1161*a*-1161*n* and one or more edge gateways 1162*a*-1162*n*. For example, a first enterprise 1160*a* includes first edge devices 1161*a* and first edge gateways 1162*a*, a second enterprise 1160*b* includes second edge devices 1161*b* and second edge gateways 1162*b*, and an nth enterprise 1160*n* includes nth edge devices 1161*n* and nth edge gateways 1162*n*. As used herein, enterprises 1160*a*-1160*n* represent any type of entity, facility, or vehicle that includes processing units, industrial assets and/or industrial processes capable of producing emissions (e.g., gas emissions), such as, for example, industrial facilities, processing plant facilities, manufacturing facilities, oil and gas facilities (e.g., oil refineries), chemical processing facilities (e.g., metal refinery, alumina refinery, etc.), lubricant industrial plants, buildings, warehouses, real estate facilities, laboratories, companies, divisions, aircrafts, spacecrafts, automobiles, ships, boats, vehicles, or any other type of entity, facility, and/or vehicle that includes any number of local devices. Furthermore, the processing units, industrial assets and/or industrial processes associated with the enterprises 1160*a*-1160*n* may transform, manipulate, and/or otherwise interact with input ingredients to yield a final product.

Figure 12:
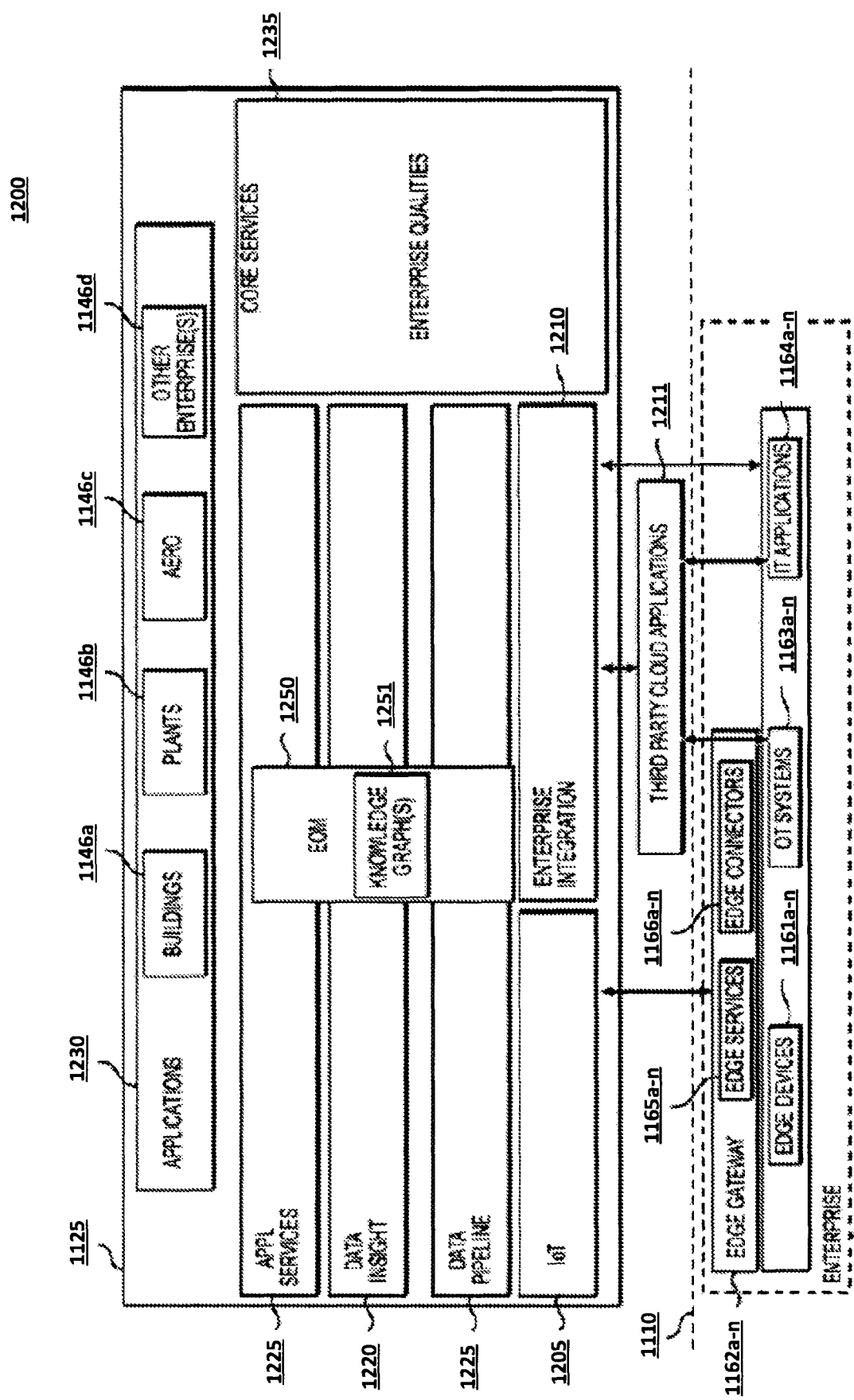
FIG. 12 illustrates a schematic block diagram of a framework of an IoT platform of the networked computing system, in accordance with one or more embodiments described herein.

According to various embodiments, the edge devices 1161*a*-1161*n* represent any of a variety of different types of devices that may be found within the enterprises 1160*a*-1160*n*. Edge devices 1161*a*-1161*n* are any type of device configured to access network 1110, or be accessed by other devices through network 1110, such as via an edge gateway 1162*a*-1162*n*. According to various embodiments, edge devices 1161*a*-1161*n* may include "IoT devices" which include any type of network-connected (e.g., Internet-connected) device that monitor operations of a particular processing unit. For example, in one or more embodiments, the edge devices 1161*a*-1161*n* include sensors, cameras, units, gas monitoring devices, gas leak sensing devices, gas cloud imaging devices, flanges, pressure relief devices, pumps, burners, boilers, storage tanks, air handler units, fans, actuators, valves, ducts, processors, computers, vehicle components, drone components, satellite components, displays, HVAC components, industrial equipment, factory equipment, refinery equipment, and/or any other devices that are connected to the network 1110 via one or more techniques for collecting, sending, and/or receiving information. Each edge device 1161*a*-1161*n* includes, or is otherwise in communication with, one or more controllers for selectively controlling a respective edge device 1161*a*-1161*n* and/or for sending/receiving information between the edge devices 1161*a*-1161*n* and the cloud 1105 via network 1110. With reference to FIG. 12, in one or more embodiments, the edge 1115 include operational technology (OT) systems 1163*a*-1163*n* and information technology (IT) applications 1164*a*-1164*n* of each enterprise 1160*a*-1160*n*. The OT systems 1163*a*-1163*n* include hardware and software for detecting and/or causing a change, through the direct monitoring and/or control of industrial equipment (e.g., edge devices 1161*a*-1161*n*), assets, processes, and/or events. The IT applications 1164*a*-1164*n* includes network, storage, and computing resources for the generation, management, storage, and delivery of data throughout and between organizations.

The edge gateways 1162*a*-1162*n* include devices for facilitating communication between the edge devices 1161*a*-1161*n* and the cloud 1105 via network 1110. For example, the edge gateways 1162*a*-1162*n* include one or more communication interfaces for communicating with the edge devices 1161*a*-1161*n* and for communicating with the cloud 1105 via network 1110. According to various embodiments, the communication interfaces of the edge gateways 1162*a*-1162*n* include one or more cellular radios, Bluetooth, Wi-Fi, near-field communication radios, Ethernet, or other appropriate communication devices for transmitting and receiving information. According to various embodiments, multiple communication interfaces are included in each gateway 1162*a*-1162*n* for providing multiple forms of communication between the edge devices 1161*a*-1161*n*, the gateways 1162*a*-1162*n*, and the cloud 1105 via network 1110. For example, in one or more embodiments, communication are achieved with the edge devices 1161*a*-1161*n* and/or the network 1110 through wireless communication (e.g., Wi-Fi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 1162a-1162n also include a processor and memory for storing and executing program instructions to facilitate data processing. For example, in one or more embodiments, the edge gateways 1162a-1162n are configured to receive data from the edge devices 1161a-1161n and process the data prior to sending the data to the cloud 1105. Accordingly, in one or more embodiments, the edge gateways 1162a-1162n include one or more software modules or components for providing data processing services and/or other services or methods of the present disclosure. With reference to FIG. 12, each edge gateway 1162a-1162n includes edge services 1165a-1165n and edge connectors 1166a-1166n. According to various embodiments, the edge services 1165a-1165n include hardware and software components for processing the data from the edge devices 1161a-1161n. According to various embodiments, the edge connectors 1166a-1166n include hardware and software components for facilitating communication between the edge gateway 1162a-1162n and the cloud 1105 via network 1110, as detailed above. In some cases, any of edge devices 1161a-n, edge connectors 1166a-n, and edge gateways 1162a-n have their functionality combined, omitted, or separated into any combination of devices. In other words, an edge device and its connector and gateway need not necessarily be discrete devices.

FIG. 12 illustrates a schematic block diagram of framework 1200 of the IoT platform 1125, according to the present disclosure. The IoT platform 1125 of the present disclosure is a platform for plantwide optimization that uses real-time accurate models and/or real-time data to deliver intelligent actionable recommendations and/or real-time control for sustained peak performance of the enterprise 1160a-1160n. The IoT platform 1125 is an extensible platform that is portable for deployment in any cloud or data center environment for providing an enterprise-wide, top to bottom view, displaying the status of processes, assets, people, and safety. Further, the IoT platform 1125 supports end-to-end capability to execute one or more emission optimization models against measurement data and to translate the output into actionable insights related to optimizing emissions, using the framework 1200, detailed further below.

As shown in FIG. 12, the framework 1200 of the IoT platform 1125 comprises a number of layers including, for example, an IoT layer 1205, an enterprise integration layer 210, a data pipeline layer 1225, a data insight layer 1220, an application services layer 1225, and an applications layer 1230. The IoT platform 1125 also includes a core services layer 1235 and an extensible object model (EOM) 1250 comprising one or more knowledge graphs 251. The layers 1205-1235 further include various software components that together form each layer 1205-1235. For example, in one or more embodiments, each layer 1205-1235 includes one or more of the modules 1141, models 1142, engines 1143, databases 1144, services 1145, applications 1146, or combinations thereof. In some embodiments, the layers 1205-1235 are combined to form fewer layers. In some embodiments, some of the layers 1205-1235 are separated into separate, more numerous layers. In some embodiments, some of the layers 1205-1235 are removed while others may be added.

The IoT platform 1125 is a model-driven architecture. Thus, in certain embodiments, the extensible object model 1250 communicates with each layer 1205-1230 to contextualize site data of the enterprise 1160a-1160n using an extensible object model (or "asset model") and knowledge graphs 251 where the equipment (e.g., edge devices 1161a-1161n) and processes of the enterprise 1160a-1160n are modeled. The knowledge graphs 251 of EOM 1250 are configured to store the models in a central location. The knowledge graphs 251 define a collection of nodes and links that describe real-world connections that enable smart systems. As used herein, a knowledge graph 251: (i) describes real-world entities (e.g., edge devices 1161a-1161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 1161a-1161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 1250 is a collection of application programming interfaces (APIs) that enables seeded semantic object models to be extended. For example, the EOM 1250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 1161a-1161n of an enterprise 1160a-1160n, and the knowledge graphs 251 are input into the EOM 1250 for visualizing the models (e.g., the nodes and links).

The models describe the assets (e.g., the nodes) of an enterprise (e.g., the edge devices 1161a-1161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 1161a-1161n) and the type of data that is being sensed by each sensor. According to various embodiments, a key performance indicator (KPI) framework is used to bind properties of the assets in the extensible object model 1250 to inputs of the KPI framework. Accordingly, the IoT platform 1125 is an extensible, model-driven end-to-end stack including: two-way model sync and secure data exchange between the edge 1115 and the cloud 1105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 1125 is extensible with regards to edge devices 1161a-1161n and the applications 1146 that handle those devices 1161a-1161n. For example, when new edge devices 1161a-1161n are added to an enterprise 1160a-

1160n system, the new devices 1161a-1161n will automatically appear in the IoT platform 1125 so that the corresponding applications 1146 understand and use the data from the new devices 1161a-1161n.

In some cases, asset templates are used to facilitate configuration of instances of edge devices 1161a-1161n in the model using common structures. An asset template defines the typical properties for the edge devices 1161a-1161n of a given enterprise 1160a-1160n for a certain type of device. For example, an asset template of a pump includes modeling the pump having inlet and outlet pressures, speed, flow, etc. The templates may also include hierarchical or derived types of edge devices 1161a-1161n to accommodate variations of a base type of device 1161a-1161n. For example, a reciprocating pump is a specialization of a base pump type and would include additional properties in the template. Instances of the edge device 1161a-1161n in the model are configured to match the actual, physical devices of the enterprise 1160a-1160n using the templates to define expected attributes of the device 1161a-1161n. Each attribute is configured either as a static value (e.g., capacity is 11000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

In certain embodiments, the modeling phase includes an onboarding process for syncing the models between the edge 1115 and the cloud 1105. For example, in one or more embodiments, the onboarding process includes a simple onboarding process, a complex onboarding process, and/or a standardized rollout process. The simple onboarding process includes the knowledge graph 251 receiving raw model data from the edge 1115 and running context discovery algorithms to generate the model. The context discovery algorithms read the context of the edge naming conventions of the edge devices 1161a-1161n and determine what the naming conventions refer to. For example, in one or more embodiments, the knowledge graph 251 receives "TMP" during the modeling phase and determine that "TMP" relates to "temperature." The generated models are then published. In certain embodiments, the complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 1105 and pushing the models to the edge 1115. For example, in some embodiments, a user inputs connections and/or device(s) embodying processing unit(s) of a particular enterprise to define the layout of the enterprise for further processing.

The IoT layer 1205 includes one or more components for device management, data ingest, and/or command/control of the edge devices 1161a-1161n. The components of the IoT layer 1205 enable data to be ingested into, or otherwise received at, the IoT platform 1125 from a variety of sources. For example, in one or more embodiments, data is ingested from the edge devices 1161a-1161n through process historians or laboratory information management systems. The IoT layer 1205 is in communication with the edge connectors 1165a-1165n installed on the edge gateways 1162a-1162n through network 1110, and the edge connectors 1165a-1165n send the data securely to the IoT platform 1205. In some embodiments, only authorized data is sent to the IoT platform 1125, and the IoT platform 1125 only accepts data from authorized edge gateways 1162a-1162n and/or edge devices 1161a-1161n. According to various embodiments, data is sent from the edge gateways 1162a-1162n to the IoT platform 1125 via direct streaming and/or via batch delivery. Further, after any network or system outage, data transfer will resume once communication is re-established and any data missed during the outage will be backfilled from the source system or from a cache of the IoT platform 1125. According to various embodiments, the IoT layer 1205 also includes components for accessing measurements, time series data, alarms, vents, and/or transactional data via a variety of protocols.

The enterprise integration layer 210 includes one or more components for events/messaging, file upload, and/or REST/OData. The components of the enterprise integration layer 210 enable the IoT platform 1125 to communicate with third party cloud applications 1211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 1125. The enterprise integration layer 210 also enables the IoT platform 1125 to communicate with the OT systems 1163a-1163n and IT applications 1164a-1164n of the enterprise 1160a-1160n. Thus, the enterprise integration layer 210 enables the IoT platform 1125 to receive data from the third-party applications 1211 rather than, or in combination with, receiving the data from the edge devices 1161a-1161n directly.

The data pipeline layer 1225 includes one or more components for data cleansing/enriching, data transformation, data calculations/aggregations, and/or API for data streams. Accordingly, in one or more embodiments, the data pipeline layer 1225 pre-processes and/or performs initial analytics on the received data. The data pipeline layer 1225 executes advanced data cleansing routines including, for example, data correction, mass balance reconciliation, data conditioning, component balancing and simulation to ensure the desired information is used as a basis for further processing. The data pipeline layer 1225 also provides advanced and fast computation. For example, in one or more embodiments, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 1225 employs models and templates to define calculations and analytics. Additionally or alternatively, according to various embodiments, the data pipeline layer 1225 employs models and templates to define how the calculations and analytics relate to the assets (e.g., the edge devices 1161a-1161n). For example, in an embodiment, a fan template defines fan efficiency calculations such that every time a fan is configured, the standard efficiency calculation is automatically executed for the fan. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 1161*a*-1161*n*) instance is created, any associated calculation instances are also created with their input and output parameters linked to the appropriate attributes of the asset (e.g., edge device 1161*a*-1161*n*).

According to various embodiments, the IoT platform 1125 supports an emission optimization model including, for example, a curve fitting model, a regression analysis model, a first principles model, an empirical model, an engineered model, a user-defined model, a machine learning model, built-in functions, and/or any other type of analytics model to provide emission optimization related to industrial assets and/or industrial processes.

An emission optimization model may be used to compare current and/or predicted enterprise 1160*a*-1160*n* measurements, market data, and/or static configuration data to identify and/or driver emission optimization opportunities.

According to various embodiments, when an emission optimization opportunity is identified, the IoT platform 1125 provides recommendations about optimal corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics. According to various embodiments, the models are used to accurately predict what will occur before it occurs and interpret the status of the installed base. Thus, the IoT platform 1125 enables operators to quickly initiate emission optimization measures.

According to various embodiments, machine learning methods are applied to train models for emission optimization prediction. According to various embodiments, predictive emission optimization maintenance leverages FDD-based algorithms to continuously monitor individual control and equipment performance for emission optimization. Emission optimization maintenance includes determining an optimal operating option and when it should be performed based on actual conditions rather than time-based maintenance schedule. According to various embodiments, emission optimization analysis selects the right solution based on the company's capital, operational, and/or other requirements. Emission optimization may include determining optimal conditions via adjusting set-points and schedules. The optimized set-points and schedules can be communicated directly to the underlying controllers, which enables automated closing of the loop from analytics to control.

The data insight layer 1220 includes one or more components for time series databases (TDSB), relational/document databases, data lakes, blob, files, images, and videos, and/or an API for data query. According to various embodiments, when raw data is received at the IoT platform 1125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 1225 accesses the data stored in the databases of the data insight layer 1220 to perform analytics, as detailed above.

The application services layer 1225 includes one or more components for rules engines, workflow/notifications, KPI framework, insights (e.g., actionable insights), decisions, recommendations, machine learning, and/or an API for application services. The application services layer 1225 enables building of applications 1146*a*-*d*. The applications layer 1230 includes one or more applications 1146*a*-*d* of the IoT platform 1125. For example, according to various embodiments, the applications 1146*a*-*d* includes a buildings application 1146*a*, a plants application 1146*b*, an aero application 1146*c*, and other enterprise applications 1146*d*. According to various embodiments, the applications 1146 includes general applications for portfolio management, asset management, autonomous control, and/or any other custom applications. According to various embodiments, portfolio management includes the KPI framework and a flexible user interface (UI) builder. According to various embodiments, asset management includes asset performance, asset health, and/or asset predictive maintenance. According to various embodiments, autonomous control includes emission optimization, plantwide optimization, energy optimization and/or predictive maintenance. As detailed above, according to various embodiments, the general applications 1146 is extensible such that each application 1146 is configurable for the different types of enterprises 1160*a*-1160*n* (e.g., buildings application 1146*a*, plants application 1146*b*, aero application 1146*c*, and other enterprise applications 1146*d*).

The applications layer 1230 also enables visualization of performance of the enterprise 1160*a*-1160*n*. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 1235 includes one or more services of the IoT platform 1125. According to various embodiments, the core services 1235 include data visualization, data analytics tools, security, scaling, and monitoring. According to various embodiments, the core services 1235 also include services for tenant provisioning, single login/common portal, self-service admin, UI library/UI tiles, identity/access/entitlements, logging/monitoring, usage metering, API gateway/dev portal, and the IoT platform 1125 streams.

Figure 13:
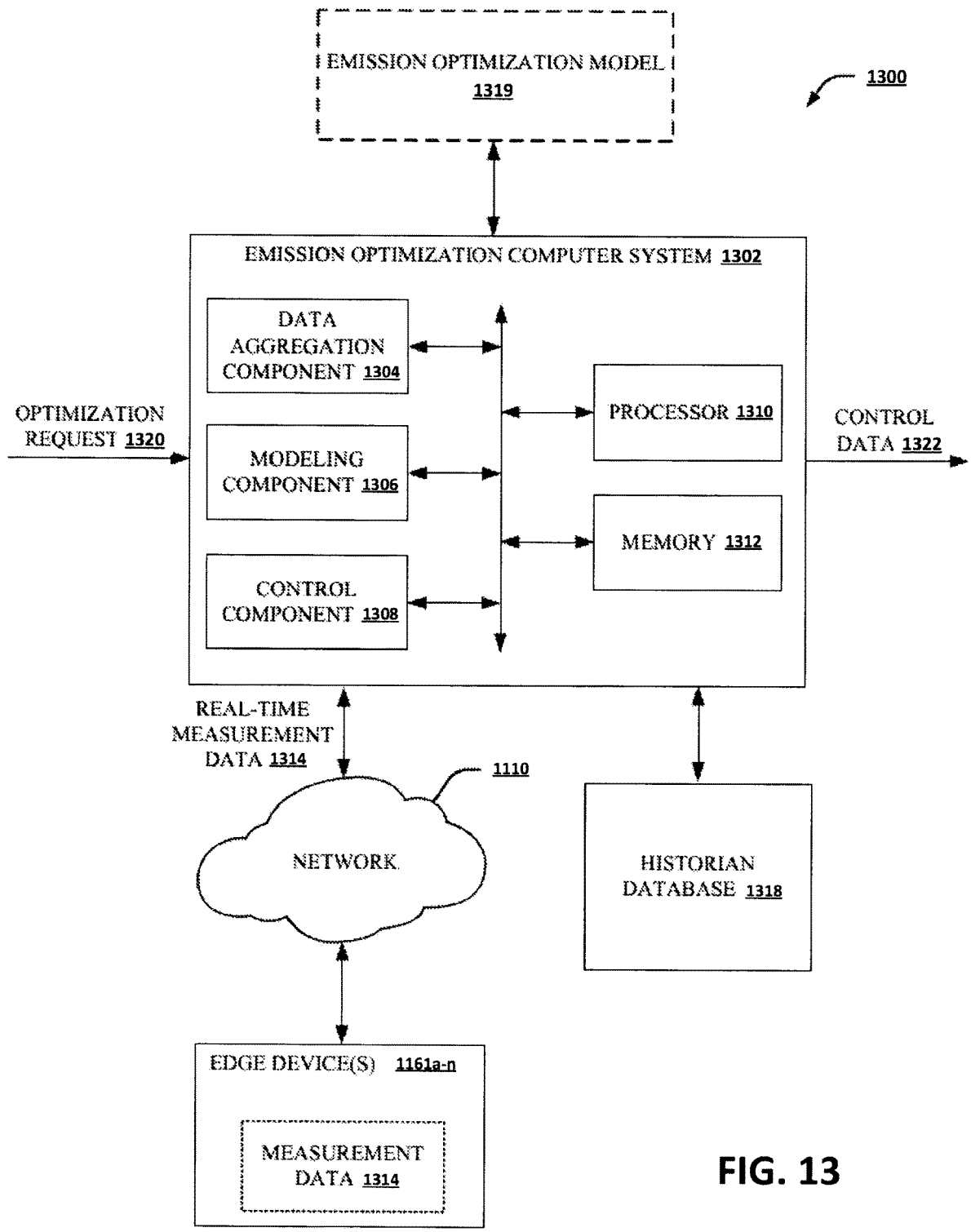
FIG. 13 illustrates a system that provides an exemplary emission optimization computer system, in accordance with one or more embodiments described herein.

FIG. 13 illustrates a system 1300 that provides an exemplary environment according to one or more described features of one or more embodiments of the disclosure. According to one or more embodiments, the system 1300 includes an emission optimization computer system 1302 to facilitate a practical application of data analytics technology and/or digital transformation technology to provide optimization of emissions related to industrial processes and/or industrial assets. In one or more embodiments, the emission optimization computer system 1302 stores and/or analyzes data that is aggregated from one or more industrial assets and/or one or more data sources associated with an industrial system such as, for example, an industrial facility. Additionally, in one or more embodiments, the emission optimization computer system 1302 provides insights, predictions, and/or recommendations related to optimizing emissions using data preprocessing, data augmentation, and/or modeling.

In an embodiment, the emission optimization computer system 1302 is a server system (e.g., a server device) that facilitates a data analytics platform between one or more industrial assets, one or more industrial processes, and/or an industrial facility. In one or more embodiments, the emission optimization computer system 1302 is a device with one or more processors and a memory. In one or more embodiments, the emission optimization computer system 1302 is a computer system from the computer systems 1120. For example, in one or more embodiments, the emission optimization computer system 1302 is implemented via the cloud 1105. The emission optimization computer system 1302 is also related to one or more technologies, such as, for example, emission management technologies, decarbonization technologies, industrial technologies, Internet of Things (IOT) technologies, data modeling technologies, data analytics technologies, digital transformation technologies, cloud computing technologies, cloud database technologies, server technologies, network technologies, enterprise technologies, connected building technologies, private enterprise network technologies, wireless communication technologies, machine learning technologies, artificial intelligence technologies, digital processing technologies, electronic device technologies, computer technologies, aircraft technologies, oil and gas technologies, petrochemical technologies, refinery technologies, process plant technologies, procurement technologies, and/or one or more other technologies.

Moreover, the emission optimization computer system 1302 provides an improvement to one or more technologies such as emission management technologies, decarbonization technologies, industrial technologies, IoT technologies, data modeling technologies, data analytics technologies, digital transformation technologies, cloud computing technologies, cloud database technologies, server technologies, network technologies, enterprise technologies, connected building technologies, private enterprise network technologies, wireless communication technologies, machine learning technologies, artificial intelligence technologies, digital processing technologies, electronic device technologies, computer technologies, aircraft technologies, oil and gas technologies, petrochemical technologies, refinery technologies, process plant technologies, procurement technologies, and/or one or more other technologies. In an implementation, the emission optimization computer system 1302 improves performance of one or more industrial assets, one or more industrial processes, and/or an industrial facility. Additionally or alternatively, the emission optimization computer system 1302 improves performance of a computing device. For example, in one or more embodiments, the emission optimization computer system 1302 improves processing efficiency of a computing device (e.g., a server), reduces power consumption of a computing device (e.g., a server), improves quality of data provided by a computing device (e.g., a server), etc.

The emission optimization computer system 1302 includes a data aggregation component 1304, a modeling component 1306 and/or a control component 1308. Additionally, in one or more embodiments, the emission optimization computer system 1302 includes a processor 1310 and/or a memory 1312. In certain embodiments, one or more aspects of the emission optimization computer system 1302 (and/or other systems, apparatuses and/or processes disclosed herein) constitute executable instructions embodied within a computer-readable storage medium (e.g., the memory 1312). For instance, in an embodiment, the memory 1312 stores computer executable component and/or executable instructions (e.g., program instructions). Furthermore, the processor 1310 facilitates execution of the computer executable components and/or the executable instructions (e.g., the program instructions). In an example embodiment, the processor 1310 is configured to execute instructions stored in the memory 1312 or otherwise accessible to the processor 1310.

The processor 1310 is a hardware entity (e.g., physically embodied in circuitry) capable of performing operations according to one or more embodiments of the disclosure. Alternatively, in an embodiment where the processor 1310 is embodied as an executor of software instructions, the software instructions configure the processor 1310 to perform one or more algorithms and/or operations described herein in response to the software instructions being executed. In an embodiment, the processor 1310 is a single core processor, a multi-core processor, multiple processors internal to the emission optimization computer system 1302, a remote processor (e.g., a processor implemented on a server), and/or a virtual machine. In certain embodiments, the processor 1310 is in communication with the memory 1312, the data aggregation component 1304, the modeling component 1306 and/or the control component 1308 via a bus to, for example, facilitate transmission of data among the processor 1310, the memory 1312, the data aggregation component 1304, the modeling component 1306 and/or the control component 1308. The processor 1310 may be embodied in a number of different ways and, in certain embodiments, includes one or more processing devices configured to perform independently. Additionally or alternatively, in one or more embodiments, the processor 1310 includes one or more processors configured in tandem via a bus to enable independent execution of instructions, pipelining of data, and/or multi-thread execution of instructions.

The memory 1312 is non-transitory and includes, for example, one or more volatile memories and/or one or more non-volatile memories. In other words, in one or more embodiments, the memory 1312 is an electronic storage device (e.g., a computer-readable storage medium). The memory 1312 is configured to store information, data, content, one or more applications, one or more instructions, or the like, to enable the emission optimization computer system 1302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the emission optimization computer system 1302 (e.g., the data aggregation component 1304 of the emission optimization computer system 1302) receives measurement data 1314 from the edge devices 1161*a*-1161*n*. The measurement data 1314 can include one or more measurements, operational data, sensor data, real-time data, event data, industrial process data, and/or other data related to one or more edge devices from the edge devices 1161*a*-1161*n*. For example, the measurement data 1314 can include one or more real-time measurements captured and/or provided by one or more sensors, one or more cameras, and/or one or more other data capture devices related to an industrial facility. The one or more sensors, the one or more cameras, and/or the one or more other data capture devices can be located within the industrial facility. Additionally or alternatively, the one or more sensors, the one or more cameras, and/or the one or more other data capture devices can be located in an outdoor environment proximate to the industrial facility. In one or more embodiments, at least a portion of the measurement data 1314 corresponds to emission data related to the edge devices 1161a-1161n. For example, the measurement data 1314 can include one or more measurements, operational data, sensor data, real-time data, event data, industrial process data, and/or other data related to emissions such as, for example, gas emissions, carbon emissions, carbon dioxide emissions, hydrocarbon emissions, nitrous oxide emissions, methane emissions, greenhouse gases, pollutants, and/or other emissions related to the edge devices 1161a-1161n.

In one or more embodiments, at least a portion of the measurement data 1314 is associated with one or more industrial processes associated with the edge devices 1161a-1161n. For example, in one or more embodiments, at least a portion of the measurement data 1314 is generated and/or employed by one or more industrial processes associated with the edge devices 1161a-1161n. The edge devices 1161a-1161n include, in one or more embodiments, one or more industrial assets, one or more sensors, one or more cameras, one or more IoT devices (e.g., one or more industrial IoT devices), one or more gas monitoring devices, one or more gas leak sensing devices, one or more gas cloud imaging devices, one or more databases associated with one or more industrial processes, one or more flanges, one or more pressure relief devices, one or more pumps, one or more burners, one or more boilers, one or more actuators, one or more processors, one or more computers, one or more valves, one or more motors, one or more compressors, one or more turbines, one or more ducts, one or more heaters, one or more chillers, one or more coolers, one or more furnaces, one or more heat exchangers, one or more fans, one or more blowers, one or more conveyor belts, one or more vehicle components, one or more displays, one or more HVAC components, industrial equipment, factory equipment, and/or one or more other devices that are connected to the network 1110 for collecting, sending, and/or receiving information. In one or more embodiments, the edge device 1161a-1161n include, or is otherwise in communication with, one or more controllers for selectively controlling a respective edge device 1161a-1161n and/or for sending/receiving information between the edge devices 1161a-1161n and the emission optimization computer system 1302 via the network 1110. Additionally, one or more edge devices of the edge devices 1161a-1161n may be an emissions source and/or may monitor an emissions source that produces or potentially produces emissions. For example, emissions related to a burner and/or a boiler may be monitored via one or more sensors and/or one or more other data capture device configured for collecting, sending, and/or receiving information related to the burner and/or the boiler.

In certain embodiments, at least one edge device from the edge devices 1161a-1161n incorporates encryption capabilities to facilitate encryption of one or more portions of the measurement data 1314. Additionally, in one or more embodiments, the emission optimization computer system 1302 (e.g., the data aggregation component 1304 of the emission optimization computer system 1302) receives the measurement data 1314 via the network 1110. In one or more embodiments, the network 1110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 1161a-1161n are associated with an industrial environment (e.g., an industrial facility, etc.). Additionally or alternatively, in one or more embodiments, the edge devices 1161a-1161n are associated with components of the edge 1115 such as, for example, one or more enterprises 1160a-1160n.

In one or more embodiments, the data aggregation component 1304 aggregates the measurement data 1314 from the edge devices 1161a-1161n. For instance, in one or more embodiments, the data aggregation component 1304 can aggregate the measurement data 1314 into a historian database 1318. In certain embodiments, the data aggregation component 1304 can aggregate the measurement data 1314 into multivariate data related to the edge devices 1161a-1161n. For example, in one or more embodiments, the historian database 1318 stores at least a portion of the measurement data 1314 associated with two or more variables (e.g., two or more features) associated with the edge devices 1161a-1161n. The historian database 1318 is a cache memory (e.g., a database structure) that dynamically stores the measurement data 1314 based on interval of time, industrial process, industrial asset, and/or industrial domain. For instance, in one or more embodiments, the multivariate time series database 1318 stores the measurement data 1314 for one or more intervals of time (e.g., 1 minute to 12 minutes, 1 hour to 24 hours, 1 day to 31 days, 1 month to 12 months, etc.) and/or for one or more industrial assets. Additionally or alternatively, the historian database 1318 may store data related to historical modification operations and/or work order data related to the edge devices 1161a-1161n and/or related industrial operations.

In one or more embodiments, the data aggregation component 1304 repeatedly updates data of the historian database 1318 in real-time or approximately in real-time based on the measurement data 1314 provided by the edge devices 1161a-1161n. For instance, in one or more embodiments, the data aggregation component 1304 can repeatedly store new data and/or modified data associated with the measurement data 1314 during one or more intervals of time. In one or more embodiments, the data aggregation component 1304 repeatedly scans the edge devices 1161a-1161n to determine new data for storage in the historian database 1318.

In one or more embodiments, the data aggregation component 1304 formats one or more portions of the measurement data 1314. For instance, in one or more embodiments, the data aggregation component 1304 provides a formatted version of the measurement data 1314 to the historian database 1318. In an embodiment, the formatted version of the measurement data 1314 is formatted with one or more defined formats associated with the one or more intervals of time, one or more industrial assets, one or more industrial processes, and/or one or more industrial facilities. A defined format is, for example, a structure for data fields of the historian database 1318. In various embodiments, the formatted version of the measurement data 1314 is stored in the historian database 1318. In one or more embodiments, the data aggregation component 1304 groups data from the measurement data 1314 based on corresponding features and/or attributes of the data. In one or more embodiments, the data aggregation component 1304 groups data from the measurement data 1314 based on corresponding identifiers (e.g., a matching industrial asset, a matching industrial process, a matching industrial facility, etc.) for the measurement data 1314. In one or more embodiments, the data aggregation component 1304 employs one or more locality-sensitive hashing techniques to group data from the measurement data 1314 based on similarity scores and/or calculated distances between different data in the measurement data 1314.

In one or more embodiments, the emission optimization computer system 1302 (e.g., the modeling component 1306 of the emission optimization computer system 1302) receives an optimization request 1320. The optimization request 1320 can be utilized as a trigger to initiate modeling associated with an emission optimization model 1319. The emission optimization model 1319 can be communicatively coupled to or integrated within the emission optimization computer system 1302 (e.g., the modeling component 1306 of the emission optimization computer system 1302). Additionally, the emission optimization computer system 1302 (e.g., the modeling component 1306 of the emission optimization computer system 1302) can employ the emission optimization model 1319 to provide emission optimization related to the edge devices 1161a-1161n. For example, the emission optimization computer system 1302 (e.g., the modeling component 1306 of the emission optimization computer system 1302) can employ the emission optimization model 1319 to provide emission optimization related to one or more industrial assets, one or more industrial processes, and/or one or more industrial facilities.

In one or more embodiments, the optimization request 1320 is received in response to an action (e.g., a user-initiated action, modification of an interactive graphical element, etc.) initiated via an electronic interface of a computing device. In one or more embodiments, the request 1320 is received in response to an action initiated via a processing unit (e.g., an edge device, a controller, etc.) associated with the one or more industrial processes. In one or more embodiments, the optimization request 1320 is received in response to a schedule for the one or more industrial processes satisfying a defined criterion (e.g., a schedule interval for the one or more industrial processes being above a threshold timer). In one or more embodiments, the optimization request 1320 is received in response to detection of a possible emission inefficiency related to the one or more industrial processes (e.g., in response to an emissions index for the one or more industrial processes being greater than a specified threshold level). In one or more embodiments, the optimization request 1320 is automatically received in response to another data-driven trigger.

The emission optimization model 1319 is a model such as an algorithmic model, a statistical model (e.g., a regression model, a classification model, a clustering model, etc.), a machine learning model (e.g., a deep learning model, a neural network model, etc.), or another type of model configured to provide insights, predictions, and/or recommendations for the emission optimization related to the edge devices 1161a-1161n. In one or more embodiments, the emission optimization model 1319 is configured based on a set of emission objectives and/or a set of emission constraints.

The set of emission objectives can include one or more objectives and/or one or more rules for the edge devices 1161a-1161n to reduce emissions related to one or more industrial assets, one or more industrial processes, and/or one or more industrial facilities. Additionally or alternatively, the modeling component 1306 determines the set of emission objectives for the industrial domain related to the edge devices 1161a-1161n. For example, the set of emission objectives can include one or more baseline settings for the one or more industrial processes, one or more operational targets for the one or more industrial processes, one or more operational baseline thresholds for the one or more industrial processes, an emissions goal for the one or more industrial processes, a percentage of reduction in emissions for the one or more industrial processes, a cost savings objective related to the one or more industrial processes, and/or one or more other emission objectives.

The set of emission constraints can include a set of internal constraints related to the edge devices 1161a-1161n and/or a set of external constraints related to one or more external sources. For example, the set of internal constraints can include capital for an enterprise associated with the one or more industrial processes, resources available for the one or more industrial processes, an infrastructure for an industrial facility associated with the one or more industrial processes, risk tolerance rules for the one or more industrial processes, implementation timelines for achieving the emission optimization associated with the one or more industrial processes, and/or one or more other internal constraints. The set of external constraints can include regulatory information for a geographic location of an industrial facility associated with the one or more industrial processes, economic information for the geographic location, social information for the geographic location, technical information for an operating environment associated with the one or more industrial processes, legal information for the operating environment, environmental information for the geographic location or the operating environment, and/or one or more other external constraints.

In one or more embodiments, the modeling component 1306 determines the set of emission constraints for an industrial domain related to the edge devices 1161a-1161n. For example, in one or more embodiments, the modeling component 1306 determines the set of emission constraints for an industrial domain related to one or more industrial processes that produce one or more industrial process products. The industrial domain can correspond to an industrial facility, a set of industrial facilities, a subarea of an industrial facility, a geographic location associated with one or more industrial facilities, an enterprise, or another type of industrial domain. The modeling component 1306 can determine the set of emission constraints based on user input received via a dashboard visualization rendered on a display of a user device, historical data stored in one or more historian databases, third-party data sources, and/or third-party systems. Additionally or alternatively, the modeling component 1306 determines the set of emission constraints based at least in part on a set of operational baseline thresholds for the one or more industrial processes. The set of operational baseline thresholds can be a set of predicted baseline thresholds in order to maintain and/or optimize emissions related to the one or more industrial processes.

In one or more embodiments, the modeling component 1306 configures the emission optimization model 1319 based at least in part on the set of emission constraints and/or the set of emission objectives. For example, in an embodiment where the emission optimization model 1319 is an algorithmic model or a statistical model, the modeling component 1306 can configure variables, probability distributions, rules, and/or other parameters based on the set of emission constraints and/or the set of emission objectives. In another embodiment where the emission optimization model 1319 is a machine learning model, the modeling component 1306 can train the emission optimization model 1319 based at least in part on the set of emission constraints and/or the set of emission objectives. For example, the modeling component 1306 can determine and/or tune one or more parameters (e.g., one or more hyperparameters, one or more weights, etc.) for one or more learning processes associated with the emission optimization model 1319 based at least in part on the set of emission constraints and/or the set of emission objectives.

In one or more embodiments, the optimization request 1320 is a request to optimize carbon emissions related to the edge devices 1161a-1161n. For example, the optimization request 1320 can be a request to optimize carbon emissions related to one or more industrial processes, one or more industrial assets, and/or one or more industrial facilities associated with an industrial domain. In one or more embodiments, in response to the optimization request 1320, the modeling component 1306 applies the emission optimization model 1319 to at least a portion of the measurement data 1314 to determine one or more operational modifications for the one or more industrial processes, the one or more industrial assets, and/or the one or more industrial facilities that satisfy the set of emission constraints and/or optimize at least one non-emission constraint. The at least one non-emission constraint can be related to constraints such as, but not limited to, capital constraints, regulatory constraints, economic constraints, social constraints, technical constraints, legal constraints, environmental constraints, and/or one or more other non-emission constraints that are unrelated to emissions provided by an industrial asset and/or an industrial process.

In one or more embodiments, the data aggregation component 1302 captures at least a portion of the real-time measurement data via a set of sensors configured to monitor real-time emissions related to the one or more industrial processes. Furthermore, the modeling component 1306 applies the emission optimization model 1319 to the portion of the real-time measurement data associated with the set of sensors to determine the one or more operational modifications for the one or more industrial processes that satisfy the set of emission constraints and/or optimize at least one non-emission constraint. Additionally or alternatively, the data aggregation component 1302 captures least a portion of the real-time measurement data via a set of gas cloud imaging cameras configured to monitor real-time emissions related to the one or more industrial processes. Furthermore, the modeling component 1306 additionally or alternatively applies the emission optimization model 1319 to the portion of the real-time measurement data associated with the set of gas cloud imaging cameras to determine the one or more operational modifications for the one or more industrial processes that satisfy the set of emission constraints and/or optimize at least one non-emission constraint. Additionally or alternatively, the data aggregation component 1302 captures at least a portion of the real-time measurement data via a set of gas leak sensing devices configured to monitor for or predict gas leaks related to the one or more industrial processes. Furthermore, the modeling component 1306 additionally or alternatively applies the emission optimization model 1319 to the portion of the real-time measurement data associated with the set of gas leak sensing devices to determine the one or more operational modifications for the one or more industrial processes that satisfy the set of emission constraints and/or optimize at least one non-emission constraint. In some embodiments, the emissions constraints embody a first type of any number of different types of constraints, each constraint corresponding to a different parameter type utilized in optimization, as described herein.

In one or more embodiments, the data aggregation component 1302 additionally or alternatively determines market data that comprises real-time gas prices for gas employed by the one or more industrial processes, real-time electricity prices associated with the one or more industrial processes, carbon credits available for a location associated with the industrial domain, real-time interest rate data associated with a banking system associated with the location, and/or other real-time market data. Furthermore, the modeling component 1306 additionally or alternatively applies the emission optimization model 1319 to the market data to determine the one or more operational modifications for the one or more industrial processes that satisfy the set of emission constraints and/or optimize at least one non-emission constraint. In one or more embodiments, the data aggregation component 1302 additionally or alternatively determines static configuration data that includes resource data related to resource material employed by the one or more industrial processes, costs data related to costs associated with the one or more industrial processes, enterprise data related to assets for an enterprise associated with the one or more industrial processes, regulatory data related to regulatory incentives for a geographic location of an industrial facility associated with the one or more industrial processes, and/or other static configuration data. Furthermore, the modeling component 1306 additionally or alternatively applies the emission optimization model 1319 to the static configuration data to determine the one or more operational modifications for the one or more industrial processes that satisfy the set of emission constraints and/or optimize at least one non-emission constraint. In one or more embodiments, the data aggregation component 1302 additionally or alternatively determines location data associated with a geographic location of an industrial facility associated with the one or more industrial processes Based on the one or more operational modifications determined by the emission optimization model 1319, the control component 1308 performs one or more actions associated with the one or more industrial processes. The one or more actions can be triggered and/or described by control data 1322 generated by the control component 1308. For example, the control component 1308 can transmit a control signal (e.g., a control signal represented by the control data 1322) to a controller associated with the one or more industrial processes. The control signal can be configured based on the one or more operational modifications. For example, the control signal can include a control command to alter one or more operational settings for the one or more industrial processes in order to optimize emissions related to the one or more industrial processes. In one or more embodiments, the control component 1308 transmits the control signal in response to a level of risk associated with the one or more operational modifications being below a defined risk threshold for the one or more industrial processes. In one or more embodiments, the control component 1308 generates the control data 1322 in response to a determination that the emission optimization model 1319 yields a particular modification to reduce carbon emissions. For example, the control component 1308 can generate the control data 1322 in response to a determination that a certain reduction of carbon emissions and/or other carbon emissions criteria is achieved.

In an embodiment, an action from the one or more actions includes generating a user-interactive electronic interface that renders a visual representation of data associated with the one or more operational modifications. In another embodiment, an action from the one or more actions includes transmitting, to a computing device, one or more notifications associated with the one or more operational modifications. In another embodiment, an action from the one or more actions includes providing an optimal process condition for the one or more industrial processes based on the one or more operational modifications. For example, an action from the one or more actions includes adjusting a set-point and/or a schedule for the one or more industrial processes based on the one or more operational modifications. In another embodiment, an action from the one or more actions includes generating one or more work orders (e.g., one or more work order notifications) based on the one or more operational modifications.

In certain embodiments, an action from the one or more actions includes reconfiguring and/or retraining the emission optimization model 1319 based on the one or more operational modifications. For example, in certain embodiments, one or more rules, one or more weights and/or one or more parameters for the emission optimization model 1319 is updated based on the one or more operational modifications. In certain embodiments, an action from the one or more actions includes configuring a dashboard visualization (e.g., based on the one or more operational modifications) to provide individual control of the one or more industrial assets associated with the one or more industrial processes via the dashboard visualization. For example, in certain embodiments, the dashboard visualization is configured to receive input from a user to modify one or more parameters of one or more industrial assets based on a recommendation related to the one or more operational modifications. In another example, in certain embodiments, the dashboard visualization is configured to present a notification to allow acceptances of one or more changes related to one or more industrial assets in order to provide the one or more operational modifications with respect to the one or more industrial processes. In certain embodiments, an action from the one or more actions includes configuring the dashboard visualization (e.g., based on the one or more operational modifications) to facilitate creation of one or more work orders for the one or more industrial assets. In another embodiment, an action from the one or more actions includes an action associated with the application services layer 1225, the applications layer 1230, and/or the core services layer 1235 based on the one or more operational modifications.

In certain embodiments, the control component 1308 records data associated with the one or more operational modifications and/or related timestamp data in a decarbonization historian database. The data can be included in the control data 1322. Additionally, the control component 1308 can generate a work order notification for the one or more industrial processes based at least in part on the one or more operational modifications. In response to the one or more operational modifications being applied to the one or more industrial processes via the work order notification, the control component 1308 can update the data in the decarbonization historian database based at least in part on the work order notification.

Figure 14:
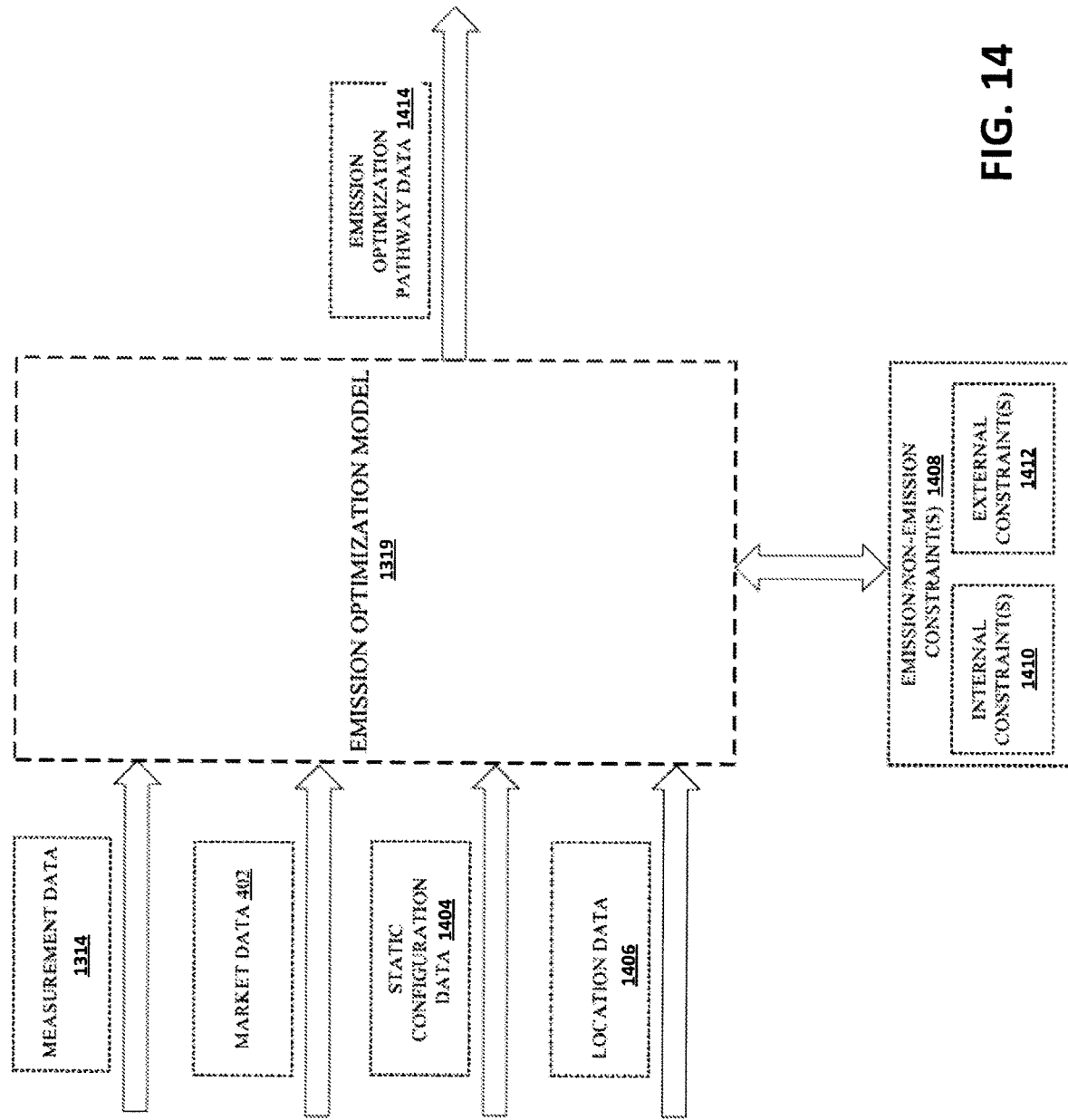
FIG. 14 illustrates an exemplary emission optimization model, in accordance with one or more embodiments described herein.

FIG. 14 illustrates the emission optimization model 1319 according to one or more described features of one or more embodiments of the disclosure. According to one or more embodiments, the emission optimization model 1319 receives measurement data 1314, market data 1402, static configuration data 1404, and/or location data 1406. The measurement data 1314 and/or the market data 1402 can be real-time data provided to the emission optimization model 1319. Additionally, in one or more embodiments, the emission optimization model 1319 is configured based on emission/non-emission constraint(s) 1408. The emission/non-emission constraint(s) 1408 include one or more emission constraints and/or one or more non-emission constraints. In various embodiments, the set of emission constraints included in the emission/non-emission constraints 1408 can include constraints configured based on information related to predictions for operational settings, pre-optimized model input, switching to certain types of fuels for an industrial process and with respect to predicted emissions, etc. Additionally or alternatively, the set of emission constraints included in the emission/non-emission constraints 1408 can include constraints related to risk mitigation factors, key indicators, and/or mitigation actions to minimize unplanned maintenance and/or process shutdown. In one or more embodiments, the emission/non-emission constraint(s) 1408 include a set of internal constraints 1410 and/or a set of external constraints 1412. In one or more embodiments, modeling component 1306 configures the emission optimization model 1319 based at least in part on a set of emission constraints and at least one other non-emission constraint included in the emission/non-emission constraint(s) 1408.

In an embodiment, the emission optimization model 1319 is an algorithmic model and/or a statistical model such as, for example, a regression model, a classification model, a clustering model, or another type of model configured to provide emission optimization insights and/or recommendations related to the measurement data 1314, the market data 1402, the static configuration data 1404, and/or the location data 1406 according to the emission/non-emission constraint(s) 1408 (e.g., the set of internal constraints 1410 and/or the set of external constraints 1412). In another embodiment, the emission optimization model 1319 is a machine learning model such as, for example, a deep learning model, a neural network model, or another type of model configured to provide emission optimization insights, predictions and/or recommendations related to the measurement data 1314, the market data 1402, the static configuration data 1404, and/or the location data 1406 according to the emission/non-emission constraint(s) 1408 (e.g., the set of internal constraints 1410 and/or the set of external constraints 1412).

The measurement data 1314 includes one or more measurements (e.g., one or more real-time measurements) with respect to real-time emissions and/or real-time operations with respect to one or more industrial processes related to one or more industrial assets associated with one or more industrial facilities. In one or more embodiments, the measurement data 1314 is electronically managed data representing operations of one or more industrial processes and/or one or more industrial assets within one or more industrial facilities. At least a portion of the measurement data 1314 can be captured via a set of sensors, a set of gas cloud imaging cameras, a set of gas leak sensing devices, a set of weather monitoring devices, and/or one or more other data capture devices configured to monitor real-time emissions related to the one or more industrial processes. For example, the set of sensors, the set of gas cloud imaging cameras, the set of gas leak sensing devices, the set of weather monitoring devices, and/or the one or more other data capture devices can be positioned within an industrial facility such as, for example, in close proximity to potential leak sources, in close proximity or coupled to industrial assets, at one or more locations associated with one or more industrial processes, etc. Additionally or alternatively, the set of sensors, the set of gas cloud imaging cameras, the set of gas leak sensing devices, the set of weather monitoring devices, and/or the one or more other data capture devices can be positioned can be positioned separate from industrial components monitoring for total emissions related to the industrial facility in order to determine gross emissions from all of the industrial components in real-time.

In some embodiments, the set of sensors, the set of gas cloud imaging cameras, the set of gas leak sensing devices, the set of weather monitoring devices, and/or the one or more other data capture devices may monitor, observe, measure, and/or analyze a flare stack of an industrial facility. In some embodiments, the industrial facility embodies a processing plant associated with a particular operational goal. For example, in some embodiments, the industrial facility embodies a processing plant including any number of processing unit(s) that, alone or in combination, perform a particular industrial process. In some embodiments, the industrial facility includes or embodies an oil refinery, petrochemical plant, chemical processing plant, or other plant that converts one or more ingredient(s) into a final product by performing particular operations that utilize, process, manipulate, and/or otherwise transform the ingredient(s). In some embodiments, the industrial facility includes the flare stack as a particular processing unit thereof. The flare stack may be used to flare and/or vent one or more gases. These gases may include, but are not limited to, greenhouse gases. Flaring of gases may generate a flame.

In some embodiments, a flame associated with a flare stack may be associated with flaring. Flaring involves the igniting and burning of concentrations of flammable gases. A gas may be comprised of a plurality of concentrations of individual gases, and some of these concentrations of individual gases may be flammable. Alternatively, a gas may be comprised of a concentration of an individual gas, which may or may not be flammable. In some embodiments, a gas may contain greenhouse gases, such as hydrocarbons. The hydrocarbons may be ignited by an ignition source, such as a pilot flame, when the gas passes by the ignition source. The ignited gas(es) may be referred to as flares, and this process may be referred to as flaring. In embodiments with gases comprising hydrocarbons, the flaring of hydrocarbons will include lower emissions than the venting of the same gas(es). This is because flaring converts the hydrocarbons in the gas(es) to CO2 and water while venting does not change the composition of the waste gas to water. Thus, the flaring may reduce the emissions of hydrocarbons into the atmosphere.

In one or more embodiments, the industrial facility receives and/or processes ingredients as inputs to create a final product, such as a hydrocarbon processing plant. The industrial facility may also generate waste gasses as a result of creating the final product. In various embodiments, waste gasses may be released to atmosphere, such as through the flare stack. Alternatively, waste gases may be flared when being released to atmosphere. Additionally, or alternatively, flaring and venting of gases may occur at locations within the industrial facility and/or external to the industrial facility other than the flare stack. For example, smaller quantities of gases at other locations may be released or may leak into the atmosphere. In some embodiments, locations other than the flare stack where gases may be vented and/or flared may include well heads, safety release valves, pipe headers, and/or the like.

In one or more embodiments, the set of sensors, the set of gas cloud imaging cameras, the set of gas leak sensing devices, the set of weather monitoring devices, and/or the one or more other data capture devices monitor a flame and/or related gas emissions, for example associated with a flaring and/or a venting. In some embodiments, the gas cloud imaging cameras may be configured to capture images and/or video in one or more spectrums of light. For example, the gas cloud imaging cameras may be configured to capture images and/or video in the visible spectrum. Additional, and/or alternatively, the gas cloud imaging cameras may be configured to capture images and/or video in the infrared spectrum.

In some embodiments, the gas cloud imaging cameras may be configured to perform or execute one or more operations and/or functions with determining a type, quantity, and/or volume of gas flared and/or emitted. For example, the gas cloud imaging cameras may capture both visible light and infrared light to generate images and/or video of flaring. Based on these images and/or video of flaring, the gas cloud imaging cameras may determine a type of gas being in a flame as well as a volume of gas flared. In another example with a gas emission that is vented and not flared, the gas cloud imaging cameras may capture both visible light and infrared light to generate images and/or video of venting. Based on these images and/or video of venting, the gas cloud imaging cameras may determine a type of gas being in a flame as well as a volume of gas flared. However, it will be appreciated that any number of sensor(s), sensor type(s), and/or the like may be utilized to monitor operations of a particular industrial process and/or a particular industrial facility.

The industrial facility in some embodiments includes any number of individual processing units. The processing units may each embody an industrial asset that performs a particular function during operation of the industrial facility. For example, in the example context of a particular oil refinery embodying the industrial facility, the processing units may include a crude processing unit, a hydrotreating unit, an isomerization unit, a vapor recovery unit, a catalytic cracking unit, a aromatics reduction unit, a visbreaker unit, a storage tank, a blender, and/or the like that perform a particular operation for transforming, storing, and/or otherwise handling one or more input ingredient(s). In some embodiments, each individual unit embodying a component of the industrial facility is associated with a determinable location associated with the location data 1406. The location data 1406 in some embodiments represents an absolute position (e.g., global positioning system (GPS) coordinates, latitude and longitude locations, and/or the like) or a relative position (e.g., a point representation of the location of an industrial asset from a local origin point corresponding to the industrial facility). In some embodiments, an industrial asset includes or otherwise is associated with a location sensor and/or software-driven location services that provide the location data representing the location corresponding to that unit.

In other embodiments, the location data 1406 additionally or alternatively includes a geographic location or a geographic region of the industrial facility. For example, in some embodiments, the industrial facility itself is associated with a determinable location. The determinable location of the industrial facility in some embodiments represents an absolute position (e.g., GPS coordinates, latitude and longitude locations, an address, and/or the like) or a relative position of the industrial facility (e.g., an identifier representing the location of the industrial facility as compared to one or more other plants, an enterprise headquarters, or general description in the world for example based at least in part on continent, state, or other definable region). In some embodiments, the industrial facility includes or otherwise is associated with a location sensor and/or software-driven location services that provide the location data corresponding to the plant 102.

The market data 1402 includes real-time gas cost data (e.g., gas prices) corresponding to gas employed by the one or more industrial processes, real-time electricity cost data (e.g., electricity prices) corresponding to the one or more industrial processes, carbon credit cost data (e.g., carbon credits) available for a location associated with the location data 1406, real-time interest rate data associated with a banking system associated with the location data 1406, other real-time data associated with the location data 1406, and/or real-time market data that enable operation of the one or more industrial processes. In one example, the market data 1402 includes information related to a real-time natural gas cost data (e.g., natural gas price) for natural gas employed by the one or more industrial processes. In another example, the market data 1402 includes information related to a real-time hydrogen gas cost data (e.g., hydrogen gas price) for hydrogen gas employed by the one or more industrial processes. In yet another example, the market data 1402 includes information related to an offset price for a carbon credit available for a location associated with the location data 1406. In yet another example, the market data 1402 includes information related to a real-time electricity price for electricity provided to the industrial facility associated with the one or more industrial processes. In yet another example, the market data 1402 includes information related to predetermined modeling features for carbon capture and sequestration/storage. In yet another example, the market data 1402 includes information related to electrification by equipment options as carbon dioxide equivalent of electrical power changes. However, it is to be appreciated that, in certain embodiments, the market data 1402 includes other information related to real-time market prices and/or conditions for material, products, and/or services that enable operation of the one or more industrial processes.

The static configuration data 1404 includes resource data related to resource material employed by the one or more industrial processes, costs data related to costs associated with the one or more industrial processes, enterprise data related to assets for an enterprise associated with the one or more industrial processes, regulatory data related to regulatory incentives for the geographic location, and/or other static configuration data. In one example, the static configuration data 1404 includes information related to resources and/materials utilized to perform the one or more industrial processes. The resources and/materials can include information related to a gas type and/or gas compositions for one or more gases employed by the one or more industrial processes. For instance, the static configuration data 1404 can include information related to a content of each of a plurality of constituent components of a gas or fuel being used by the one or more industrial processes. The plurality of constituent components can include, but is not limited to, carbon dioxide, water, nitrous oxide, nitrogen, methane, ethane, propane, i-butane, n-butane, i-pentane, n-pentane, hexane, heptane, octane, nonane, decane, hydrogen sulfide, mercaptans, and/or another constituent component. In one example, the static configuration data 1404 includes information related to properties of the gas such as, for example, a heating value property of a gas, a density of a gas, a chemical composition of a gas, fuel combustion properties of a gas, fuel release properties of gas, and/or another property of a gas. In another example, the static configuration data 1404 includes information related to a project cost to modify and/or execute the one or more industrial processes. In another example, the static configuration data 1404 includes information related to growth, efficiency, and/or decarbonization for one or more projects to modify and/or execute the one or more industrial processes. In one or more embodiments, a project can include adding one or more industrial assets to an industrial facility, modifying one or more industrial assets of an industrial facility, and/or removing one or more assets from an industrial facility. In another example, the static configuration data 1404 includes information related to regulatory incentives for reducing emissions related to the one or more industrial processes. In another example, the static configuration data 1404 includes finance measures for an industrial domain such as, for example, finance measures on carbon dioxide equivalent per dollar invested.

The set of internal constraints 1410 can be related to the edge devices 1161a-1161n, one or more industrial facilities, and/or one or more industrial processes for an enterprise. The set of external constraints 1412 can be related to one or more external sources external from the enterprise. In one or more embodiments, one or more of external constraints from the set of external constraints 1412 can be non-emission constraints that facilitate emission optimization for the edge devices 1161a-1161n, one or more industrial facilities, and/ or one or more industrial processes. For example, the set of internal constraints 1410 can include capital for an enterprise associated with the one or more industrial processes, resources available for the one or more industrial processes, an infrastructure for an industrial facility associated with the one or more industrial processes, risk tolerance rules for the one or more industrial processes, implementation timelines for achieving the emission optimization associated with the one or more industrial processes, and/or one or more other internal constraints. The set of external constraints 1412 can include regulatory information for a geographic location of an industrial facility associated with the one or more industrial processes, economic information for the geographic location, social information for the geographic location, technical information for an operating environment associated with the one or more industrial processes, legal information for the operating environment, environmental information for the geographic location or the operating environment, and/or one or more other external constraints. In one or more embodiments, the emission/non-emission constraint(s) 1408 include and/or are configured based on a set of operational baseline thresholds for the one or more industrial processes. The set of operational baseline thresholds can be a set of predicted baseline thresholds in order to maintain and/or optimize emissions related to the one or more industrial processes. Accordingly, the emission optimization model 1319 can utilize multiple types of constraints simultaneously to facilitate emission optimization for the edge devices 1161a-1161n, one or more industrial facilities, and/or one or more industrial processes.

In one or more embodiments, the modeling component 1306 configures the emission optimization model 1319 based at least in part on the emission/non-emission constraint(s) 1408 including, for example, the set of internal constraints 1410 and/or the set of external constraints 1412. For example, in an embodiment where the emission optimization model 1319 is an algorithmic model or a statistical model, the modeling component 1306 can configure variables, probability distributions, rules, and/or other parameters based at least in part on the emission/non-emission constraint(s) 1408 including, for example, the set of internal constraints 1410 and/or the set of external constraints 1412. In another embodiment where the emission optimization model 1319 is a machine learning model, the modeling component 1306 can train the emission optimization model 1319 based at least in part on the emission/non-emission constraint(s) 1408 including, for example, the set of internal constraints 1410 and/or the set of external constraints 1412. For example, the modeling component 1306 can determine and/or tune one or more parameters (e.g., one or more hyperparameters, one or more weights, etc.) for one or more learning processes associated with the emission optimization model 1319 based at least in part on the emission/non-emission constraint(s) 1408 including, for example, the set of internal constraints 1410 and/or the set of external constraints 1412.

In one or more embodiments, the modeling component 1306 applies the emission optimization model 1319 to the measurement data 1314, the market data 1402, the static configuration data 1404, and/or the location data 1406 to determine emission optimization pathway data 1414 that at least satisfy the set of emission constraints of the emission/non-emission constraint(s) 1408 including, for example, the set of internal constraints 1410 and/or the set of external constraints 1412. Additionally or alternatively, the modeling component 1306 applies the emission optimization model to the measurement data 1314, the market data 1402, the static configuration data 1404, and/or the location data 1406 to optimize the at least one non-emission constraint of the emission/non-emission constraint(s) 1408. Accordingly, the emission optimization model 1319 can utilize the measurement data 1314 together with other data such as the market data 1402, the static configuration data 1404, and/or the location data 1406 to determine the emission optimization pathway data 1414. In one or more embodiments, a portion of the measurement data 1314, the market data 1402, the static configuration data 1404, and/or the location data 1406 can include historical measurement data and/or historical emission optimization pathway data (e.g., historical work order data, historical modifications, etc.) that can be utilized by the emission optimization model 1319 to determine the emission optimization pathway data 1414.

The emission optimization pathway data 1414 can include information related to a minimum total cost to achieve a certain degree of emission optimization for the one or more industrial processes, information related to a minimum capital investment to achieve a certain degree of emission optimization for the one or more industrial processes, information related to a lowest amount of risk to achieve a certain degree of emission optimization for the one or more industrial processes, information related to a achieving a certain degree of regulatory compliance for the one or more industrial processes, information related emissions for the emission optimization for the one or more industrial processes, and/or other emission optimization pathway data 1414. In one or more embodiments, the emission optimization pathway data 1414 includes an optimal pathway including one or more modifications for one more industrial processes and/or one or more industrial assets to achieve a certain degree of emission optimization. In one or more embodiments, the emission optimization pathway data 1414 includes one or more actions to perform with respect to the one or more industrial processes and/or one or more industrial assets to achieve a certain degree of emission optimization. In one or more embodiments, the emission optimization pathway data 1414 includes one or more operational modifications for the one or more industrial processes that satisfy the set of emission constraints and optimize the at least one non-emission constraint. In one or more embodiments, the emission optimization pathway data 1414 includes data for a decarbonization historian to facilitate execution of the emission optimization with respect to the one or more industrial processes and/or one or more industrial assets. In one or more embodiments, the emission optimization pathway data 1414 includes work order data to facilitate execution of the emission optimization with respect to the one or more industrial processes and/or one or more industrial assets.

Additionally or alternatively, in some embodiments, the emission optimization pathway data 1414 is optimized in a manner that optimizes a plurality of target parameters for optimization, including the emission optimization and one or more other target parameter optimization(s) (e.g., highest emissions reduction while remaining safe and at a lowest cost over a particular time interval). For example, the emission optimization pathway data 1414 can include a modification plan for one or more industrial processes, one or more industrial assets, and/or one or more industrial facilities that is optimized for emissions and one or more other non-emission parameter considerations (e.g., costs, etc.). The emission optimization pathway data 1414 can additionally or alternatively be determined based on actual units of an industrial facility, a location of an industrial facility, availability of resources at the location, etc. Moreover, the emission optimization model 1319 can learn from prior determined modifications associated with historical optimization pathway data and/or data stored in the historian database 1318. In one or more embodiments, one or more portions of the emission optimization pathway data 1414 can be provided to one or more production models associated with one or more industrial processes and/or one or more industrial assets. For example, fuel blending information can be included in the emission optimization pathway data 1414 and can be provided to one or more production models to optimize site-wide operations and/or industrial processes at a minimal carbon dioxide equivalent tonne per tonne or barrel of crude oil. In one or more embodiments, one or more portions of the emission optimization pathway data 1414 can include emissions characterization factors and/or benchmarks against baselines (in-network and/or out-of-network) to prioritize bad actors for industrial processes and/or to determine optimal practices for knowledge sharing, capture and improvement.

Figure 15:
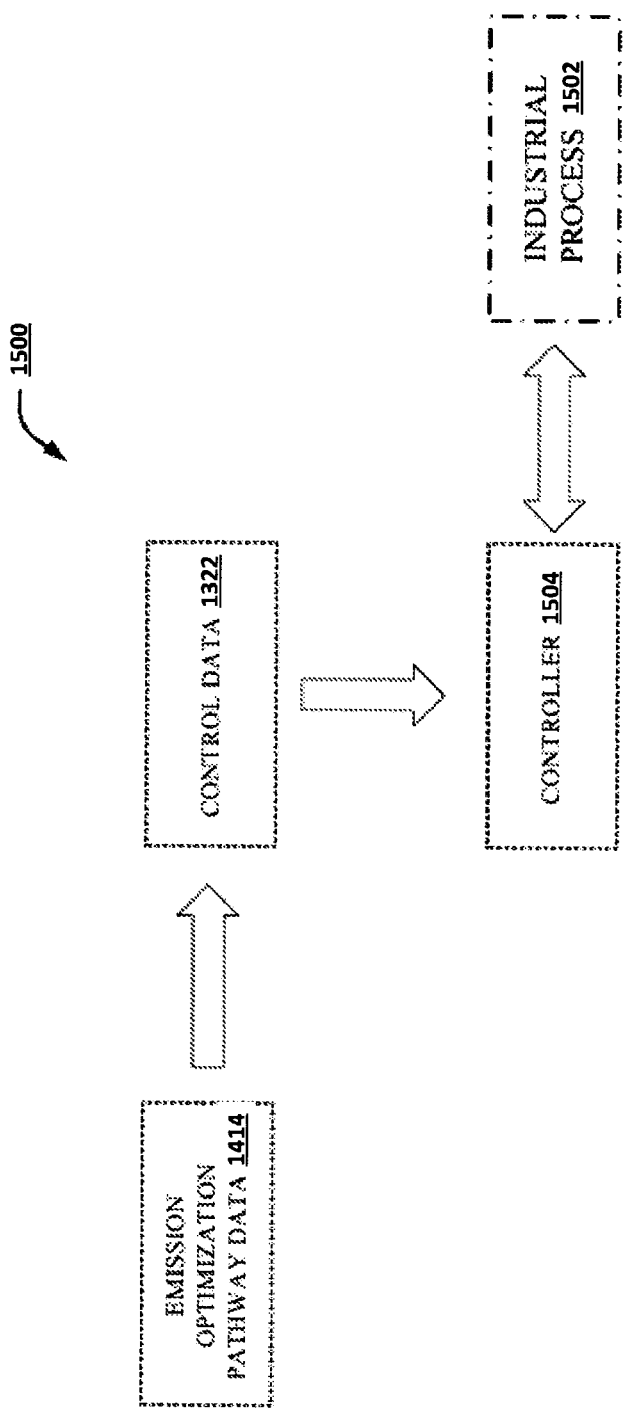
FIG. 15 illustrates a system associated with a controller, in accordance with one or more embodiments described herein.

FIG. 15 illustrates an industrial process 1502 according to one or more described features of one or more embodiments of the disclosure. In one or more embodiments, the industrial process 1502 is an industrial process for an industrial facility (e.g., an industrial plant). Furthermore, in one or more embodiments, the industrial process 1502 produces one or more industrial process products (e.g., one or more output streams of processed materials). In one or more embodiments, the industrial process 1502 is configured for converting one or more input streams of feed materials (e.g., gas stocks) into component inventory and/or industrial process products. In one or more embodiments, the industrial process 1502 is controlled by a controller 1504. In one or more embodiments, the control component 1308 is configured to generate the control data 1322 based on the emission optimization pathway data 1414. In one or more embodiments, the control data 1322 includes one or more control signals configured based on the emission optimization pathway data 1414. In one or more embodiments, the control data 1322 includes one or more setpoints for the industrial process 1502. A setpoint can be an industrial asset setting (e.g., an asset setpoint). For instance, in one or more embodiments, the one or more setpoints include one or more voltage values, one or more current values, one or more switch states, and/or one or more other configuration settings for respective industrial assets.

Figure 16:
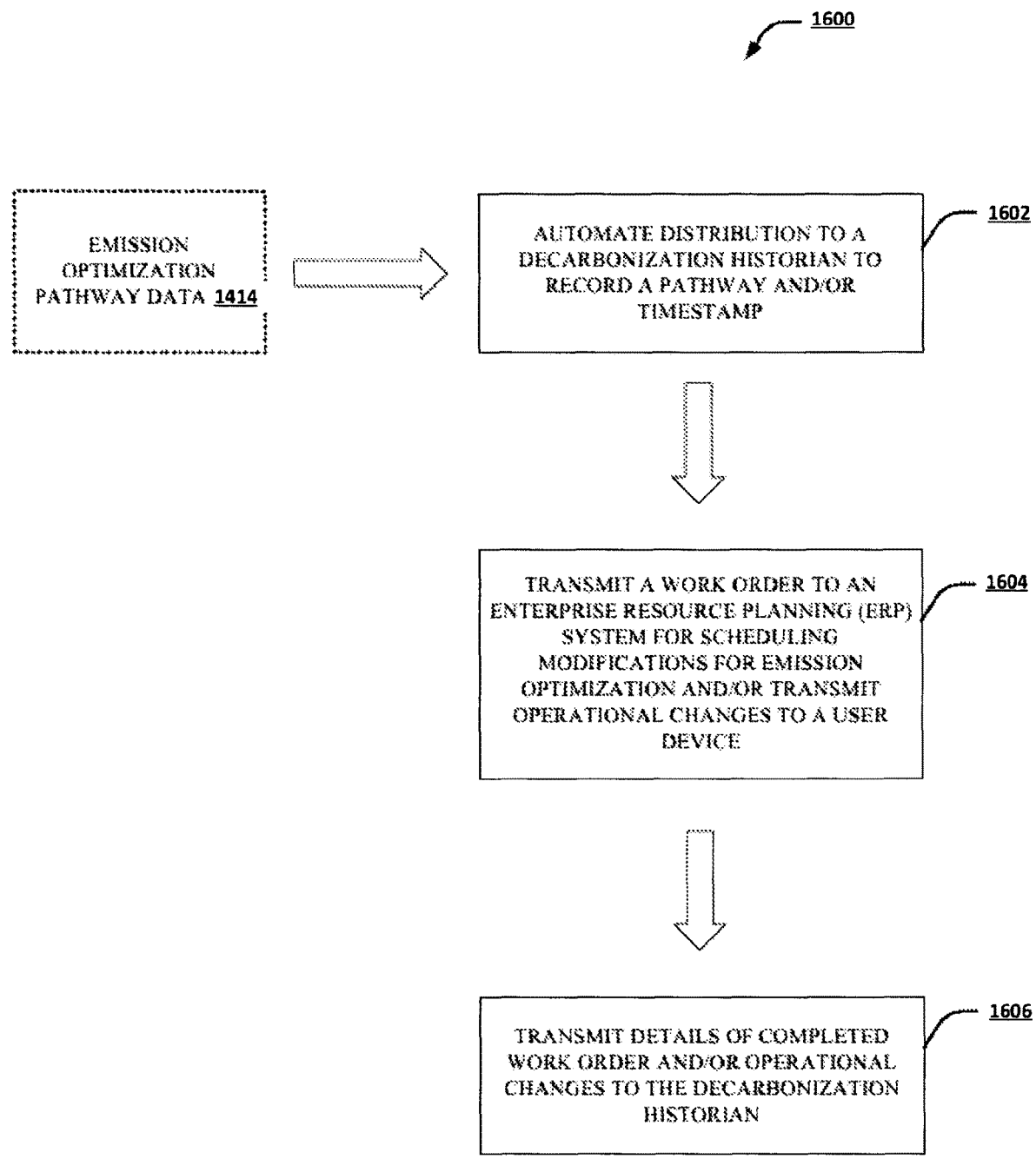
FIG. 16 illustrates an exemplary emission optimization pathway, in accordance with one or more embodiments described herein.

FIG. 16 illustrates an example emission optimization pathway 1600 according to one or more described features of one or more embodiments of the disclosure. In one or more embodiments, the emission optimization pathway 1600 includes a step 1602 that utilizes the emission optimization pathway data 1414 to automate distribution to a decarbonization historian to record a pathway and/or a timestamp. For example, at least a portion of the data included in the emission optimization pathway data 1414 (e.g., data associated with one or more operational modifications for one or more industrial processes) and/or related timestamp data can be recorded in a decarbonization historian database. In one or more embodiments, the emission optimization pathway 1600 includes a step 1604 that transmits a work order to an enterprise resource planning (ERP) system for scheduling, automatically or manually, modifications for emission optimization. In some embodiments, the ERP system stores data embodying work orders or other data record(s) of modifications for a particular plant, processing unit thereof, of other device of an enterprise, that is to be performed, being performed, or was historically performed, together with timestamp data corresponding to when such data was generated, stored, updated, and/or the like. In this regard, the ERP system may include modification data that can be cross-referenced with operations data associated with such device(s) at particular timestamps, for example where the operations data is represented in the measurement data 1314. Additionally or alternatively, the step transmits operational changes to a user device. For example, a work order notification for the one or more industrial processes can be generated based at least in part on the one or more operational modifications. The work order notification can be rendered via a display of the user device. The user device can be a mobile computing device, a smartphone, a tablet computer, a mobile computer, a desktop computer, a laptop computer, a workstation computer, a wearable device, a virtual reality device, an augmented reality device, or another type of user device. In one or more embodiments, the emission optimization pathway 1600 includes a step 11606 that transmits details of a completed work order and/or operational changes to the decarbonization historian. For example, in response to the one or more operational modifications being applied to the one or more industrial processes via the work order notification, the data in the decarbonization historian database can be updated based at least in part on the work order notification and/or the operational changes. In one or more embodiments, the emissions optimization model determines the one or more operational modifications based at least in part on the data in the decarbonization historian. In one or more embodiments, the subsequently captured data (e.g., after the completed work order is achieved) can be employed to determine whether a proposed modification related to the work order satisfies a certain degree of emissions reduction and/or other emissions criteria. In certain embodiments, one or more portions of the emission optimization model 1319 can be modified to account for whether the proposed modification related to the work order satisfies a certain degree of emissions reduction or not.

Figure 17:
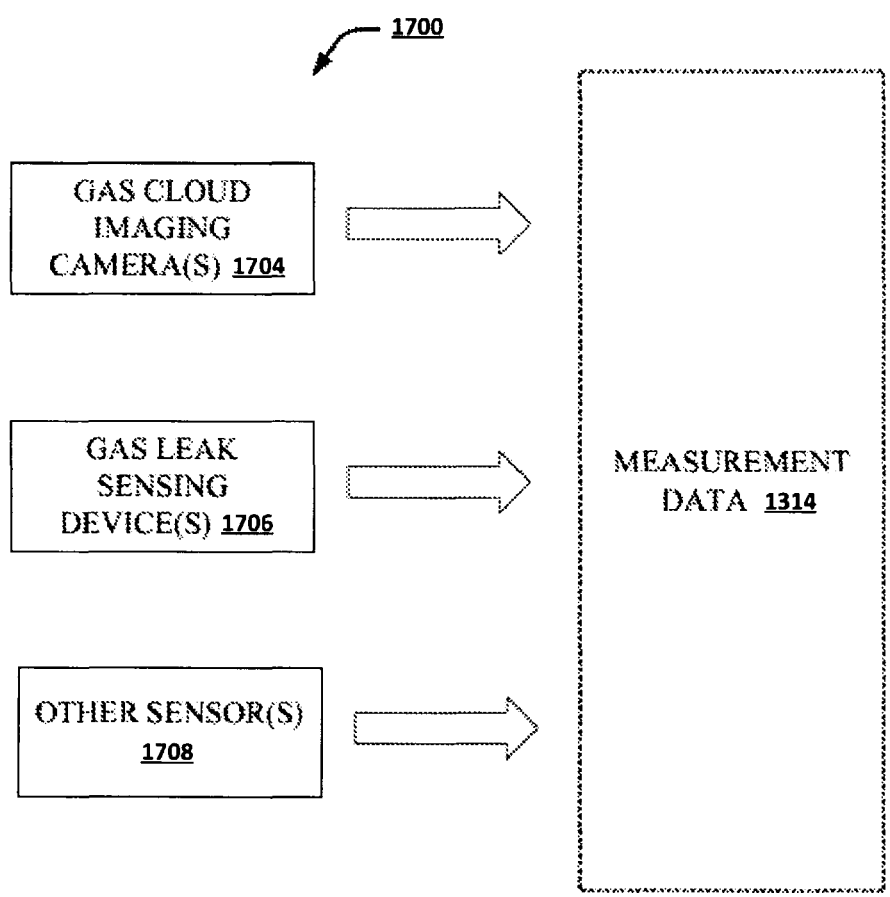
FIG. 17 illustrates a system that includes one or more data capture devices capable of capturing one or more portions of measurement data, in accordance with one or more embodiments described herein.

FIG. 17 illustrates a system 1700 that includes one or more data capture devices capable of capturing one or more portions of measurement data according to one or more described features of one or more embodiments of the disclosure. In one or more embodiments, the system 1700 includes one or more gas cloud imaging cameras 1704, one or more gas leak sensing devices 1706, and/or one or more other sensors 1708 that respectively capture one or more real-time measurements included in one or more portions of the measurement data 1314. The one or more gas cloud imaging cameras 1704 can employ hyperspectral imaging to detect and/or measure gas cloud emissions via continuous visual emissions monitoring. For example, the one or more gas cloud imaging cameras 1704 can collect data to calculate and/or quantify emissions via hyperspectral imaging of gas clouds. In one or more embodiments, the one or more gas cloud imaging cameras 1704 can employ hyperspectral imaging to detect and/or measure gas cloud emissions related to, but not limited to, acetone, acetylene, acrylonitrile, ammonia, butadiene, difluoroethane, ethane, ethylene, ethylene oxide, iso-butane, isobutylene, methane, methanol, natural gas, N-butane, propane, propylene, propylene oxide, sulfur hexafluoride, toluene, and/or xylene. In one or more embodiments, the one or more gas cloud imaging cameras 1704 can provide gas quantification related to gas emissions. The one or more gas leak sensing devices 1706 can be configured to detect leaks of combustible fuels and/or gases in real-time. In one or more embodiments, the one or more gas leak sensing devices 1706 can detect a gas leak event and/or measure an amount of gas related to a gas leak event. In one or more embodiments, the one or more gas cloud imaging cameras 1704 can be respectively configured with one or more sensors to detect and/or measure gas cloud emissions. Additionally or alternatively, the one or more gas leak sensing devices 1706 can be respectively configured with one or more sensors to detect a gas leak event and/or measure an amount of gas related to a gas leak event. The one or more other sensors 1708 can include one or more industrial process sensors, one or more emission sensors, one or more temperature sensors, one or more pressure sensors, one or more fuel level sensors, one or more infrared sensors, one or more proximity sensors, one or more optical sensors, one or more humidity sensors, one or more image sensors, one or more light sensors, one or more vibration sensors, one or more smart sensors, one or more IoT sensors, and/or one or more other sensors.

Figure 18:
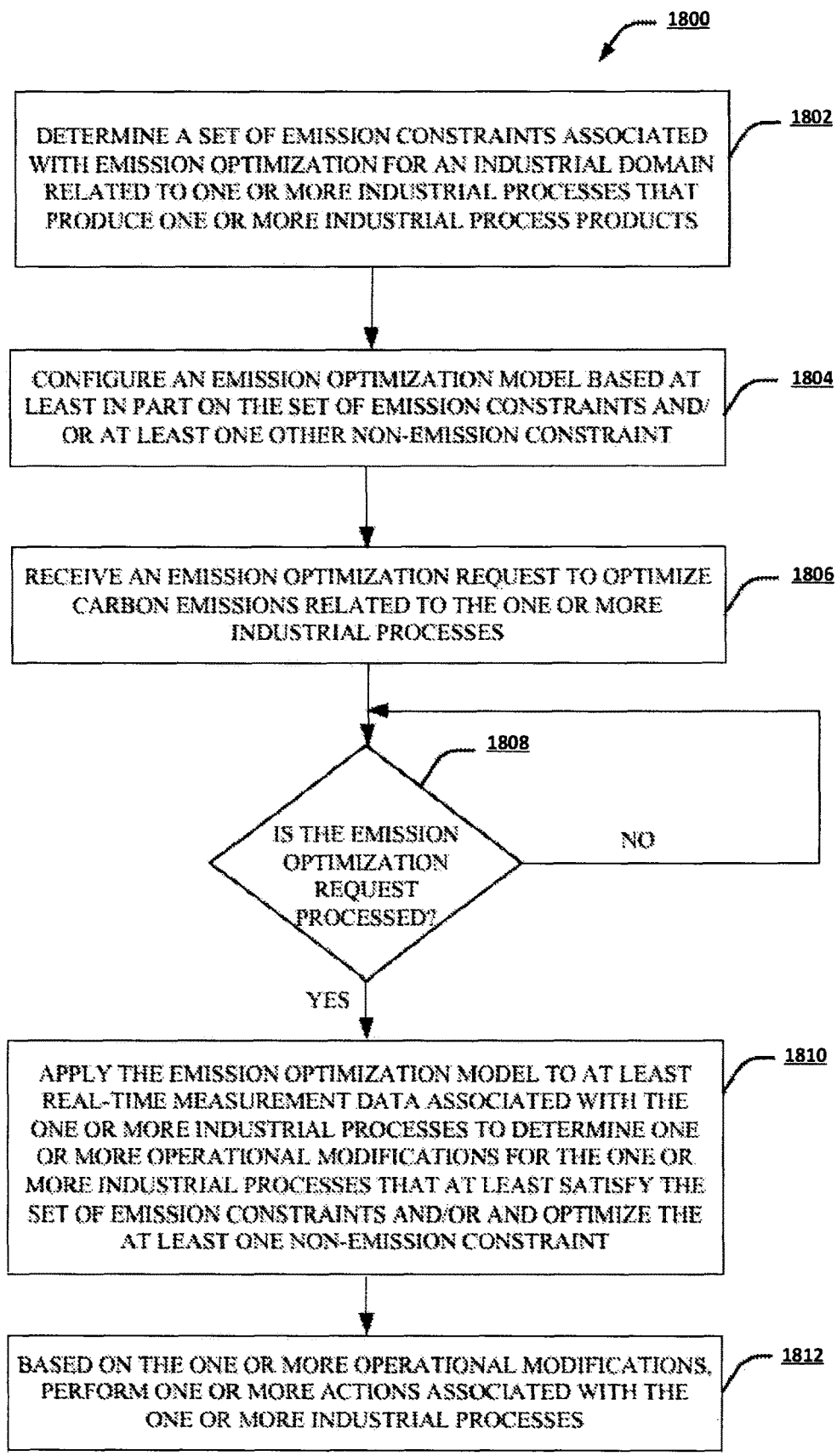
FIG. 18 illustrates a flow diagram for providing emission optimization for industrial processes, in accordance with one or more embodiments described herein.

FIG. 18 illustrates a method 1800 for providing emission optimization for industrial processes, in accordance with one or more embodiments described herein. The method 1800 is associated with the emission optimization computer system 1302, for example. For instance, in one or more embodiments, the method 1800 is executed at a device (e.g., the emission optimization computer system 1302) with one or more processors and a memory. In one or more embodiments, the method 1800 begins at block 1802 that determines (e.g., by the modeling component 1306) a set of emission constraints associated with emission optimization for an industrial domain related to one or more industrial processes that produce one or more industrial process products. In one or more embodiments, the method 1800 includes a block 1804 that configures (e.g., by the modeling component 1306) an emission optimization model based at least in part on the set of emission constraints and/or at least one other non-emission constraint. In one or more embodiments, the method 1800 includes a block 1806 that receives (e.g., by the modeling component 1306) an emission optimization request to optimize carbon emissions related to the one or more industrial processes.

At block 1808, it is determined whether the emission optimization request is processed. If no, block 1808 is repeated to determine whether the emission optimization request is processed. If yes, the method 1800 proceeds to block 1810. In response to the emission optimization request, the block 1810 applies (e.g., by the modeling component 1306) the emission optimization model to at least real-time measurement data associated with the one or more industrial processes to determine one or more operational modifications for the one or more industrial processes that at least satisfy the set of emission constraints and/or optimize the at least one non-emission constraint. In response to the emission optimization request, in one or more embodiments, the method 1800 includes a block 1812 that, based on the one or more operational modifications, performs (e.g., by the control component 1308) one or more actions associated with the one or more industrial processes.

Figure 19:
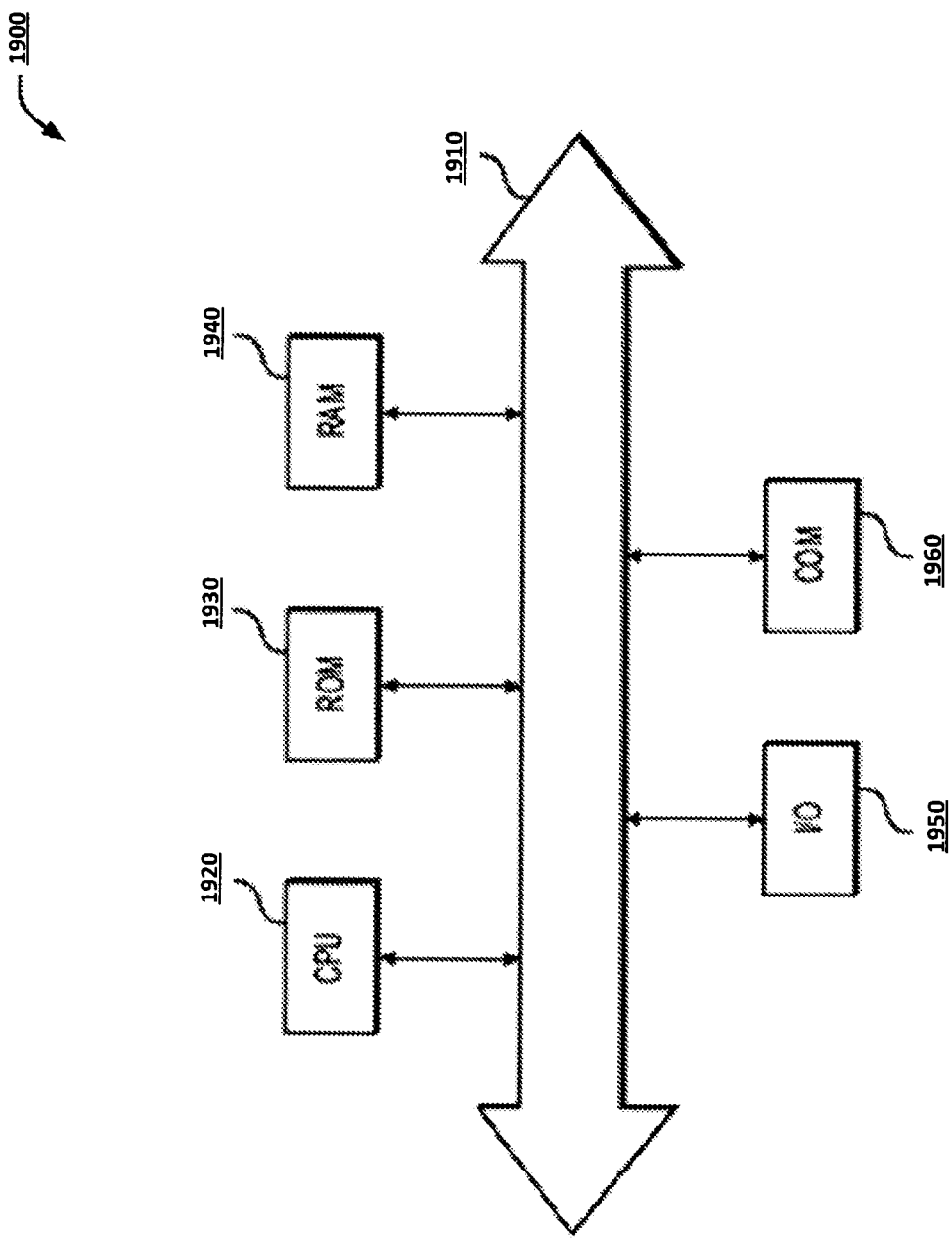
FIG. 19 illustrates a functional block diagram of a computer that may be configured to execute techniques described in accordance with one or more embodiments described herein.

FIG. 19 depicts an example system 1900 that may execute techniques presented herein. FIG. 19 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1960 for packet data communication. The platform also may include a central processing unit ("CPU") 1920, in the form of one or more processors, for executing program instructions. The platform may include an internal communication bus 1910, and the platform also may include a program storage and/or a data storage for various data files to be processed and/or communicated by the platform such as ROM 1930 and RAM 1940, although the system 1900 may receive programming and data via network communications. The system 1900 also may include input and output ports 1950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Refinery and Petrochemical Optimization Embodiments

Particular embodiments of the present disclosure with respect to refinery and petrochemical optimization generally will now be discussed. It will be appreciated that such embodiments may describe sub-embodiments, or in some contexts super-embodiments, of those described above with respect to FIGS. 1-10, and/or 11-19. In this regard, the example system 100 for example in some embodiments is embodied by, includes, or otherwise is represented by the example system 2000. Similarly, additionally or alternatively in some embodiments the apparatus 200 embodies, is included as a subcomponent, or otherwise represents an example of the multi-optimization system 2002, for example embodied by the apparatus 2100 as discussed further herein. In this regard, it will be appreciated that any of the functionality performed by the apparatuses, computing systems, and/or the like as depicted and described with respect to FIGS. 1-10, and/or 11-19, may similarly be performed by apparatuses, computing systems, and/or other embodiments as depicted and described with respect to FIGS. 20-26.

In various examples, a processing plant is utilized to create one or more particular products. A processing plant can be an oil refinery that processes various input ingredients to create one or more types of oil-based products. Processing plants may operate a plurality of assets to produce, or facilitate the production of, the one or more products. The operation of the assets may emit carbon dioxide (CO2) and other various greenhouse gases (e.g., methane, nitrous oxide, or fluorinated gases). CO2 is the primary greenhouse gas that is emitted through human activities. As such, it may be desirable to reduce the amount of CO2 gas ("carbon emissions") emitted by human activity, such as the amount of carbon emissions emitted by the processing plant, either directly or indirectly.

Various ways of reducing the amount of carbon emissions directly emitted by a processing plant exist. For example, diesel-powered equipment can be replaced with electric-powered equipment or carbon capture technologies can be installed on equipment to reduce the amount of carbon emissions that are emitted from the equipment.

Various ways of reducing the amount of carbon emissions that are not directly emitted by the processing plant, but are associated with the processing plant exist. In other words, various ways of reducing the amount of carbon emissions that are indirectly emitted by the processing plant exist. For example, energy (e.g., electricity or fuel) that is obtained from a non-renewable energy source (e.g., fossil fuels such as coal or gray hydrogen) can instead be obtained from a renewable energy source (e.g., wind, solar, or green hydrogen). In various examples, carbon offset products, such as carbon credits, can be obtained (e.g., purchased or allocated) to reduce the amount of carbon emissions that are associated with the processing plant. In the example of carbon offset products, the direct amount of carbon emissions that are directly emitted by the processing plant may remain unchanged. However, by obtaining the carbon offset products, a net amount of carbon emissions associated with the processing plant is reduced because a net amount of carbon emissions that are indirectly emitted by the processing plant is reduced because of the obtainment of, and/or the association with, the carbon offset product.

Processing plants often have a goal to reduce a net amount of carbon emissions associated with the processing plant (e.g., the amount of carbon emissions directly or indirectly emitted by the processing plant). For example, some processing plants have a goal to reduce a net amount of carbon emissions associated with the processing plant below a carbon emissions goal value, which can be a threshold value, such as a predetermined threshold value. The carbon emissions goal value can be determined by a government agency or by the company that owns the processing plant. In some instances, the carbon emissions goal value may be a net zero carbon emissions goal. In various examples, the carbon emissions goal value may be associated with a time frame. For example, the carbon emissions goal value may be to achieve the net zero carbon emissions within ten years.

However, reducing carbon emissions and/or achieving the carbon emissions goal value may be expensive. As such, it may be beneficial to determine what transformation actions to perform to reduce or minimize an impact value associated with the assets and/or to reduce carbon emissions and/or to achieve the carbon emissions goal value, which will be discussed in greater detail, below. As will be explained further, a "transformation action" can be, can be representative of, or can initiate an action that, if taken, may, or is expected to, reduce the carbon output value associated with operating a particular asset of the plurality of assets or of the processing plant and/or may reduce the impact value associated with the particular asset of the plurality of assets or the processing plant.

As used herein, the term "impact value" refers to or includes various costs associated with the particular asset. For example, the impact value for an asset can include a marginal abatement impact value, which can be, or can include, a marginal abatement cost for the asset. The marginal abatement cost can be the cost of reducing carbon emissions and the unit of measurement can be dollars per metric tons of carbon dioxide equivalent ($/MTCO2e). The impact value can include an operational impact value, which can be, or can include, an operational cost for the asset. The operational cost for the asset can be the cost to operate the asset in a certain time period (e.g., cost to operate the asset for a year). The impact value can include an asset alteration impact value, which can be, or can include, an asset alteration cost that is associated with the asset. The asset alteration cost can be, or can include, the cost to install, modify, replace, or renew the asset. The impact value can include various other factors or costs, such as loss of opportunity costs, reputational costs, or government-imposed fees. As will be explained further, the asset alteration impact value may be, or include, a cost associated with performing a transformation action, or an action associated therewith, on the asset.

As will be recognized, processing plants may have a great number of assets (e.g., more than one hundred assets, such as more than one thousand assets, such as more than ten thousand assets). As such, determining which assets to transform to reduce or minimize an impact value associated with the assets while also reducing carbon emissions and/or achieving the carbon emissions goal value is impossible to do with the human mind and/or with existing methods. In this regard, embodiments of the present disclosure provide for an improved method for reducing carbon emissions associated with an operation of a processing plant or reducing an impact value associated with the operation of the processing plant. Also, various embodiments of the present disclosure operate the processing plant in an improved and optimized manner over existing operation of the processing plant.

Figure 20:
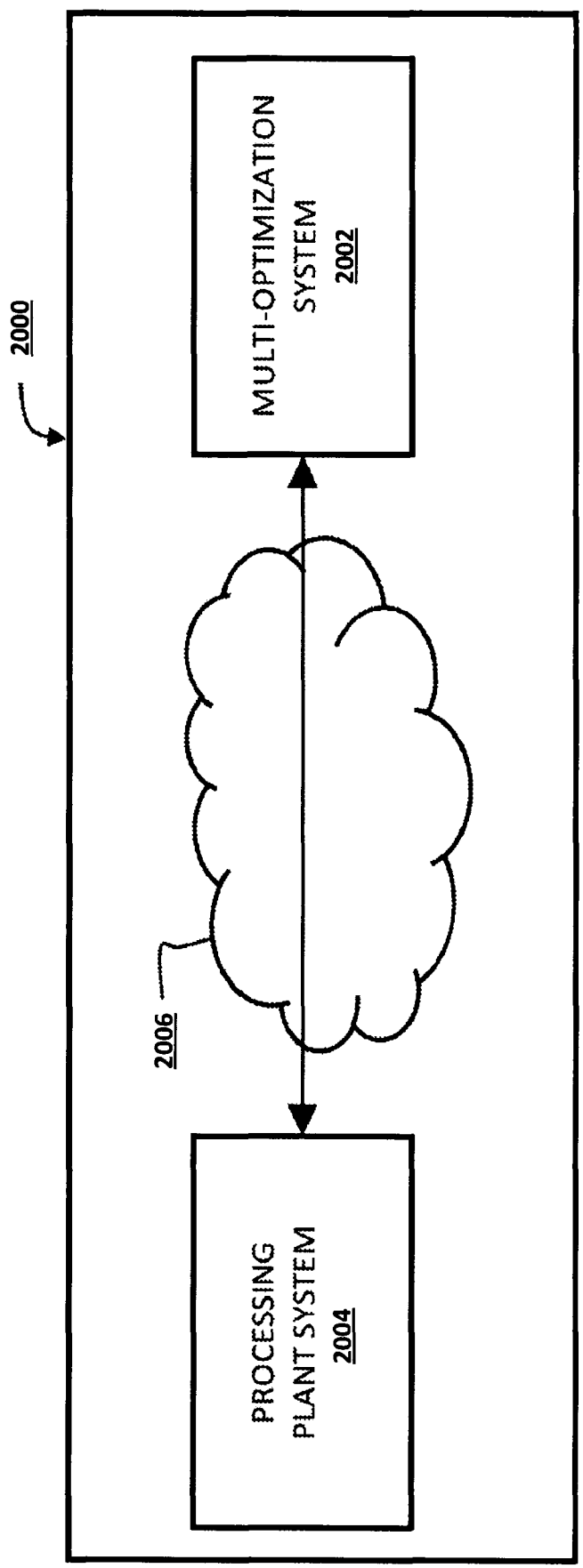
FIG. 20 illustrates a block diagram of a system that may be specially configured within which embodiments of the present disclosure may operate.

FIG. 20 illustrates a block diagram of a system that may be specially configured within which embodiments of the present disclosure may operate. Specifically, FIG. 20 depicts an example system 2000. As illustrated, the system 2000 includes a multi-optimization system 2002 in communication with a processing plant system 2004. In some embodiments, the multi-optimization system 2002 is embodied by or as a sub-system of the processing plant system 2004. In some embodiments, the multi-optimization system 2002 communicates with the processing plant system 2004 over one or more communication network(s), for example a communications network 2006. In various examples, the processing plant system 2004 is a distributed control system (DCS).

It should be appreciated that the communications network 2006 in some embodiments is embodied in any of a myriad of network configurations. In some embodiments, the communications network 2006 embodies a public network, such as the Internet. In some embodiments, the communications network 2006 embodies a private network (e.g., an internal localized, or closed-off network between particular devices). In some other embodiments, the communications network 2006 embodies a hybrid network (e.g., a network enabling internal communications between particular connected devices and external communications with other devices). The communications network 2006 in some embodiments includes one or more base station(s), relay(s), router(s), switch(es), cell tower(s), communications cable(s) and/or associated routing station(s), and/or the like. In some embodiments, the communications network 2006 includes one or more user-controlled computing device(s) (e.g., a user-owned router and/or modem) and/or one or more external utility devices (e.g., Internet service provider communication tower(s) and/or other device(s)).

Each of the components of the system 2000 are communicatively coupled to transmit data to and/or receive data from one another over the same or different wireless and/or wired networks embodying the communications network 2006. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 20 illustrates certain system entities as separate, stand-alone entities communicating over the communications network 2006, the various embodiments are not limited to this architecture. In other embodiments, one or more computing entities share one or more components, hardware, and/or the like, or otherwise are embodied by a single computing device such that connection(s) between the computing entities are over the communications network 2006 and/or rendered unnecessary. For example, in some embodiments, the processing plant system 2004 includes some or all of the multi-optimization system 2002, such that an external communications network 10 is not required.

In some embodiments, the multi-optimization system 2002 and the processing plant system 2004 are embodied in an on-premises system within or associated with the processing plant. In some such embodiments, the multi-optimization system 2002 and the processing plant system 2004 are communicatively coupled via at least one wired connection. Alternatively or additionally, in some embodiments, the processing plant system 2004 embodies or includes the multi-optimization system 2002, for example as a software component of a single enterprise terminal.

The processing plant system 2004 includes any number of computing device(s), system(s), asset(s), and/or the like, that facilitate the production of any number of products, for example utilizing particular configurations that cause processing of particular ingredients available within the processing plant system 2004. In some embodiments, the processing plant system 2004 includes one or more asset(s), connection(s) between physical asset(s), and/or computing system(s) that control operation of each asset therein. In one example context, the processing plant system 2004 embodies an oil refinery, which includes asset(s) embodying rundown blender(s), batch blender(s), product tank(s), boilers, catalytic combustors, carbon capture systems, or other asset(s) that perform particular process(es), or support those process(es), to alter properties of inputs to the asset, crude flow unit(s), piping between such physical asset(s), valve(s) controlling flow between the physical asset(s), and/or the like. Additionally or alternatively, in some embodiments the processing plant system 2004 includes one or more computing system(s) that are specially configured to operate the asset(s) in a manner that produces one or more particular product(s) simultaneously. In some embodiments, a processing plant system 2004 includes one or more computing device(s) and/or system(s) embodied in hardware, software, firmware, and/or a combination thereof, that configure and/or otherwise control operation of one or more physical asset(s) of the processing plant. For example, in some embodiments, such computing device(s) and/or system(s) include one or more programmable logic controller(s), MPC(s), application server(s), centralized control system(s), and/or the like, that control(s) configuration and/or operation of at least one physical asset. It will be appreciated that different processing plant system(s) may include or otherwise be associated with different asset(s), computing system(s), and/or the like. For example, different refinery plants may include different assets, different number of assets, different types of assets, and/or the like, that cause the processing plant system to operate differently from other processing plants.

The multi-optimization system 2002 includes one or more computing device(s) and/or system(s) embodied in hardware, software, firmware, and/or a combination thereof, that generate one or more optimized set(s) of transformation actions, each of the one or more optimized set(s) of transformation actions including one or more transformation action(s).

In some embodiments, the multi-optimization system 2002 and the processing plant system 2004 communicate with one another to perform the various actions described herein. For example, in some embodiments, the multi-optimization system 2002 and the processing plant system 2004 communicate to generate, and/or transmit for use, one or more transformation actions associated with operation of a particular processing plant and/or a particular asset thereof. Additionally or alternatively, in some embodiments, the multi-optimization system 2002 and the processing plant system 2004 communicate to facilitate control or adjustment of operation of assets of the processing plant based at least in part on the generated one or more transformation actions. For example, in some embodiments, the multi-optimization system 2002 and processing plant system 2004 communicate to configure one or more asset(s), such as boilers(s), of the processing plant to reduce the carbon output value associated with operating the plurality of assets. In some embodiments, the multi-optimization system 2002 and processing plant system 2004 communicate to configure the processing plant to reduce a cumulative carbon output value associated with the plurality of assets and/or the processing plant.

Figure 21:
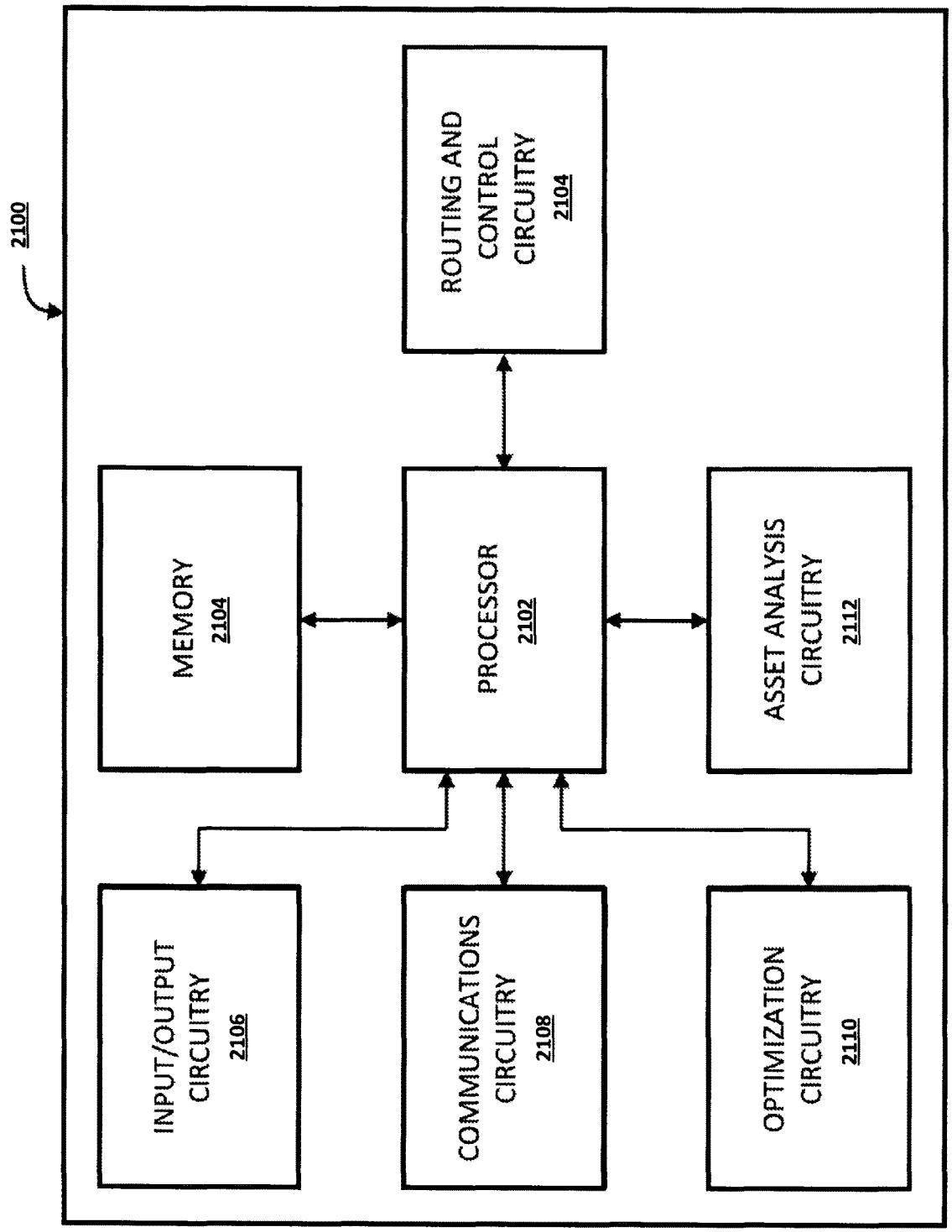
FIG. 21 illustrates a block diagram of an example apparatus that may be specially configured in accordance with an example embodiment of the present disclosure.

FIG. 21 illustrates a block diagram of an example apparatus that may be specially configured in accordance with an example embodiment of the present disclosure. Specifically, FIG. 21 depicts an example multi-optimization apparatus 2100 ("apparatus 2100") specially configured in accordance with at least some example embodiments of the present disclosure. In some embodiments, the multi-optimization system 2002 and/or a portion thereof is embodied by one or more system(s), for example embodied by the apparatus 2100 as depicted and described in FIG. 21. The apparatus 2100 includes processor 2102, memory 2104, input/output circuitry 2106, communications circuitry 2108, optimization circuitry 2110, asset analysis circuitry 2112, and/or routing and control circuitry 214. In some embodiments, the apparatus 2100 is configured, using one or more of the sets of circuitry 2102, 2104, 2106, 2108, 2110, 2112, and/or 214, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 2100 provide or supplement the functionality of another particular set of circuitry. For example, the processor 2102 in some embodiments provides processing functionality to any of the sets of circuitry, the memory 2104 provides storage functionality to any of the sets of circuitry, the communications circuitry 2108 provides network interface functionality to any of the sets of circuitry, and/or the like.

In some embodiments, the processor 2102 (and/or co-processor or any other processing circuitry assisting or otherwise associated with the processor) is/are in communication with the memory 2104 via a bus for passing information among components of the apparatus 2100. In some embodiments, for example, the memory 2104 is non-transitory and may include, for example, one or more volatile and/or non-volatile memories. In other words, for example, the memory 2104 in some embodiments includes or embodies an electronic storage device, such as a computer readable storage medium. In some embodiments, the memory 2104 is configured to store information, data, content, applications, instructions, or the like, for enabling the apparatus 2100 to carry out various functions in accordance with example embodiments of the present disclosure.

The processor 2102 may be embodied in a number of different ways. For example, in some example embodiments, the processor 2102 includes one or more processing devices configured to perform independently. Additionally or alternatively, in some embodiments, the processor 2102 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 2100, and/or one or more remote or "cloud" processor(s) external to the apparatus 2100.

In an example embodiment, the processor 2102 is configured to execute instructions stored in the memory 2104 or otherwise accessible to the processor. Alternatively or additionally, the processor 2102 in some embodiments is configured to execute hard-coded functionality. As such, whether configured by hardware or software methods, or by a combination thereof, the processor 2102 represents an entity (e.g., physically embodied in circuitry) capable of performing operations according to an embodiment of the present disclosure while configured accordingly. Alternatively or additionally, as another example in some example embodiments, when the processor 2102 is embodied as an executor of software instructions, the instructions specifically configure the processor 2102 to perform the algorithms embodied in the specific operations described herein when such instructions are executed.

As one particular example embodiment, the processor 2102 is configured to perform various operations associated with the plurality of assets of a processing plant and/or with the processing plant. In some embodiments, the processor 2102 includes hardware, software, firmware, and/or a combination thereof, that generates at least one optimized set of transformation actions utilizing a multi-optimization model. Additionally or alternatively, in some embodiments, the processor 2102 includes hardware, software, firmware, and/or a combination thereof, that causes modification, such as automatic modification, of an operation of an asset of the processing plant based at least in part on the optimized set of transformation actions. Additionally or alternatively, in some embodiments, the processor 2102 includes hardware, software, firmware, and/or a combination thereof, that generates, such as automatically generates, a schedule for installing, replacing, or modifying at least one asset of the plurality of assets. Additionally or alternatively, in some embodiments, the processor 2102 includes hardware, software, firmware, and/or a combination thereof, that generates, such as automatically generates, a work order for installing, replacing, or modifying at least one asset of the plurality of assets. Additionally or alternatively, in some embodiments, the processor 2102 includes hardware, software, firmware, and/or a combination thereof, that obtains, such as automatically obtains, a carbon offset product, such as a carbon credit, for operation of the plurality of assets and/or for operation of the processing plant.

In some embodiments, the apparatus 2100 includes input/output circuitry 2106 that provides output to the user and, in some embodiments, to receive an indication of a user input. In some embodiments, the input/output circuitry 2106 is in communication with the processor 2102 to provide such functionality. The input/output circuitry 2106 may comprise one or more user interface(s) and in some embodiments includes a display that comprises the interface(s) rendered as a web user interface, an application user interface, a user device, a backend system, or the like. In some embodiments, the input/output circuitry 2106 also includes a keyboard, a mouse, a joystick, a touch screen, touch areas, soft keys a microphone, a speaker, or other input/output mechanisms. The processor 2102 and/or input/output circuitry 2106 comprising the processor may be configured to control one or more functions of one or more user interface elements through computer program instructions (e.g., software and/or firmware) stored on a memory accessible to the processor (e.g., memory 2104, and/or the like). In some embodiments, the input/output circuitry 2106 includes or utilizes a user-facing application, for example provided to a client side device, to provide input/output functionality to the client device and/or other display associated with a user. In some examples, the input/output circuitry is configured to receive or determine a carbon output value associated with operating plurality of assets of the processing plant, an impact value associated with operating plurality of assets of the processing plant, and/or a carbon emissions goal value associated with operating the processing plant or plurality of assets associated therewith. In some examples, the input/output circuitry is configured to output (e.g., transmit or display) an optimized set of transformation actions corresponding to a plurality of asset(s) of the processing plant and/or a schedule for each of the transformation actions within the optimized set of transformation actions.

In some embodiments, the apparatus 2100 includes communications circuitry 2108. The communications circuitry 2108 includes any means such as a device or circuitry embodied in either hardware or a combination of hardware and software that is configured to receive and/or transmit data from/to a network and/or any other device, circuitry, or module in communication with the apparatus 2100. In this regard, in some embodiments the communications circuitry 2108 includes, for example, a network interface for enabling communications with a wired or wireless communications network. Additionally or alternatively in some embodiments, the communications circuitry 2108 includes one or more network interface card(s), antenna(s), bus(es), switch (es), router(s), modem(s), and supporting hardware, firmware, and/or software, or any other device suitable for enabling communications via one or more communications network(s). Additionally or alternatively, the communications circuitry 2108 includes circuitry for interacting with the antenna(s) and/or other hardware or software to cause transmission of signals via the antenna(s) or to handle receipt of signals received via the antenna(s). In some embodiments, the communications circuitry 2108 enables transmission to and/or receipt of data from user device, one or more asset(s) or accompanying sensor(s), and/or other external computing device in communication with the apparatus 2100.

The optimization circuitry 2110 includes hardware, software, firmware, and/or a combination thereof, that supports performance of at least one optimization process for a processing plant. For example, in some embodiments, the optimization circuitry 2110 includes hardware, software, firmware, and/or a combination thereof, that generates an optimized set of transformation actions corresponding to a plurality of assets of the processing plant, such as a processing plant embodying or including an oil refinery. Additionally or alternatively, in some embodiments, the optimization circuitry 2110 includes hardware, software, firmware, and/or a combination thereof, that generates the optimized set of transformation actions utilizing a multi-optimization model based at least in part on a carbon output value associated with operating each asset of the plurality of assets and an asset impact value associated with each asset of the plurality of assets. In some embodiments, the optimization circuitry 2110 includes a separate processor, specially configured field programmable gate array (FPGA), or a specially programmed application specific integrated circuit (ASIC).

The asset analysis circuitry 2112 includes hardware, software, firmware, and/or a combination thereof, that collects data representing particular aspect(s) of an asset and/or performs particular determinations based on such data based at least in part on such data representing the particular aspect(s). For example, in some embodiments, the asset analysis circuitry 2112 includes hardware, software, firmware, and/or a combination thereof, that collects carbon output data, such as carbon output values, associated with a particular asset of a processing plant. In some such embodiments, the optimization circuitry 2110 includes one or more sensor(s) that are configured to collects sensor data representing at least a portion of the carbon output data associated with operating one or more asset of the processing plant. Additionally or alternatively, in some embodiments, the asset analysis circuitry 2112 includes hardware, software, firmware, and/or a combination thereof, that determines whether a cumulative carbon output value associated with a plurality of assets is below a carbon emissions goal value. Additionally or alternatively, in some embodiments, the asset analysis circuitry 2112 includes hardware, software, firmware, and/or a combination thereof, that determines whether a cumulative carbon output value associated with an optimized plurality of assets is below a carbon emissions goal value. Additionally or alternatively, in some embodiments, the asset analysis circuitry 2112 includes hardware, software, firmware, and/or a combination thereof, that determines whether a cumulative carbon output value associated with an optimized plurality of assets is less than a cumulative carbon output value associated with an optimized plurality of assets is below a carbon emissions goal value. In some embodiments, the asset analysis circuitry 2112 includes a separate processor, specially configured field programmable gate array (FPGA), or a specially programmed application specific integrated circuit (ASIC).

The routing and control circuitry 214 includes hardware, software, firmware, and/or a combination thereof, that supports operation of one or more asset(s) of a processing plant based at least in part on generated, received, and/or determined data. For example, in some embodiments, routing and control circuitry 214 includes hardware, software, firmware, and/or a combination thereof, that causes or supports production of a product via at least one asset of a processing plant. In some such embodiments, the routing and control circuitry 214 includes hardware, software, firmware, and/or a combination thereof, that causes operation or modifies operation of one or more asset(s) of a processing plant, to cause or modify production of a particular product based at least in part on at least one transformation action of an optimized set of transformation actions. Additionally or alternatively, in some embodiments, routing and control circuitry 214 includes hardware, software, firmware, and/or a combination thereof, that causes the conversion, such as automatic conversion, of an energy source from a non-renewable energy source to a renewable energy source. Additionally or alternatively, in some embodiments, routing and control circuitry 214 includes hardware, software, firmware, and/or a combination thereof that causes the obtainment, such as automatic obtainment, of carbon offset products for the processing plant and/or the operation of the plurality of assets of the processing plant. In some embodiments, the routing and control circuitry 214 includes a separate processor, specially configured field programmable gate array (FPGA), or a specially programmed application specific integrated circuit (ASIC).

Additionally or alternatively, in some embodiments, two or more of the sets of circuitries 2102-214 are combinable. Alternatively or additionally, in some embodiments, one or more of the sets of circuitry perform some or all of the functionality described associated with another component. For example, in some embodiments, two or more of the sets of circuitry 2102-214 are combined into a single module embodied in hardware, software, firmware, and/or a combination thereof. Similarly, in some embodiments, one or more of the sets of circuitry, for example the optimization circuitry 2110, asset analysis circuitry 2112, and/or routing and control circuitry 214, is/are combined with the processor 2102, such that the processor 2102 performs one or more of the operations described above with respect to each of these sets of circuitry 2110-214.

Figure 22:
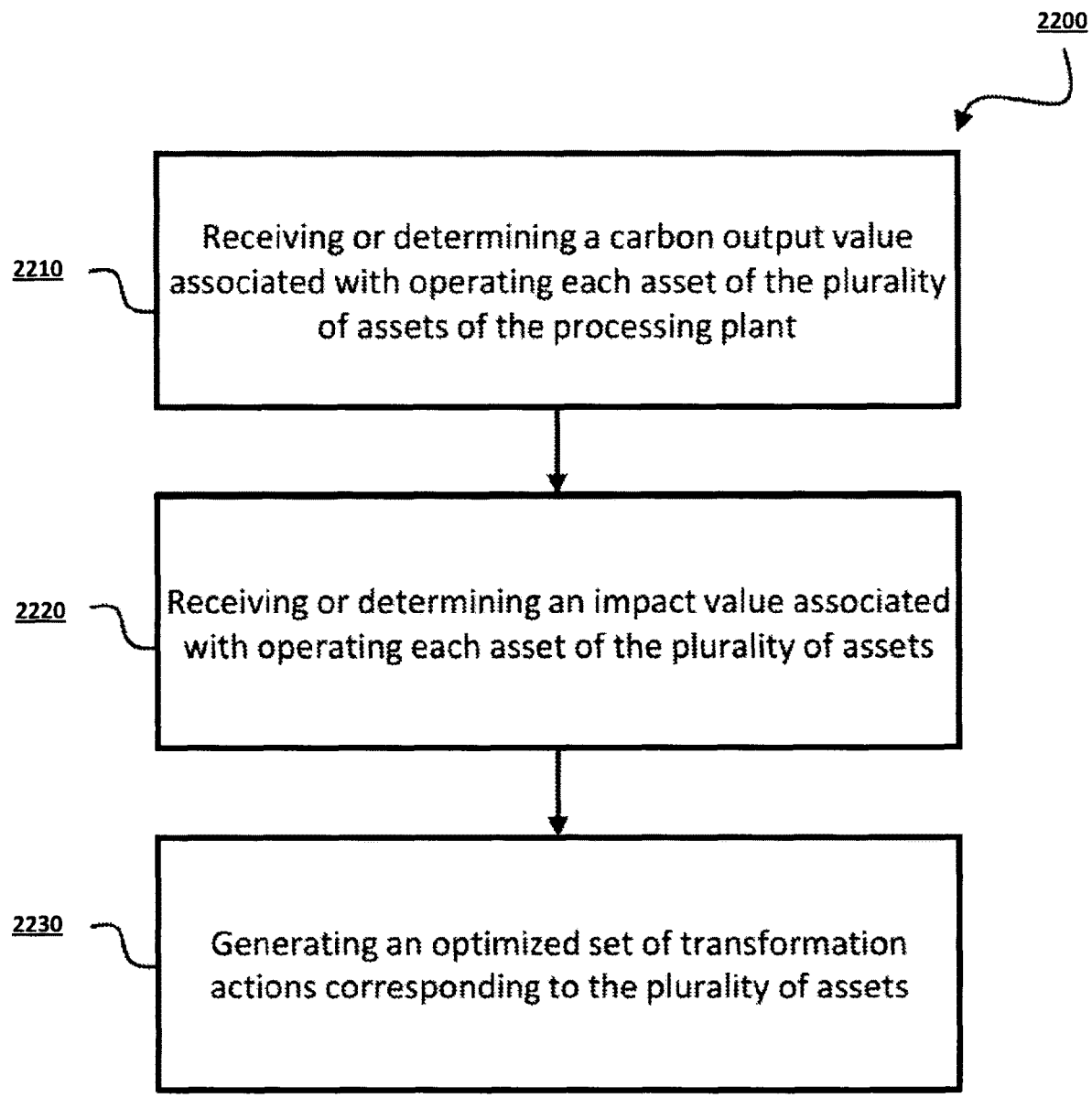
FIG. 22 illustrates a flow chart of a method for optimizing carbon emissions associated with an operation of a processing plant in accordance with an example embodiment of the present disclosure.

FIG. 22 illustrates a flow chart of a method 2200 for optimizing carbon emissions associated with an operation of a processing plant that includes a plurality of assets in accordance with an example embodiment of the present disclosure. As described, processing plants, such as a processing plant embodying or including an oil refinery, may operate a plurality of assets to produce, or facilitate the production of, one or more products. For example, processing plants may operate various types of equipment such as boilers, furnaces, and dryers to produce the one or more products. Additionally, to facilitate the production of the one or more products, the processing plant may operate lighting systems and HVAC systems. The operation of these assets, and various other assets, of the processing plant may produce carbon emissions.

The method 2200 for optimizing carbon emissions associated with the operation of the processing plant can include a step 2210 of identifying, such as receiving or determining, a carbon output value associated with operating each asset of the plurality of assets of the processing plant. In various examples, the carbon output value can be, or can include, sensor data that measures the amount of carbon emissions that are emitted, such as directly emitted, from an asset. In various examples, the carbon output value can be, or can include, a calculated value and/or an estimated value of the amount of carbon emissions that is emitted from the asset. For example, for a high frequency furnace that uses gray hydrogen gas as a fuel source, the amount of gray hydrogen that is consumed by the high frequency furnace can be measured. As such, a calculated value and/or an estimated value of the amount of carbon emissions that is emitted from the high frequency furnace can be estimated based on the amount of gray hydrogen consumed by the furnace. Additionally, because gray hydrogen is derived from the combustion of fossil fuels, such as natural gas, an indirect estimated value of the amount of carbon emissions that is associated with the use of the gray hydrogen can be estimated and can be included in the carbon output value for the asset. In the example of the high frequency furnace that uses gray hydrogen gas as the fuel source, the carbon output value can include the amount of carbon emissions directly emitted by the asset (e.g., either measured by a sensor and/or estimated by the amount of gray hydrogen consumed by the furnace) and the amount of carbon emissions indirectly associated with the asset (e.g., an estimation of the carbon emissions that are associated with the production of the gray hydrogen that is consumed by the furnace).

The method 2200 for optimizing carbon emissions associated with the operation of the processing plant can include a step 2220 of identifying an impact value associated with each asset of the plurality of assets of the processing plant. The impact value associated with each asset can be, or can include, various costs associated with the particular asset. For example, the impact value associated with each asset can include a marginal abatement impact value, which can be, or can include, a marginal abatement cost for the asset. The marginal abatement cost can be the cost of reducing carbon emissions and the unit of measurement can be dollars per metric tons of carbon dioxide equivalent ($/MTCO2e). The impact value associated with each asset can include an operational impact value, which can be, or can include, an operational cost for the asset. The operational cost for the asset can be the cost to operate the asset in a certain time period (e.g., cost to operate the asset for a year, a quarter, a month, or a day). For example, the operational cost for the asset can include the cost of the required fuel and/or electricity to operate the asset in the certain time period and/or the cost to maintain the asset for the certain time period. The impact value associated with each asset can also include an asset alteration impact value, which can be, or can include, an asset alteration cost that is associated with the asset. The asset alteration cost can be, or can include, the cost to install, modify, replace, or renew the asset. The impact value associated with each asset can also include various other factors and/or costs, such as loss of opportunity costs, reputational costs, offset costs (e.g., cost of obtaining carbon offset products for the asset), interest costs, government/regulatory fees, and/or government/regulatory incentives.

The method 2200 for optimizing carbon emissions associated with the operation of the processing plant can include a step 2230 of generating an optimized set of transformation actions corresponding to the plurality of assets. As described herein, each transformation action can be, can be representative of, or can initiate an action that, if taken, may, or is expected to, reduce the carbon output value associated with operating a particular asset of the plurality of assets and/or of the processing plant, and/or may reduce the impact value associated with the particular asset of the plurality of assets and/or the processing plant.

In various examples, one or more of the transformation actions can be, or can include, generating a schedule, a work order, and/or a recommendation for installing, replacing, renewing, or modifying, such as upgrading, the asset. For example, one or more of the transformation actions can be the generation of a work order to replace a catalytic combustor, one or more of the transformation actions can be the recommendation to replace an asset that consumes fossil fuels with an asset that consumes electricity, and/or one of the transformation action can be the recommendation to install a carbon capture system onto an asset. In yet another example, one or more of the transformation actions can be the generation of a work order or the recommendation to install new equipment and/or technology including but not limited to carbon removal technologies like post-combustion carbon capture and methane measurement, detection, and leak mitigation technologies. Additionally, one or more of the transformation actions can be the generation of a schedule indicating when to replace the catalytic combustor, when to replace the asset that consumes fossil fuels with the asset that consumes electricity, and/or when to install the carbon capture system onto the asset.

In the example of installing the carbon capture system onto the asset, the carbon capture system may reduce carbon emissions by removing carbon dioxide from flue gas streams after combustion. In various example, the installation of the carbon capture system onto the asset may require the addition of new energy generation assets to power the carbon capture system if current power generation supply is being used for an existing asset.

In various examples, one or more of the transformation actions can be, or can include, generating a schedule, a work order, and/or a recommendation for converting an asset that operates on a non-renewable energy source to a renewable energy source. In various examples, one or more of the transformation actions can be, or can include, generating a schedule, a work order, and/or a recommendation for obtaining a carbon offset product, such as a carbon credit, for the operation of the processing plant to offset carbon emissions for the processing plant and/or for the operation of an asset to offset carbon emissions for the asset In various examples, one or more of the transformation actions can be, or can include, generating a replacement schedule for an asset and/or one or more components of the asset. Also, the transformation action can include the automatic generation of work orders and/or purchase orders for the asset and/or one or more components of the asset to be replaced. For example, it may be beneficial to replace an asset and/or components of the asset at certain time intervals, such as predetermined time intervals or calculated time intervals, which can be based on usage. Purchase orders and/or work orders can be automatically generated. As a non-limiting example, it may be beneficial to replace catalytic combustors and/or absorbents, such as liquid solvents in absorber columns that absorb carbon emissions after combustion, at certain time intervals, such as every six months and/or after four-thousand hours of use.

In various examples, one or more of the transformation actions can be, or can include, generating a schedule, a work order, and/or a recommendation for changes and/or modifications, such as automatic changes and/or modifications to a process unit, such as a discrete process or a broader process change and/or modification for a diverse population of assets.

In various examples, one or more of the transformation actions can be automated. For example, the transformation actions can be communicated to the processing plant system 2004, which can be a distributed control system (DCS), to change operational requirements and/or parameters. Additionally, or alternatively, one or more of the transformation actions can be communicated to the processing plant system 2004 to incorporate and/or modify sensing and/or measurement metrics. Additionally, or alternatively, one or more of the transformation actions can be communicated to the processing plant system 2004 to incorporate new and/or modify existing processes of the processing plant.

Generating the optimized set of transformation actions can be performed utilizing a multi-optimization model. Also, generating the optimized set of transformation actions can be based at least in part on the carbon output value associated with operating each asset of the plurality of assets from step 2210 and the impact value associated with each asset of the plurality of assets from step 2220.

The multi-optimization model can be a multi-variable model. In various examples, the multi-variable model can be a mixed integer programming (MIP) model, such as a mixed integer quadratically constrained programming (MIQCP) model, a mixed logical-linear programming (MLLP) model, or a mixed integer linear programming (MILP) model. The MIP model can be a mathematical optimization and/or feasibility model in which at least some of the variables (e.g., constraints and/or inputs such as the received carbon output value associated with operating each asset of the plurality of assets and/or the received asset impact value associated with each asset of the plurality of assets) are restricted to be integers, such as binary integers. In various examples, the multi-variable model can be a constraint programming (CP) model. In various examples, the multi-variable model can be a mathematical programming model.

The multi-optimization model can be a machine learning model. For example, the multi-optimization model can be a machine learning model that may encode at least some of the variables and may execute a machine learning algorithm. In various examples, the machine learning algorithm is a reinforcement learning algorithm, an unsupervised learning algorithm, and/or a supervised learning algorithm.

The multi-optimization model can utilize the carbon output value associated with operating each asset of the plurality of assets from step 2210 and the impact value associated with each asset of the plurality of assets from step 2220 as inputs and/or constraints into the model. Additionally, the multi-optimization model can utilize various other data points as input and/or constraints. For example, the multi-optimization model can utilize goals as inputs and/or constraints into the model such as a carbon emissions goal value and/or an impact value goal value. As another example, the multi-optimization model can use other data points such as location data, such as geographical location of the processing plant, domain data, social data, environmental data, legal data, regulatory data, economic data, risk tolerance data, infrastructure data, capital data, and/or market trends data as inputs and/or constraints into the model. As yet another example, the multi-optimization model can use technoeconomic analysis data as inputs and/or constraints into the model. The technoeconomic analysis data can be data output by an analysis of the economic performance of the operation of the assets of the processing plant and/or an analysis of the economic performance of the one or more products produced by the operation of the assets of the processing plant. As yet another example, the multi-optimization model can use target dates and/or time frames as inputs and/or constraints into the model (e.g., the carbon emissions goal value may be to achieve net zero carbon emissions within a time frame of ten years). As yet another example, the multi-optimization model can use government and/or regional subsidies, such as tax credits that are associated with carbon emissions and/or the use of bio-feedstocks. In various examples, the multi-optimization model can determine where the bio-feedstocks should be processed and/or what product should utilize the bio-feedstocks.

As yet another example, the multi-optimization model can use objectives and/or operating requirements as inputs and/or constraints into the model, which may change over time, to optimize the cumulative carbon output value and/or the optimized cumulative impact value associated with the operations of the plurality of assets of the processing plant. As a non-limiting example, an objective may be to achieve a net cumulative carbon output value associated with the operations of the plurality of assets or of the plant within a certain time-frame, such as within ten years, without the obtainment of carbon offset products within the certain time-frame. An additional objective may be to achieve the net cumulative carbon output value while also achieving the lowest marginal abatement impact value and the lowest asset alteration impact value possible. However, because technology, metrics, such as financial and energy metrics, regulatory requirements, and/or consumer requirements may change over time, the multi-optimization model allows for the adjustment of the optimizations. For example, the cost and availability of renewable energy, such as renewable electricity and green hydrogen, may continue to improve. As such, as the cost and availability of the renewable energy improves, the multi-optimization model can account for the reduced cost and increased availability and recommend the obtainment of and/or automatically obtain the renewable energy in lieu of the previously used non-renewable energy. In yet other examples, other factors, such as interest rates and/or government reporting requirements, may change over time, which can also be incorporated into the multi-optimization model's algorithms so that the it can be determined whether new or different transformation actions should be recommended or automatically performed to achieve objectives, such as the objective to achieve the net cumulative carbon output value associated with the operations of the plurality of assets or of the plant within the certain time-frame.

Generating the optimized set of transformation actions corresponding to the plurality of assets utilizing the multi-optimization model can include generating a plurality of scenarios for the optimized set of transformation actions. For example, a first scenario can include one or more transformation actions associated with one or more assets of the plurality of assets of the processing plant, and a second scenario can include one or more transformation actions associated with one or more assets of the plurality of assets of the processing plant. The second scenario can be different than the first scenario such that at least one of the transformation actions of the second scenario is different than at least one of the transformation actions of the first scenario. Additionally or alternatively, the second scenario can be different than the first scenario such that the one or more transformation actions of the first scenario are associated with at least one different asset than the one or more transformation action of the second scenario. Additionally or alternatively, the second scenario can be different than the first scenario such that an optimized cumulative carbon output value associated with the plurality of assets of the first scenario is different than an optimized cumulative carbon output value associated with the plurality of assets of the second scenario. In some embodiments, the multi-optimization model generates and/or selects a particular scenario that optimizes (e.g., maximizes, minimizes, or otherwise approaches a preferred value) any number of optimization parameters based at least in part on the constraints, input data, and/or the like.

Generating the plurality of scenarios for the optimized set of transformation actions can be done in real-time or in near real-time. For example, the first scenario can be generated in real-time or in near real-time with the generation of the second scenario. Additionally, a relatively large number of scenarios may be generated in real-time or in near real-time. More specifically, more than five scenarios, such as more than ten scenarios, such as more than one hundred scenarios, such as more than one thousand scenarios, such as more than ten thousand scenarios, can be generated within a relatively short time frame, such as within a week, such as within a day, such as within an hour, such as within five minutes. As will be appreciated, generating a great number of scenarios, all within a relatively short time frame, is impossible to do with the human mind and/or with existing methods. Additionally, as described, the processing plant may have a great number of assets. The great number of assets can each correspond to the relatively large number of scenarios. Therefore, generating the great number of scenarios that correspond to the relatively large number of scenarios is impossible to do with the human mind and/or with existing methods.

As used herein, the phrase "optimized cumulative carbon output value associated with the plurality of assets" refers to the expected, calculated, measured, and/or determined cumulative carbon output value associated with the plurality of assets of the processing plant after the action that is associated with the one or more transformation actions is performed. As used herein, the phrase "optimized cumulative impact value associated with the plurality of assets" refers to the expected, calculated, and/or determined cumulative impact value associated with the plurality of assets of the processing plant after the action that is associated with the one or more transformation actions is performed. As used herein, the phrase "current cumulative carbon output value associated with the plurality of assets" refers to the expected, calculated, measured, and/or determined cumulative carbon output value associated with the plurality of assets of the processing plant before the action that is associated with the one or more transformation actions is performed. As used herein, the phrase "current cumulative impact value associated with the plurality of assets" refers to the expected, calculated, and/or determined cumulative impact value associated with the plurality of assets of the processing plants before the action that is associated with the one or more transformation actions is performed.

After the first scenario and the second scenario are generated, the first scenario and the second scenario can be compared, such as automatically compared, utilizing the multi-optimization model. The first scenario and the second scenario can be compared based on certain criteria, variables, constraints, preferences, inputs, etc. For example, the first scenario and the second scenario can be compared based on an optimized cumulative carbon output value associated with the plurality of assets and a carbon emissions goal value, such as a cumulative carbon emissions goal value for the plurality of assets. Based on the comparison, it can be determined if either of the first scenario or the second scenario has an optimized cumulative carbon output value that is below the cumulative carbon emissions goal value. Additionally or alternatively, it can be determined which of the first scenario or the second scenario has a lower optimized cumulative impact value and/or optimized cumulative carbon output value. Based on the determinations, the transformation actions within the scenario that has the lower optimized cumulative impact value and/or the lower optimized cumulative impact value and/or the cumulative carbon output value that is below the cumulative carbon emissions goal value can be selected, recommended, performed, such as automatically performed and/or initiated, such as automatically initiated.

Figure 23:
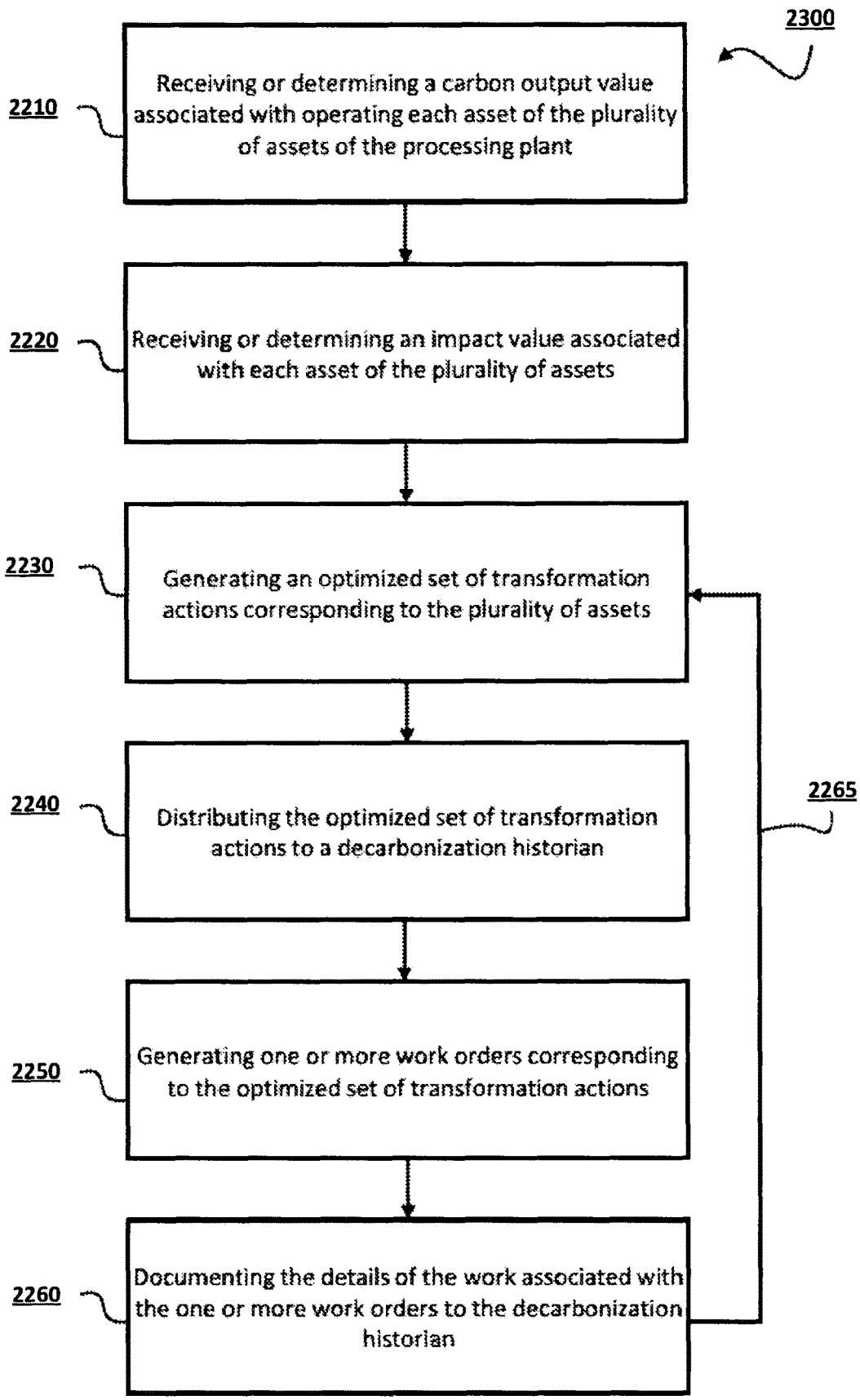
FIG. 23 illustrates a flow chart of a method for optimizing carbon emissions associated with an operation of a processing plant in accordance with an example embodiment of the present disclosure.

Referring now to FIG. 23, a flow chart of a method 2300 for reducing carbon emissions for a plurality of assets of a processing plant, such as a processing plant embodying or including an oil refinery, in accordance with an example embodiment of the present disclosure is shown. The method 2300 can include the step 2210, the step 2220, and the step 2230 as previously described in relation to method 2200. However, the method 2300 can also include a step 2240 of distributing the optimized set of transformation actions to a decarbonization historian. For example, the optimized set of transformation actions can be documented within and/or saved to the decarbonization historian and a work order can be generated and sent, such as automatically sent to the processing plant system 2004 to schedule and perform the one or more actions associated with the optimized set of transformation actions, in step 2250 of method 2300. In various examples, the work order can be sent to the processing plant's enterprise resource planning (ERP) system to schedule and perform the one or more actions associated with the optimized set of transformation action.

As described, each transformation action can be, can be representative of, or can initiate an action that, if taken, may, or is expected to, reduce the carbon output value associated with operating a particular asset of the plurality of assets or of the processing plant and/or may reduce the impact value associated with the particular asset of the plurality of assets and/or the processing plant. Once the one or more actions corresponding to the optimized set of transformation actions is performed and/or completed, the details of the one or more actions can be documented into the decarbonization historian, in step 2260 of method 2300. For example, the details of a completed work order associated with the action corresponding to the transformation action can be saved into the decarbonization historian. The details of the completed work order can include information that is related to the action or to the asset. For example, the details of the completed work order can include the date and time the work was started and/or completed, the personnel and/or vendor who completed the work, the carbon output value of the asset prior to the work being completed, the carbon output value of the asset after the work is completed, the cost of the labor associated with the action, the cost of the components installed on the asset, etc.

In various examples, once the one or more actions corresponding to the optimized set of transformation actions is performed and/or completed, the details of the one or more actions can be used in the multi-optimization model to generate a subsequent optimized set of transformation actions, which is illustrated as feedback loop 2265 of method 2300. For example, details regarding the carbon output value associated with operating the asset after the transformation is performed and/or completed can be subsequently used in the multi-optimization model to generate the subsequent optimized set of transformation actions. Additionally, or alternatively, details regarding the impact value associated with the asset after the transformation action is performed and/or the impact value associated with the transformation action can be saved into the decarbonization historian and/or the ERP system and subsequently used in the multi-optimization model to generate the subsequent optimized set of transformation actions. In various examples, an actual asset alteration impact value associated with asset is used in the multi-optimization model to generate the subsequent optimized set of transformation actions. In this way, the more the multi-optimization model is used in conjunction with the decarbonization historian and/or the ERP system, the more accurate the inputs into the multi-optimization may become. Therefore, using the decarbonization historian in conjunction with the multi-optimization model may increase the accuracy and/or effectiveness of the multi-optimization model.

Even though examples have been provided that optimize the scenarios and corresponding transformation actions utilizing the multi-optimization model based on the optimized cumulative carbon output value associated with the plurality of assets and/or the optimized cumulative impact value associated with the plurality of assets, other constraints and preferences are contemplated. For example, the scenarios can be optimized based on minimizing capital investment, minimizing capital expenditures (CapEx), minimizing operational expenditures (OpEx), minimizing risk, minimizing time frames for completion of the action associated with the corresponding transformation action, maximizing regulatory compliance, etc. In some embodiments, the multi-optimization model optimizes a plurality of target parameters in real-time or in near real-time based at least in part on weights applied to such target parameters.

Additionally, or alternatively, the multi-optimization model can be based, at least partially, on accounting for negative implications of transformation actions. For example, negative implications can include a variance in product quality, yield, planned and unplanned equipment and/or processing plant downtime, and unplanned release of carbon emissions.

Additionally, or alternatively, the multi-optimization model can be based, at least partially, on optimizing start-up and shut-down procedures of the processing plant as a result of the planned and unplanned equipment and/or processing plant downtime. Optimizing the start-up and shut-down procedures of the processing plant may impact carbon emissions as it relates to turnarounds during the processes.

Figure 24:
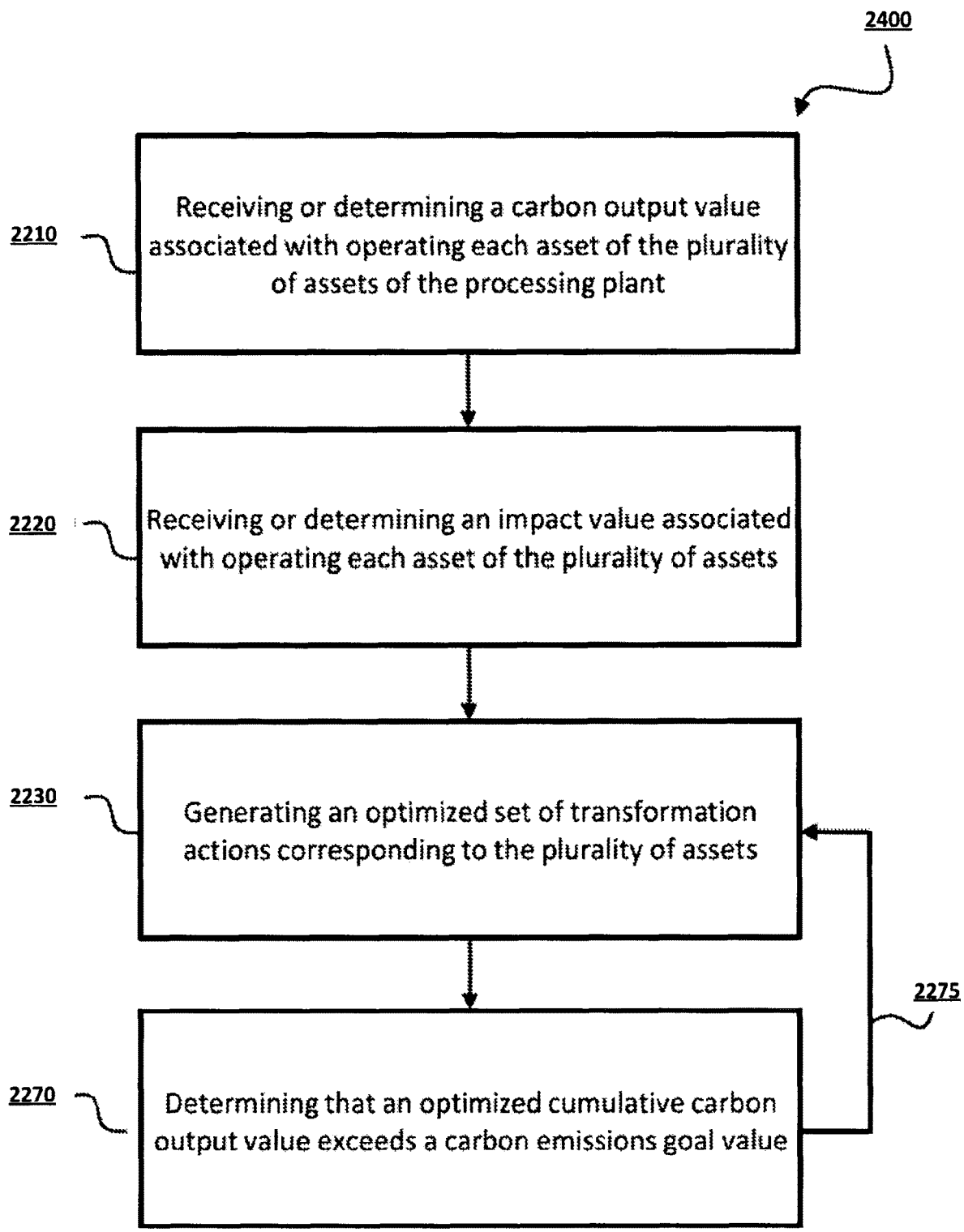
FIG. 24 illustrates a flow chart of a method for optimizing carbon emissions associated with an operation of a processing plant in accordance with an example embodiment of the present disclosure.

Referring now to FIG. 24, a flow chart of a method 2400 for reducing carbon emissions for a plurality of assets of a processing plant in accordance with an example embodiment of the present disclosure is shown. The method 2400 can include the step 2210, the step 2220, and the step 2230 as previously described in relation to method 2200. Also, or alternatively, even though not shown, the method 2400 can include the step 30, the step 2250, and/or the step 2260 of method 2300.

Referring still to FIG. 24, the method 2400 can include a step 2270 of determining that an optimized cumulative carbon output value exceeds a carbon emissions goal. In response to determining that the optimized cumulative carbon output value exceeds the carbon emissions goal, an optimized set of transformation actions can be generated in step 2230, which is depicted as feedback loop 2275.

Determining whether an optimized cumulative carbon output value exceeds a carbon emissions goal value can be done in real-time or in near real-time with generating the optimized set of transformation actions. In this way, the optimized cumulative carbon output value can be monitored, either constantly or at a cadence, and when the optimized cumulative carbon output values exceeds the carbon emissions goal value, a new optimized set of transformation actions can be generated to reduce the cumulative carbon output value associated with the processing plant or the assets.

Various factors may cause the previously optimized cumulative carbon output value to exceed a carbon emissions goal value. For example, inputs or constraints may change over time. For example, the carbon emissions goal value may change. Also, assets may deteriorate over time, which may cause a change in the cumulative carbon output value to increase. For example, the effectiveness of a catalytic combustor or a carbon capture system may decrease over time. As such, it may be beneficial to monitor the effectiveness of these assets and make adjustments with the multi-optimization model to generate a new optimized set of transformation actions. In a non-limiting example, the asset can be a furnace and the health of the furnace can be monitored. For example, the health of the furnace, or the health of a burner of the furnace, can be monitored by a sensor and/or periodically inspected. The information from the sensors and/or inspections can be used by the decarbonization historian and/or the ERP system to replace components and/or make adjustments to the furnace. For example, adjustments to the temperature profile and/or adjustment for flame control can be made to optimize excess oxygen.

In various examples, the decarbonization historian and/or the ERP system can be used to determine whether the inputs and/or constraints into the multi-optimization model have changed and, in response to the inputs and/or constraints changing, a new optimized set of transformation actions can be generated. Stated differently, various factors (e.g., inputs and/or constraints into the multi-optimization model) may cause the previously optimized plurality of assets to no longer be a best-case-scenario; therefore, the optimizations may be regenerated to generate a new optimized plurality of assets. For example, the cost of a renewable energy source may change, and/or the cost of obtaining a carbon offset product may change. As such, other transformation actions other than the obtainment of a renewable energy source and/or the obtainment of a carbon offset product may be better, or vice-versus. For example, as the cost of renewable electricity decreases and the cost of fossil fuels increases, it may become more beneficial to replace fuel powered equipment with electric powered equipment and power the electric powered equipment with renewable electricity. As another example, as the cost of carbon offset products increases, it may become more beneficial to reduce the amount of carbon offset products obtained, but to instead perform other transformation actions, such as installing carbon capture equipment, to reduce carbon emissions. In this way, data from the ERP system and/or decarbonization historian can be monitored, either constantly or at a cadence, to determine whether the currently optimized plurality of assets are the best-case scenario. If they are not, the multi-optimization model can be used to generate a new optimized set of transformation actions.

Figure 25:
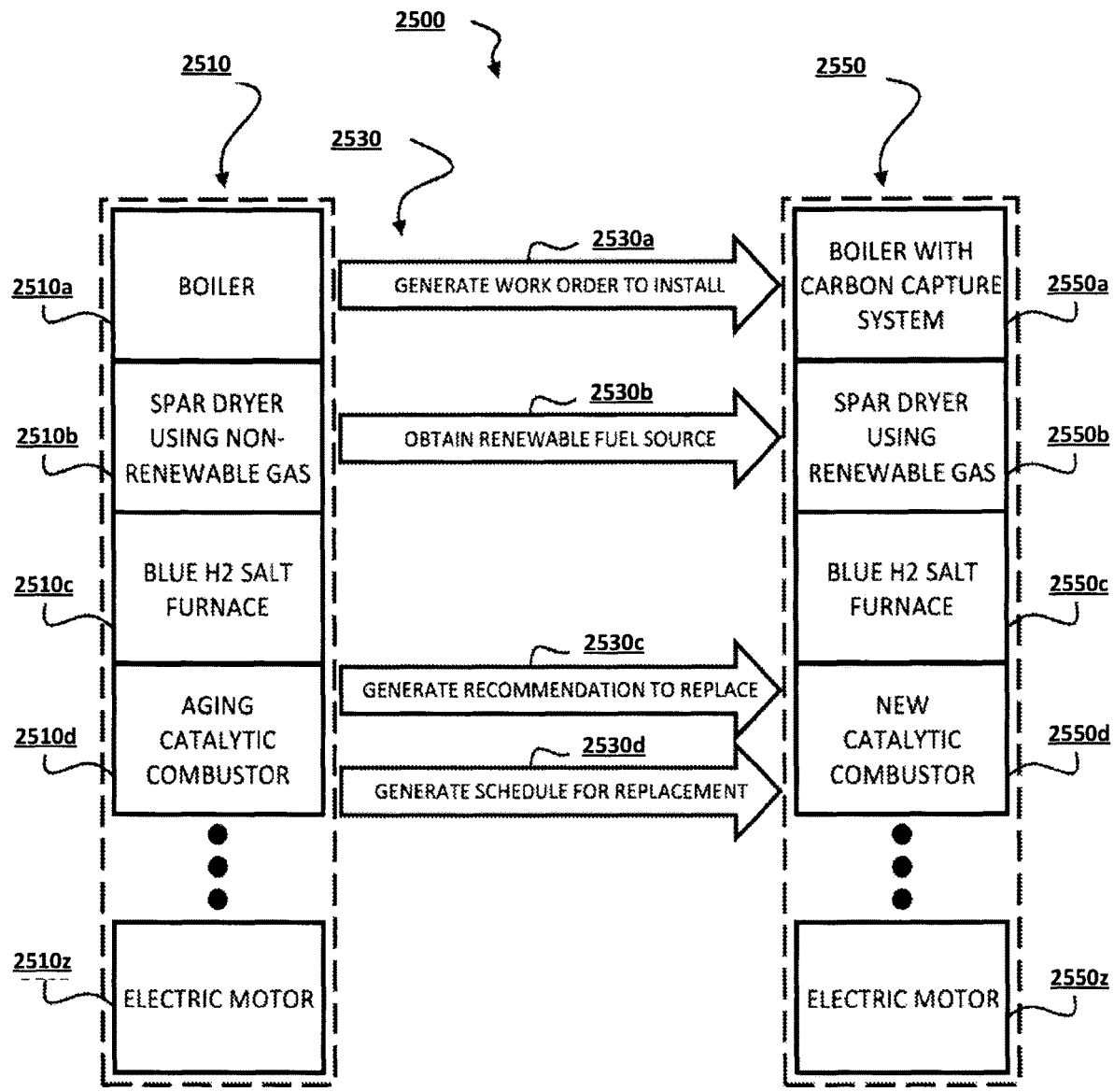
FIG. 25 illustrates an implementation of the method of FIG. 22 for optimizing carbon emissions associated with an operation of a processing plant in accordance with an example embodiment of the present disclosure.

FIG. 25 illustrates an implementation of the method 2200 of FIG. 22 for optimizing carbon emissions associated with an operation of a processing plant that includes a plurality of assets 2510 in accordance with an example embodiment of the present disclosure. In this example, the plurality of assets 2510 includes a multitude of assets, including a first asset 2510a, a second asset 2510b, a third asset 2510c, a fourth asset 2510d, and a last asset 2510z. In this example, the first asset 2510a is a boiler, the second asset 2510b is a spar dryer, the third asset 2510c is a salt furnace, the fourth asset 2510d is a catalytic combustor, and the last asset 2510z is an electric motor. However, it should be understood that any number of assets, including just one, are contemplated and any variety of different assets are contemplated.

As described, generating the optimized set of transformation actions 2530 can be generated based on various scenarios 2500. The example of FIG. 25 depicts one of the scenarios 2500. At least one of the plurality of assets 2510 of the scenario 2500 can correspond to a transformation action of an optimized set of transformation actions 2530. In this example, the first asset 2510a corresponds to a first transformation action 2530a, the second asset 2510b corresponds to a second transformation action 2530b, the fourth asset 2510d corresponds to both a third transformation action 2530c and a fourth transformation action 2530d. Also, in this example, the third asset 2510c and the last asset 2510z correspond to a 'no action' transformation action (not depicted).

Referring still to FIG. 25, each of the assets of the optimized set of transformation actions 2530 can be associated with a corresponding optimized plurality of assets 2550. As used herein, the term "optimized plurality of assets" refers to a representation of, or is, the plurality of assets 2510 after at least one transformation action of the optimized set of transformation actions 2530 is performed. For example, in the example of FIG. 25, the first asset 2510a is a boiler and the corresponding first transformation action 2530a is to generate a work order to install a carbon capture system onto the boiler. The corresponding optimized asset 2550a is a boiler with a carbon capture system installed onto it, or a representation thereof.

Also in this example, the second asset 2510b is a spar drying that is using a non-renewable gas. The corresponding second transformation action 2530b is to obtain, such as automatically obtain, a renewable fuel source instead of a non-renewable fuel source. The optimized asset 2550b is a spar dryer using renewable gas, or a representation thereof. Notably, a physical change to the second asset 2510b may not be necessary. Instead, just a change to the fuel may, at least partially, reduce the optimized cumulative carbon output value associated with the plurality of assets and/or reduce the optimized cumulative impact value associated with the plurality of assets.

Still referring to FIG. 25, the fourth asset 2510d of the plurality of assets 2510 may correspond to both the third transformation action 2530c and the fourth transformation action 2530d. The third transformation action 2530c, in this example, is to generate a recommendation to replace the third asset 2510c; the fourth transformation action 2530d, in this example, is to generate a schedule for the replacement of the third asset 2530c. The corresponding optimized asset 2550d is, or is a representation of, a new catalytic combustor. Additionally, the optimized asset 2550d is associated with a schedule as to when the asset 2510d should be replaced.

Figure 26:
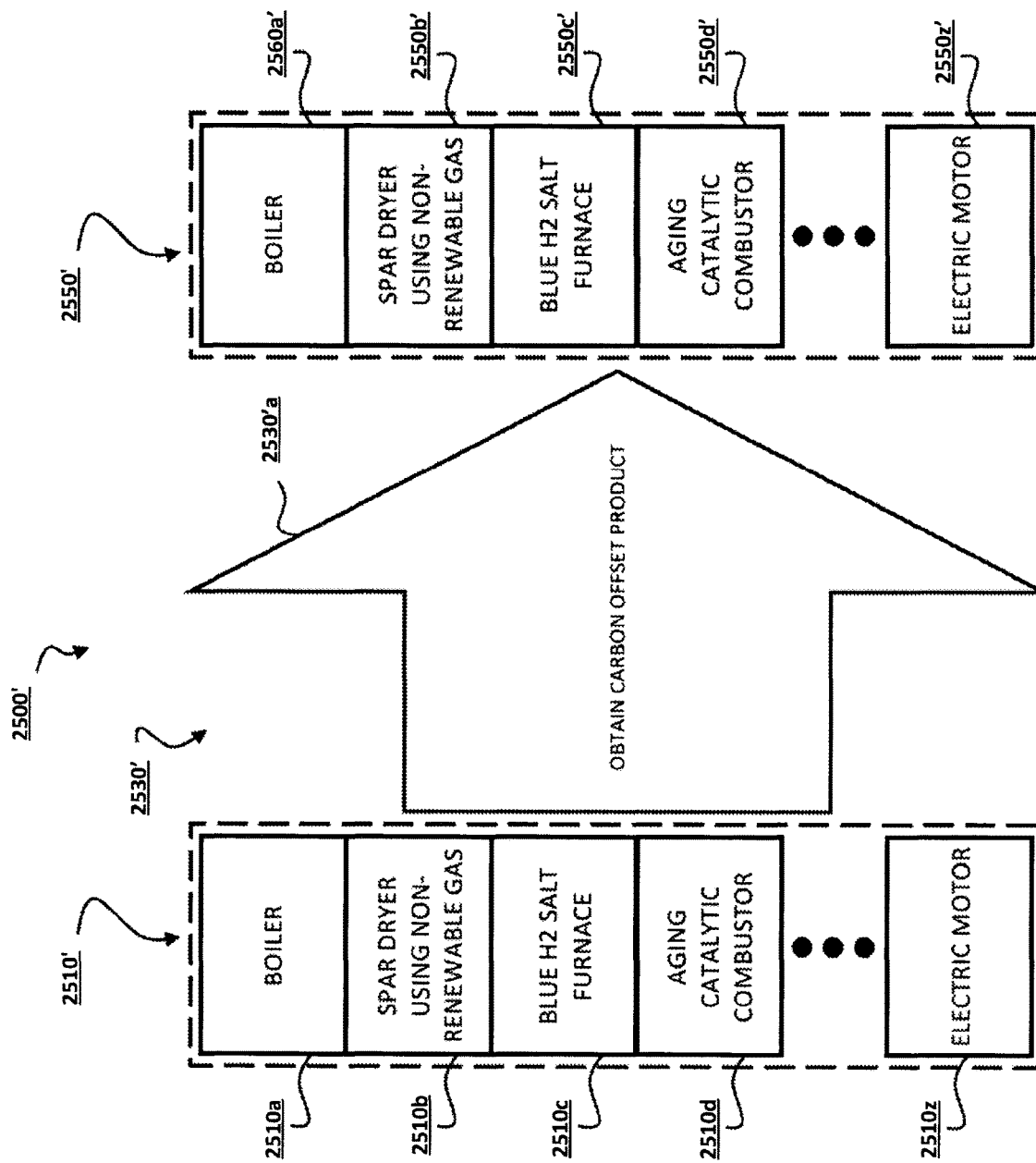
FIG. 26 illustrates an implementation of the method of FIG. 22 for optimizing carbon emissions associated with an operation of a processing plant in accordance with an example embodiment of the present disclosure.

Referring now to FIG. 26, an example implementation of the method 2200 of FIG. 22 for reducing carbon emissions associated with an operation of a processing plant, such as a processing plant embodying or including an oil refinery, that includes a plurality of assets 2510 is illustrated, in accordance with an example embodiment. The illustration of FIG. 26 can illustrate a scenario 2500' that includes an optimized set of transformation actions 2530' that can be generated based on the scenario 2500'. In this example, each of the plurality of assets 2510 are associated with a first transformation action 2530a' and a 'no action' transformation action (not shown). The transformation action 2530a' in this example is to obtain a carbon offset product, such as a carbon credit, for the operation of all of the plurality of assets 2510. The corresponding optimized plurality of assets 2550' remains physically unchanged from the plurality of assets 2510. However, because the carbon offset products are, or will be, obtained, either the optimized cumulative carbon output value associated with the optimized plurality of assets 2550' is less than the current cumulative carbon output value associated with the plurality of assets 2510, and/or the optimized cumulative impact value associated with the optimized plurality of assets 2550' is less than the current cumulative asset impact value associated with the plurality of assets 2510. Additionally, the cumulative carbon output value directly emitted by the plurality of assets 2510 of the processing plant remains unchanged. However, due to the obtainment of the carbon offset product, the cumulative carbon output value indirectly emitted by the plurality of assets of the processing plant is reduced, or is expected to be reduced, after the carbon offset product is obtained. Therefore, in this example, the optimized cumulative asset impact value is based at least in part on the optimized set of transformation actions 2530a'. Additionally, because the obtainment of carbon offset product may reduce government fees, the optimized cumulative asset impact value is based at least in part on the optimized set of transformation actions 2530'.

Even though only various examples of scenarios 2500, 2500' have been illustrated, other examples of scenarios 2500 are contemplated. For example, a scenario 2500 can include a detailed schedule of when one or more actions associated with the optimized set of transformation actions 2530a are to be performed. The schedule, which can be generated by the multi-optimization model, can include start dates, end dates, expected impact values for the optimized plurality of assets 2550' for various time frames, etc. Additionally, the optimizations performed by the multi-optimization model can accommodate for preferences, constraints, and goals. For example, the multi-optimization model can generate a schedule that maintains the optimized cumulative impact value below a threshold value for each year while also achieving a carbon emissions goal value within a certain time frame. In various examples, the multi-optimization model can generate a schedule that maintains the asset alteration impact value below a threshold value for each year while also achieving a zero-emissions goal value within a certain time frame.

Uncertainty and Uncertainty Modeling Embodiments

Particular embodiments of the present disclosure with respect to generation of uncertainty values and uncertainty models generally will now be discussed. It will be appreciated that such embodiments may describe sub-embodiments, or in some contexts super-embodiments, of those described above with respect to FIGS. 1-10, 11-19, and/or 20-26, or any combination thereof. For example, the uncertainty modeling processes as described further herein may be utilized to accurately determine and/or account for uncertainty in any of the optimization modeling processes as described herein. In this regard, the example system 100 for example in some embodiments is embodied by, includes, or otherwise is represented by the example system 2700. Similarly, additionally or alternatively in some embodiments the apparatus 200 embodies, is included as a subcomponent, or otherwise represents an example of the optimized planning system, for example embodied by the apparatus 2800 as discussed further herein. In this regard, it will be appreciated that any of the functionality performed by the apparatuses, computing systems, and/or the like as depicted and described with respect to FIGS. 1-10, 11-19, and/or 20-26, may similarly be performed by apparatuses, computing systems, and/or other embodiments as depicted and described with respect to FIGS. 27-32.

Figure 27:
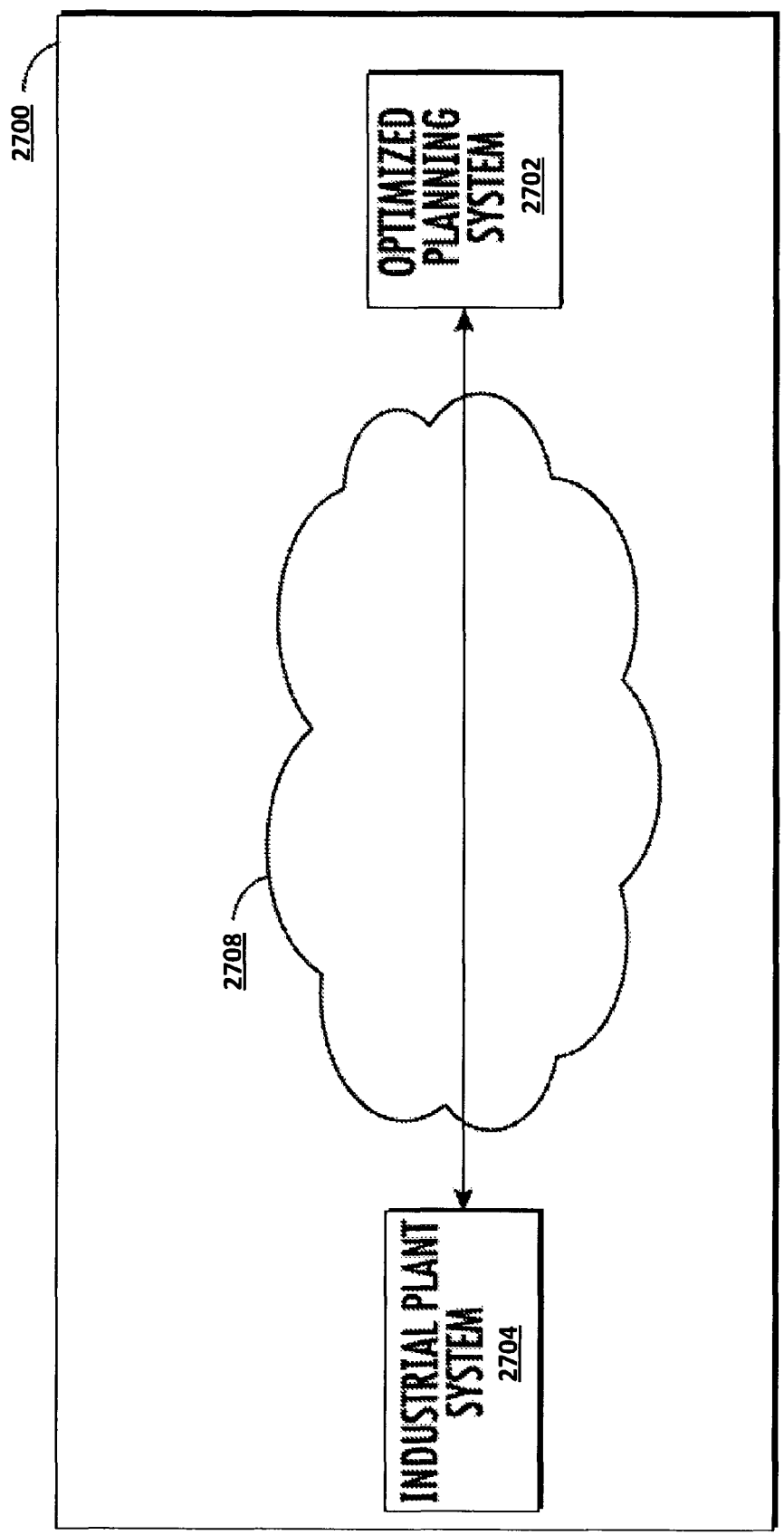
FIG. 27 illustrates a block diagram of a system that may be specially configured within which embodiments of the present disclosure may operate.

FIG. 27 illustrates a block diagram of a system that may be specially configured within which embodiments of the present disclosure may operate. Specifically, FIG. 27 depicts an example system 2700. As illustrated, the system 2700 includes an industrial plant system 2704, in communication with an optimized planning system 2702. In some embodiments, the industrial plant system 2704 communicates with the optimized planning system 2702 over one or more communication network(s), for example a communication network 2708. In some embodiments, the optimized planning system 2702 is in communication with a plurality of industrial plant systems, each identically or similarly configured to the industrial plant system 2704. In some such embodiments, the optimized planning system 2702 may process data associated with each industrial plant system independently, and/or in some contexts processes data associated with multiple industrial plant systems in the aggregate (e.g., when processing all industrial plant systems associated with a particular entity, region, and/or the like).

It should be appreciated that the communications network 2708 in some embodiments is embodied in any of a myriad of network configurations. In some embodiments, the communications network 2708 embodies a public network (e.g., the Internet). In some embodiments, the communications network 2708 embodies a private network (e.g., an internal localized, or closed-off network between particular devices). In some other embodiments, the communications network 2708 embodies a hybrid network (e.g., a network enabling internal communications between particular connected devices and external communications with other devices). The communications network 2708 in some embodiments includes one or more base station(s), relay(s), router(s), switch(es), cell tower(s), communications cable(s) and/or associated routing station(s), and/or the like. In some embodiments, the communications network 2708 includes one or more user controlled computing device(s) (e.g., a user owned router and/or modem) and/or one or more external utility devices (e.g., Internet service provider communication tower(s) and/or other device(s)).

Each of the components of the system 2700 communicatively coupled to transmit data to and/or receive data from one another over the same or different wireless and/or wired networks embodying the communications network 2708. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 27 illustrate certain system entities as separate, standalone entities communicating over the communications network 2708, the various embodiments are not limited to this architecture. In other embodiments, one or more computing entities share one or more components, hardware, and/or the like, or otherwise are embodied by a single computing device such that connection(s) between the computing entities are over the communications network 2708 are altered and/or rendered unnecessary. For example, in some embodiments, the industrial plant system 2704 includes some or all of the optimized planning system 2702, such that an external communications network 2708 is not required.

In some embodiments, the industrial plant system 2704 and the optimized planning system 2702 are embodied in an on-premises system within or associated with the industrial plant. In some such embodiments, the industrial plant system 2704 and the optimized planning system 2702 are communicatively coupled via at least one wired connection.

Alternatively or additionally, in some embodiments, the industrial plant system 2704 embodies or includes the optimized planning system 2702, for example as a software component of a single enterprise terminal.

The industrial plant system 2704 includes any number of computing device(s), system(s), physical component(s), and/or the like, that facilitates producing of any number of products, for example utilizing particular configurations that cause processing of particular inputs available within the industrial plant system 2704. In some embodiments, the industrial plant system 2704 includes one or more physical component(s), connection(s) between physical component(s), and/or computing system(s) that control operation of each physical component therein. The industrial plant system 2704, for example, can embody an oil refinery, an automotive engine manufacturing plant, a distillery, and/or the like, which includes physical component(s) that perform particular process(es) to alter properties of inputs to the component(s). Additionally or alternatively, in some embodiments the industrial plant system 2704 includes one or more computing system(s) that are specially configured to operate the physical component(s) in a manner that produces one or more particular product(s) simultaneously. In some embodiments, an industrial plant system 2704 includes one or more computing device(s) and/or system(s) embodied in hardware, software, firmware, and/or a combination thereof, that configure and/or otherwise control operation of one or more physical component(s) in the industrial plant. For example, in some embodiments, such computing device(s) and/or system(s) include one or more programmable logic controller(s), MPC(s), application server(s), centralized control system(s), and/or the like, that control(s) configuration and/or operation of at least one physical component. It will be appreciated that different industrial plant system(s) may include or otherwise be associated with different physical component(s), computing system(s), and/or the like.

The optimized planning system 2702 includes one or more computing device(s) and/or system(s) embodied in hardware, software, firmware, and/or a combination thereof, that can generate one or more predicted optimized plans associated with operation of a particular industrial plant or particular sub-components thereof. The one or more predicted optimized plans comprise optimized plan data, for example, associated with one or more physical components, assets, and/or the like associated with the industrial plant. The predicted optimized plan for example, may comprise a plan to achieve net zero emission within a specified time horizon. In some embodiments, the optimized planning system 2702 generates a predicted optimized plan utilizing one or more models, such as an optimization model embodying a model predictive control (e.g., a non-linear model predictive control (NMPC)). In some embodiments, the optimized planning system 2702, utilizing an optimization model, may be configured to formulate and/or optimize one or more planning optimization-related problems associated with the optimization model in order to generate a predicted optimized plan that effectively accounts for uncertainty in the input data. The optimized planning system, for example, may perform one or more modeling operations that facilitates prediction of an optimized plan associated with the operation of an industrial plant based at least in part on input data associated with the industrial plant and that are inputted into, applied to, and/or the like to the optimization model.

In some embodiments, the optimized planning system 2702 includes one or more application server(s) and/or database server(s) that provide such functionality. Additionally or alternatively, in some embodiments, the optimized planning system 2702 includes one or more client device(s), user device(s), and/or the like, that enable access to the functionality provided via the optimized planning system 2702, for example via a web application, a native application, and/or the like executed on the client device.

Additionally or alternatively, in some embodiments, the optimized planning system 2702 may be utilized to facilitate control and/or automatic reconfiguration of the operation of one or more physical component(s) in an industrial plant. In some embodiments, the optimized planning system 2702 includes or embodies a display or other user interface to which a user-facing interface is renderable.

In some embodiments, the optimized planning system 2702 and/or industrial plant system 2704 communicate with one another to perform the various actions described herein. For example, in some embodiments, the optimized planning system 2702 and the industrial plant system 2704 communicate to generate predicted optimized plan(s) comprising optimized plan data associated with operation of a particular industrial plant, or particular sub-components thereof. Additionally or alternatively, in some embodiments, the optimized planning system 2702 and the industrial plant system 2704 communicate to facilitate control or adjustment of operation of physical component(s) in the industrial plant based at least in part on the generated predicted optimized plan. For example, in some embodiments the optimized planning system 2702 and the industrial plant system 2704 communicate to automatically configure or reconfigure one or more physical component(s) of the industrial plant in accordance with the predicted optimized plan.

Figure 28:
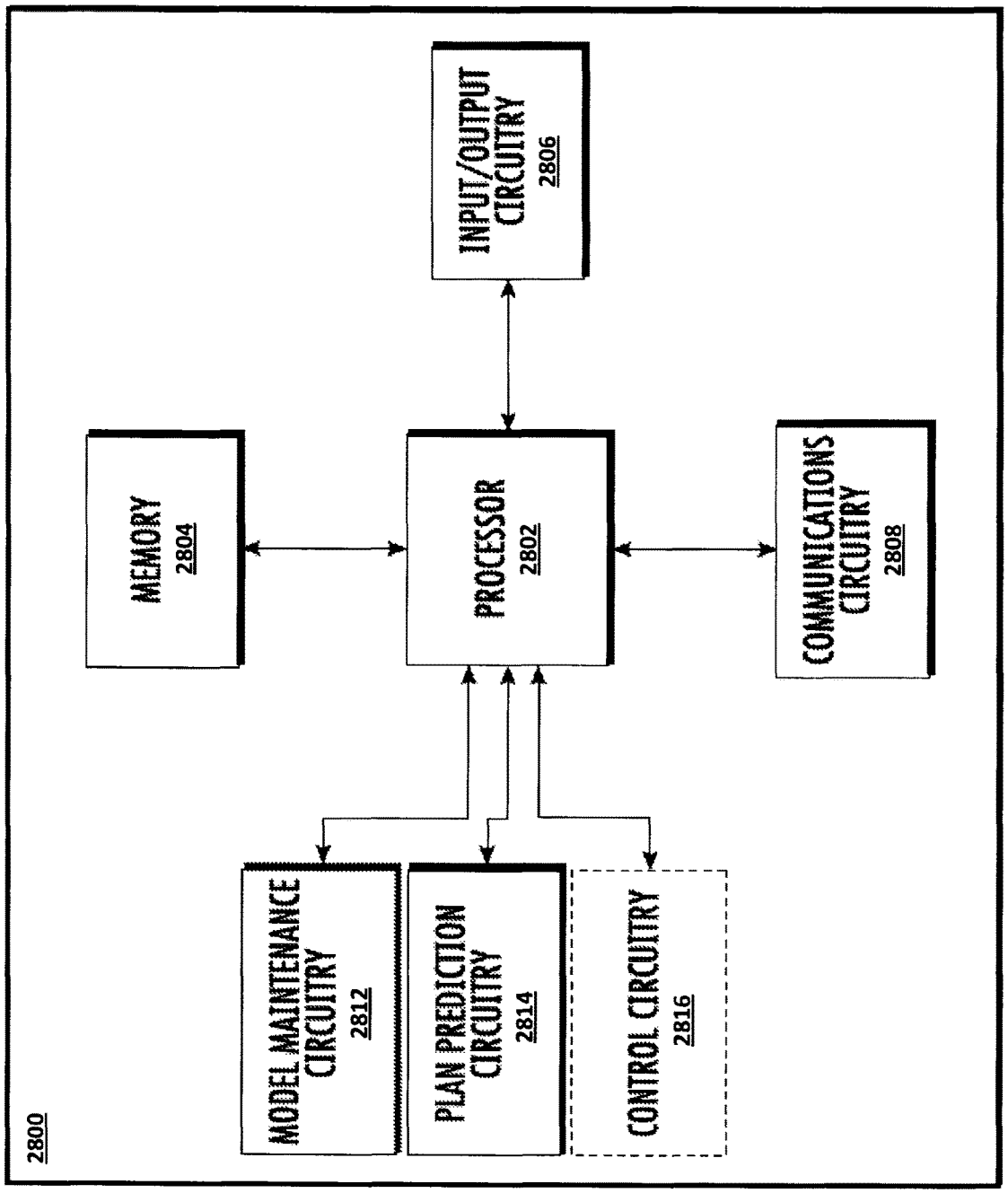
FIG. 28 illustrates a block diagram of an example apparatus that may be specially configured in accordance with an example embodiment of the present disclosure.

FIG. 28 illustrates a block diagram of an example apparatus that may be specially configured in accordance with an example embodiment of the present disclosure. Specifically, FIG. 28 depicts an example computing apparatus 2800 ("apparatus 2800") specially configured in accordance with at least some example embodiments of the present disclosure. In some embodiments, the optimized planning system 2702, and/or a portion thereof is embodied by one or more system(s), such as the apparatus 2800 as depicted and described in FIG. 28. The apparatus 2800 includes processor 2802, memory 2804, input/output circuitry 2806, communications circuitry 2808, model maintenance circuitry 2812, plan prediction circuitry 2814, and optional control circuitry 2816. In some embodiments, the apparatus 2800 is configured, using one or more of the sets of circuitry 2802, 2804, 2806, 2808, 2812, 2814, and/or 2816, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 2800 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 2800 provide or supplement the functionality of another particular set of circuitry. For example, the processor 2802 in some embodiments provides processing functionality to any of the sets of circuitry, the memory 2804 provides storage functionality to any of the sets of circuitry, the communications circuitry 2808 provides network interface functionality to any of the sets of circuitry, and/or the like.

In some embodiments, the processor 2802 (and/or co-processor or any other processing circuitry assisting or otherwise associated with the processor) is/are in communication with the memory 2804 via a bus for passing information among components of the apparatus 2800. In some embodiments, for example, the memory 2804 is non-transitory and may include, for example, one or more volatile and/or non-volatile memories. In other words, for example, the memory 2804 in some embodiments includes or embodies an electronic storage device (e.g., a computer readable storage medium). In some embodiments, the memory 2804 is configured to store information, data, content, applications, instructions, or the like, for enabling the apparatus 2800 to carry out various functions in accordance with example embodiments of the present disclosure.

The processor 2802 may be embodied in a number of different ways. For example, in some example embodiments, the processor 2802 includes one or more processing devices configured to perform independently. Additionally or alternatively, in some embodiments, the processor 2802 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 2800, and/or one or more remote or "cloud" processor(s) external to the apparatus 2800.

In an example embodiment, the processor 2802 is configured to execute instructions stored in the memory 2804 or otherwise accessible to the processor. Alternatively or additionally, the processor 2802 in some embodiments is configured to execute hard-coded functionality. As such, whether configured by hardware or software methods, or by a combination thereof, the processor 2802 represents an entity (e.g., physically embodied in circuitry) capable of performing operations according to an embodiment of the present disclosure while configured accordingly. Alternatively or additionally, as another example in some example embodiments, when the processor 2802 is embodied as an executor of software instructions, the instructions specifically configure the processor 2802 to perform the algorithms embodied in the specific operations described herein when such instructions are executed.

As one particular example embodiment, the processor 2802 is configured to perform various operations associated with generating predicted optimized plan(s) using at least one specially configured model (e.g., optimization model). In some embodiments, the processor 2802 includes hardware, software, firmware, and/or a combination thereof, that determines results for one or more problem formulations associated with the specially configured model. In some embodiments, the processor 2802 includes hardware, software, firmware, and/or a combination thereof, that generates predicted optimized plan (comprising optimized plan data) associated with a particular industrial plant utilizing an optimization model incorporating a model predictive control, such as an NMPC. In some embodiments, the optimization model generates predicted optimized plan(s) associated with an industrial plant based at least in part on input data with uncertainty quantification and associated with operation of the industrial plant. Additionally or alternatively, in some embodiments, the processor 2802 includes hardware, software, firmware, and/or a combination thereof, that outputs the predicted optimized plan(s). Additionally or alternatively, in some embodiments, the processor 2802 includes hardware, software, firmware, and/or a combination thereof, that facilitates reconfiguration of the operation of at least one physical component based at least in part on the predicted optimized plan(s).

In some embodiments, the apparatus 2800 includes input/output circuitry 2806 that provides output to the user and, in some embodiments, to receive an indication of a user input. In some embodiments, the input/output circuitry 2806 is in communication with the processor 2802 to provide such functionality. The input/output circuitry 2806 may comprise one or more user interface(s) and in some embodiments includes a display that comprises the interface(s) rendered as a web user interface, an application user interface, a user device, a backend system, or the like. In some embodiments, the input/output circuitry 2806 also includes a keyboard, a mouse, a joystick, a touch screen, touch areas, soft keys a microphone, a speaker, or other input/output mechanisms. The processor 2802 and/or input/output circuitry 2806 comprising the processor may be configured to control one or more functions of one or more user interface elements through computer program instructions (e.g., software and/or firmware) stored on a memory accessible to the processor (e.g., memory 2804, and/or the like). In some embodiments, the input/output circuitry 2806 includes or utilizes a user-facing application to provide input/output functionality to a client device and/or other display associated with a user.

In some embodiments, the apparatus 2800 includes communications circuitry 2808. The communications circuitry 2808 includes any means such as a device or circuitry embodied in either hardware or a combination of hardware and software that is configured to receive and/or transmit data from/to a network and/or any other device, circuitry, or module in communication with the apparatus 2800. In this regard, in some embodiments the communications circuitry 2808 includes, for example, a network interface for enabling communications with a wired or wireless communications network. Additionally or alternatively in some embodiments, the communications circuitry 2808 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 2808 includes circuitry for interacting with the antenna(s) and/or other hardware or software to cause transmission of signals via the antenna(s) or to handle receipt of signals received via the antenna(s). In some embodiments, the communications circuitry 2808 enables transmission to and/or receipt of data from user device, one or more asset(s) or accompanying sensor(s), and/or other external computing device in communication with the apparatus 2800.

The model maintenance circuitry 2812 includes hardware, software, firmware, and/or a combination thereof, that supports configuration and/or generation of one or more specially configured model(s) utilized to generate predicted optimized plans for a particular industrial plant-such as operational plan(s) for a particular industrial plan to achieve reduced emission (e.g., achieve net zero emission within a specified time horizon). In some embodiments, the model maintenance circuitry 2812 includes hardware, software, firmware, and/or a combination thereof, that performs one or more configuration operations and/or stores model configuration data with respect to the optimization model. In some embodiments, the model maintenance circuitry 2812 includes hardware, software, firmware, and/or a combination thereof, that stores the optimization model. In some embodiments, the model maintenance circuitry 2812 includes hardware, software, firmware, and/or a combination thereof, that updates the optimization model. In some embodiments, the model maintenance circuitry 2812 includes hardware, software, firmware, and/or a combination thereof, that stores historical predicted plans and/or corresponding implementation results. In some embodiments, the model maintenance circuitry 2812 includes hardware, software, firmware, and/or a combination thereof, that updates the optimization model. In some embodiments, the model maintenance circuitry 2812 includes hardware, software, firmware, and/or a combination thereof, that receives or retrieves (e.g., from one or more databases) input data for the optimization model. In some embodiments, the model maintenance circuitry 2812 includes a separate processor, specially configured field programmable gate array (FPGA), or a specially programmed application specific integrated circuit (ASIC).

The plan prediction circuitry 2814 includes hardware, software, firmware, and/or a combination thereof, that supports generation of at least one predicted optimized plan (that accounts for uncertainty associated with operation of corresponding industrial plant) utilizing at least one model (e.g., optimization model). For example, in some embodiments, the plan prediction circuitry 2814 includes hardware, software, firmware, and/or a combination thereof, that receives input data associated with operation of an industrial plant (e.g., one or more physical component(s), product(s), and/or the like of the industrial plant thereof). Alternatively or additionally, in some embodiments, the plan prediction circuitry 2814 includes hardware, software, firmware, and/or a combination thereof, that generates at least one predicted plan or portion of a predicted plan associated with a particular component (e.g., physical component, asset, and/or the like) of an industrial plant utilizing the at least one model (e.g., optimization model) that incorporates uncertainty quantification. In some embodiments, the plan prediction circuitry 2814 utilizes an optimization model embodying a non-linear model predictive control (NMPC). In some embodiments, the plan prediction circuitry 2814 utilizes data associated with one or more component(s) (e.g., physical components(s), assets, and/or the like) as input to the optimization model. In some embodiments, the plan prediction circuitry 2814 includes hardware, software, firmware, and/or a combination thereof, that outputs the at least one predicted optimized plan. In some embodiments, the plan prediction circuitry 2814 includes a separate processor, specially configured field programmable gate array (FPGA), or a specially programmed application specific integrated circuit (ASIC).

The optional control circuitry 2816 includes hardware, software, firmware, and/or a combination thereof, that supports various functionality associated with causing configuration or causing other operation of at least one physical component of an industrial plant. For example, in some embodiments, the control circuitry 2816 includes hardware, software, firmware, and/or a combination thereof, that facilitates and/or causes automatic reconfiguration of the operation of at least one physical component based at least in part on at least a portion of the predicted optimized plan. For example, in some embodiments, the control circuitry 2816 includes hardware, software, firmware, and/or a combination thereof, that configures and/or reconfigures (e.g., automatically configures and/or reconfigures) operation of at least one physical component (e.g., processing machine) of an industrial plant in accordance with the predicted optimized plan that accounts for uncertainty associated with operation of the industrial plant. In some embodiments, the control circuitry 2816 includes a separate processor, specially configured field programmable gate array (FPGA), or a specially programmed application specific integrated circuit (ASIC).

Additionally or alternatively, in some embodiments, two or more of the sets of circuitries 2802-2808 and 2812-2816 are combinable. Alternatively or additionally, in some embodiments, one or more of the sets of circuitry perform some or all of the functionality described associated with another component. For example, in some embodiments, two or more of the sets of circuitry 2802-2808 and 2812-2816 are combined into a single module embodied in hardware, software, firmware, and/or a combination thereof. Similarly, in some embodiments, one or more of the sets of circuitry, for example the model maintenance circuitry 2812, plan prediction circuitry 2814, and/or optional control circuitry 2816, is/are combined with the processor 2802, such that the processor 2802 performs one or more of the operations described above with respect to each of these sets of circuitry 2812-2816.

Having described example systems and apparatuses in accordance with the present disclosure, example optimization model of the disclosure will now be discussed. In some embodiments, one or more computing system(s) and/or device(s) is/are specially configured to maintain and/or generate the optimization model for use in generating predicted optimized plan(s) comprising optimized plan data and that account for uncertainty associated with operation of a corresponding industrial plant. Specifically, the optimization model may be specially configured to address uncertainty associated with one or more portions of input data to be processed. In some embodiments, the optimization model is generated, implemented by, and/or otherwise maintained by an optimized planning system 2702, for example, embodied by the apparatus 2800 as described herein.

In some embodiments, the optimization model is utilized to generate predicted optimized plan(s) for an industrial plant. In some embodiments, the optimization model embodies (or otherwise includes) a non-linear model predive control (NMPC) that account for uncertainty associated with portions of input data to be processed. NMPC in the context of emissions may describe a generalization of model predictive control to simultaneously handle economic, safety, quality, and/or various control objects (such as emissions control objectives) in an optimization-based approach utilizing non-linear models and with a combination of continuous and discrete decision variables. In some embodiments, the optimization model embodies NMPC that can optimize large scope problems for planning with time horizon of various duration, including long time horizons (e.g., time horizons in the order of years, such as 5, 10, 20 years, or longer using, for example, Net Present Value calculations). In some embodiments, the NMPC incorporates an uncertainty formulation to achieve the desired plan goal so as to account for the noted uncertainty in one or portions of input data to be processed in order to generate optimized plan(s). In the context of sustainability goals (e.g., emission reduction), for example, the optimization model may employ a multi-level NMPC to optimize planning (e.g., optimize planning optimization problem) over a time horizon with an appropriate uncertainty formulation that is optimal to attain emissions goals. For example, in some embodiments, the optimization model is configured to optimize long horizon optimization problems that include or otherwise effectively account for uncertainty in one or more portions of the input data (e.g., uncertain input data).

In some embodiments, the optimization model comprises a steady state model for each subsystem of one or more subsystems of an industrial plant in each time interval $t=0, \ldots, n_p$, where $n_p$ may represent the number of prediction intervals into the future. Model decision variables can be any combination of continuous and discrete variables. Discrete variables can only take on integer variables or could be binary variables (0 or 1) and include decisions like "yes/no" for project selection or rejection in a particular time period or "on/off" for equipment in or out of service in particular time periods. In some embodiments, the optimization model may be represented as:

$$f(x_t, u_t, v_t, y_t, e_t, a, b) = 0 \qquad \text{Equation 1}$$

f=nonlinear equations for the system model
$x_t$=model state variables at time t
$u_t$=model decision variables at time t
$v_t$=uncertain input variables at time t
$y_t$=model output variables at time t
$e_t$=model prediction error variables at time t
a=model gain parameters
b=model bias parameters In some embodiments, the optimization model (e.g., represented in equation 1 above) may comprise base process function(s) g and feedback model function(s) having parameterized functions to correct the output of the optimization model.

$$g(x_t, u_t, v_t) = 0 \qquad \text{Equation 2}$$

$$y_t = \text{diag}(a)x_t + b$$

$$x_t - y_t - e_t = 0$$

In some embodiments, the feedback model functions(s) may define a linear model correction with a gain a and bias term b for the prediction error for each historical time interval ($t \leq 0$).

In equations 1 and 2 above, $u_t$ may represent manipulated variables and $y_t$ may represent controlled variables. In some embodiments, manipulated variables may include continuous and/or discrete decision variables (e.g., data, time, and/or the like to execute projects associated with the industrial plant; interval between execution of the projects; site/building of one or more sites/buildings associated with the industrial plant; and/or the like). In some embodiments, controlled variables may include process constraints, emission constraints, project constraints, capital cost constraints, general resource constraints and/or the like. The planning optimization problem may comprise one or more constraints. In some embodiments, the constraints in the planning optimization problem may include lower and upper limits on the manipulated and controlled variables at each time point into the future (e.g., as represented below).

$$y_L \leq y_t \leq y_U \qquad \text{Equation 3}$$

$$u_L \leq u_t \leq u_U$$

In some embodiments, each constraint in the planning optimization problem may be associated with a constraint type of one or more constraint types. Examples of constraint types include soft constraint and hard constraint. Hard constraints may describe a constraint having highest priority and that may not be violated. Non-limiting examples of hard constraints include safety constraints. For example, in some embodiments, each constraint may be classified/categorized as a hard constraint or a soft constraint. In some embodiments, constraints on manipulated variables may be classified as hard constraints. In some embodiments, soft constraints may be allowed to be violated, for example, if there are not enough manipulated variables to meet control objectives associated with the optimization model. In some embodiments, a soft constraint may be relaxed based at least in part on a priority level associated with the soft constraint. For example, in some embodiments, each constraint may be associated with a priority level of a plurality of priority levels, and a given soft constraint may be relaxed based at least in part on the priority level associated with the soft constraint. In the context of generating predicted optimized plan for reducing emissions, for example, emission constraints violations can be prioritized relative to product quality and/or other constraints. In some embodiments, lower constraints and upper constraints of a given variable may be associated with (e.g., assigned) different priority levels. In some embodiments, a user provides information defining a particular constraint, and indicates whether the constraint is a hard constraint or a soft constraint. In some embodiments, constraints are categorized and determined as hard or soft constraint based on the type/category of constraint (e.g., safety constraints may be designated a hard constraint that cannot be violated, financial constraints may be designated a soft constraint that is flexible but still to be optimized for, and the like).

Alternatively or additionally, in some embodiments a constraint can be defined on the rate of change of the variable (e.g., manipulated variable, controlled variable). The lower limit $y_L$, and upper limit $y_L$ can be represented as functions of time to define general reference trajectories. In the context of net zero emissions plan prediction, for example, there can be a specified minimum rate of approach to net zero emissions to ensure progress is made at a specified periodicity (e.g., annual). For example, the minimum rate of approach may embody a constraint to ensure annual progress is made towards a target. In some embodiments, terminal constraints specifying net zero emissions can be specified in the planning optimization problem and can be separately prioritized. In some embodiments, using the noted rate of change constraint approach can ensure progress is made at each time period moving toward the net zero emissions constraint in the future.

In some embodiments, when each hard constraint is satisfied and soft constraint violations are minimized in accordance with a priority order based at least in part on associated priority level, profit maximization may automatically be performed. In some embodiments, a minimum movement formulation may be applied to ensure minimal changes to current operating policies, and/or the like, are made to achieve the planning optimization problem objectives—for example, in an instance where similar results for multiple policies exist. The absolute value of the change in the decision variables $\Delta u_t^{abs}$ can be associated with a cost to accomplish the minimum movement objective. In some embodiments, a total profit P over the prediction horizon (e.g., sum of the profit in each time interval t) may represent the objective function to maximize when the constraint violations have been minimized. In some embodiments, the total profit P may be determined by performing the operations of the below equation:

$$P = \sum_{t=0}^{n_p} P_t = \sum_{t=0}^{n_p} c_y^T y_t + c_u^T u_t + c_v^T v_t + c_{\Delta u}^T \Delta u_t^{abs} \quad \text{Equation 4}$$

P=total profit over the prediction horizon
$P_t$=Profit in time period t
$c_y$=cost associated with model output variable $y_t$
$c_u$=cost associated with decision variable $u_t$
$c_v$=cost associated with uncertain variable $v_t$
$c_{\Delta u}$=cost associated with a change model decision variable $u_t$
$\Delta u_t^{abs}$=absolute value of change in decision variable $u_t$
$n_p$=number of time periods in the prediction horizon In some embodiments, as noted above, the optimization model incorporates a feedback mechanism. The feedback mechanism may be configured to provide feedback to update the parameters of the optimization model and output biases. This feedback mechanism enables a closed loop performance to ensure predictions converge to actual measurements from the processes associated with the industrial plant. In some embodiments, the feedback mechanism includes optimizing a calibration problem. Optimizing the calibration problem may comprise using historical input data (e.g., input data from past history) associated with historical predicted plans (e.g., past predicted plans) to optimize the optimization model. For example, biases between historical predicted plans and corresponding actual measurements (e.g., emissions measurements) may be determined and/or learned and incorporated into the optimization model. The noted calibration problem configuration may be configured to minimize prediction error. In some embodiments, a control sub-problem and an optimization sub-problem may be configured (e.g., optimized) for controlling and optimizing the optimization model predictions respectively, whereby the optimization model predictions may be forced to converge to process outputs in order to have an optimal (e.g., successful) closed loop system. The calibration operation may be performed utilizing one or more of a variety of techniques. In some embodiments, for example, the calibration operation is performed using Moving Horizon Estimation (MHE) technique. In some embodiments, the model parameters can be selected such that a weighted $L_1$ norm of past prediction errors is minimized by choosing optimal (e.g., appropriate) model parameters. The choice of $L_1$ norm of prediction errors can be better than $L_2$ norm if gross errors are present in the measurements and the measurement error does not follow a Gaussian distribution. Depending on the requirements, the minimization of a certain $L_q$ norm of the prediction error could be appropriate. In some embodiments, the calibration operation is performed based at least in part on measured values of past inputs and outputs at each model execution cycle. In some embodiments, the calibration operation comprise optimizing a calibration problem for $n_h$ steps of historical data. In some embodiments, the calibration problem may be optimized for $n_h$ steps of historical data by performing the operations of the below equation:

$$\text{minimize} \psi_0 = \sum_{t=-n_h}^{0} \|e_t\|_q \quad \text{Equation 5}$$

subject to:

$$g(x_t, u_t, v_t) = 0, \, t = -n_h, \ldots, 0$$

$$y_t = \text{diag}(a)x_t + b, \, t = -n_h, \ldots, 0$$

$$x_t - y_t - e_t = 0, \, t = -n_h, \ldots, 0$$

$$y_L \le y_t \le y_U, \, t = -n_h, \ldots, 0$$

$$u_L \le u_t \le u_U, \, t = -n_h, \ldots, 0$$

$\psi_0$=calibration objective function
$\|e_t\|_q$=$L_q$ norm of the prediction error variables $e_t$
$n_h$=number of past history time periods for calibration In some embodiments, optimizing the calibration problem (e.g., MHE calibration problem) comprises determining optimal values for a and b. In equation 5, in an instance where $n_h=1$, the parameters a may be fixed to their default values, for example, due to there being adequate history to estimate the noted parameters. The control horizon may be moving forward in time at a specified execution frequency, whereby the feedback mechanism (e.g., embodying a feedback algorithm) may be configured to correct and recalibrate the optimization model at each model execution cycle to enable closed loop planning. With closed loop planning, results of past plan(s) (e.g., from previous execution cycle(s)) generated utilizing the optimization model can be used by the optimization model in generating predicted plans for the current execution cycle and/or future execution cycles. In some embodiments, responsive to determining optimal values for a and b, these values may be fixed in the subsequent control sub-problem and/or optimization sub-problems. In some embodiments, the calibration problem configuration may incorporate a filtering technique/approach, for example, to allow a tuning factor for each measured value. In some embodiments, outputs for current goal trajectories (e.g., emissions trajectories) from the planning optimization problem can be used as proxy constraints in lower level plant wide and building optimization applications, for example, to enforce a consistent enterprise-wide strategy (e.g., consistent corporate execution strategy). This, in turn, may provide a methodology for coordination of optimization and control at different levels in the enterprise.

As described above, a given constraint may be assigned a priority level. For example each constraint may be associated with a priority group of a plurality of priority groups. A given priority group, for example, may correspond to a particular priority level. In some embodiments, for each priority level, a control error is minimized over the prediction time horizon. In some embodiments, the control error minimization problem may be optimized by performing the operations of the below equation:

$$\text{minimize}_{u_t, \delta_{L_t}, \delta_{U_t}} \psi_j = \sum_{t=1}^{n_p} \left( \sigma_L^T D_j \delta_{L_t} + \sigma_U^T D_j \delta_{U_t} \right) \quad \text{Equation 6}$$

subject to:

$g(x_t, u_t, v_t) = 0, t = 1, \ldots, n_p$ $y_t = \text{diag}(a)x_t + b, t = 1, \ldots, n_p$ $0 \le \delta_{L_t} \le \delta_{L_t}^*, t = 1, \ldots, n_p$ $0 \le \delta_{U_t} \le \delta_{U_t}^*, t = 1, \ldots, n_p$ $y_L - \delta_{L_t} \le y_t \le y_U + \delta_{U_t}, t = 1, \ldots, n_p$ $u_L \le u_t \le u_U, t = 1, \ldots, n_p$ In equation 6: (i) $D_j$ may represent a diagonal matrix that: (a) contains 1 in the position $d_{ii}$ in an instance where the constraint i is in priority group j and (b) contains 0 in the position du in an instance where the constraint i is in priority group j; (ii) $\sigma_L$ and $\sigma_U$ may represent weights, and can be set to 1 or tuned to trade off violation error for constraints with the same group of priority. Responsive to optimizing the error minimization problem for each priority level, the optimal solutions $\delta_{L_t}$ and $\delta_{U_t}$ may be fixed to constrain the violations to be no worse that the optimal violations. This may, for example, make each priority level infinitely more important than the next lower priority and profit maximization may be performed only after all violations have been minimized. With a calibrated model using optimized parameters (a, b) and constraint violations $\delta_{L_t}$ and $\delta_{U_t}$ minimized according to priority and incorporated as constraints, the following profit maximization problem can be optimized:

$$\text{maximize}_{u_t, \delta_{L_t}, \delta_{U_t}} \psi_{p+1} = \sum_{t=1}^{n_p} F_t(y_t, x_t, u_t, v_t) \quad \text{Equation 7}$$

subject to:

$g(x_t, u_t, v_t) = 0, t = 1, \ldots, n_p$ $y_t = \text{diag}(a)x_t + b, t = 1, \ldots, n_p$ $0 \le \delta_{L_t} \le \delta_{L_t}^{max}, t = 1, \ldots, n_p$ $0 \le \delta_{U_t} \le \delta_{U_t}^{max}, t = 1, \ldots, n_p$ $y_L - \delta_{L_t} \le y_t \le y_U + \delta_{U_t}, t = 1, \ldots, n_p$ $u_L \le u_t \le u_U, t = 1, \ldots, n_p$ -continued $\psi_{p+1}$ = profit objective function $F_t$ = profit in time period $t$ If there are no revenue generating functions in the optimization model, then the profit maximization problem above automatically can become a total cost minimization problem over the same time horizon.

As noted above, input data to the optimization model may include uncertain data (e.g., a portion of the input data may comprise uncertain data). For example, given that the control and optimization sub-problem for a planning optimization problem may have a time horizon that can be over many years, a proper uncertainty formulation may be generated/determined in order to make the model solutions more robust to uncertainty in the input data. In some embodiments, the uncertainty formulation may be based at least in part on a stochastic problem formulation. For example, in some embodiments, a stochastic problem formulation is formulated for optimization under uncertainty. In some embodiments, generating the uncertainty formulation may comprise determining/configuring a representative distribution for each uncertain input variable of one or more uncertain input variables. In the context of generating predicted plans to achieve specified emissions target (e.g., net zero emissions), examples of uncertain input variables may include the price of certain materials that impact emissions (e.g., price of natural gas, emissions benefit from a particular project associated with the industrial plant, and/or the like). In some embodiments, a distribution type may be configured for each input variable. In some embodiments, the representative distribution may be determined/configured based at least in part on historical data associated with the particular uncertain input variable. An upper limit and a lower limit may then be selected for each input variable based at least in part on the representative distribution. A set of values corresponding to the input variables may be generated based at least in part on the upper and lower limits using one or more sampling techniques/methods (e.g., simple random sampling, cluster sampling, systemic sampling, stratified sampling, convenience sampling, and/or other sampling techniques/methods). These set of values may define ns scenarios which may be optimized (e.g., simultaneously) using, for example, the same decision variables for each scenario. In some embodiments, the uncertainty problem may be optimized by performing the operations of the below equation:

$$\text{minimize}_{u_T} \phi = P(\psi_i(y_i, x_i, u_i, v_i)) \quad \text{Equation 8}$$

subject to:

$g_i(x_i, u_i, v_i) = 0, -i = 1, \ldots, n_s$ $y_i = \text{diag}(a)x_i + b, i = 1, \ldots, n_s$ $---u_T - u_i = 0, -i = 1, \ldots, n_s$ $y_L \le y_i \le y_U, , -i = 1, \ldots, n_s$ $--u_L \le u_i \le u_U, , -i = 1, \ldots, n_s$ In equation 8, for this problem, each variable is now represented by a value in each time period as well as a value in each scenario. This enables simultaneous consideration of all scenarios of uncertain data and computes a single set of decision variables that is optimal for all scenarios according to the objective function type choice.

In equation 8: (i) P may represent an objective function and may comprise and/or represent a cumulative distribution function such as the expected value, mode, variance or fractiles; (ii) $u_T$ may represent master decision variables for each scenario/case and may be forced upon each scenario by $u_T-u_i=0$. In some embodiments, the calibration problem need not be included in this multi-scenario problem, because the historical and current data is known and there are no uncertain values. The control and profit maximization problems can be optimized by the multi-scenario formulation since they do incorporate uncertain input values.

Considering, that each sub-problem of the planning optimization problem may comprise a sequence of problems, as described above, Alternating Direction Method of Multipliers (ADMM) may be used to decompose the problem into more tractable sub-problems that can be optimized iteratively and in parallel.

Having described example systems, apparatuses, data architectures, and model implementations in accordance with the present disclosure, example processes for generating an optimized plan using NMPC will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 29:
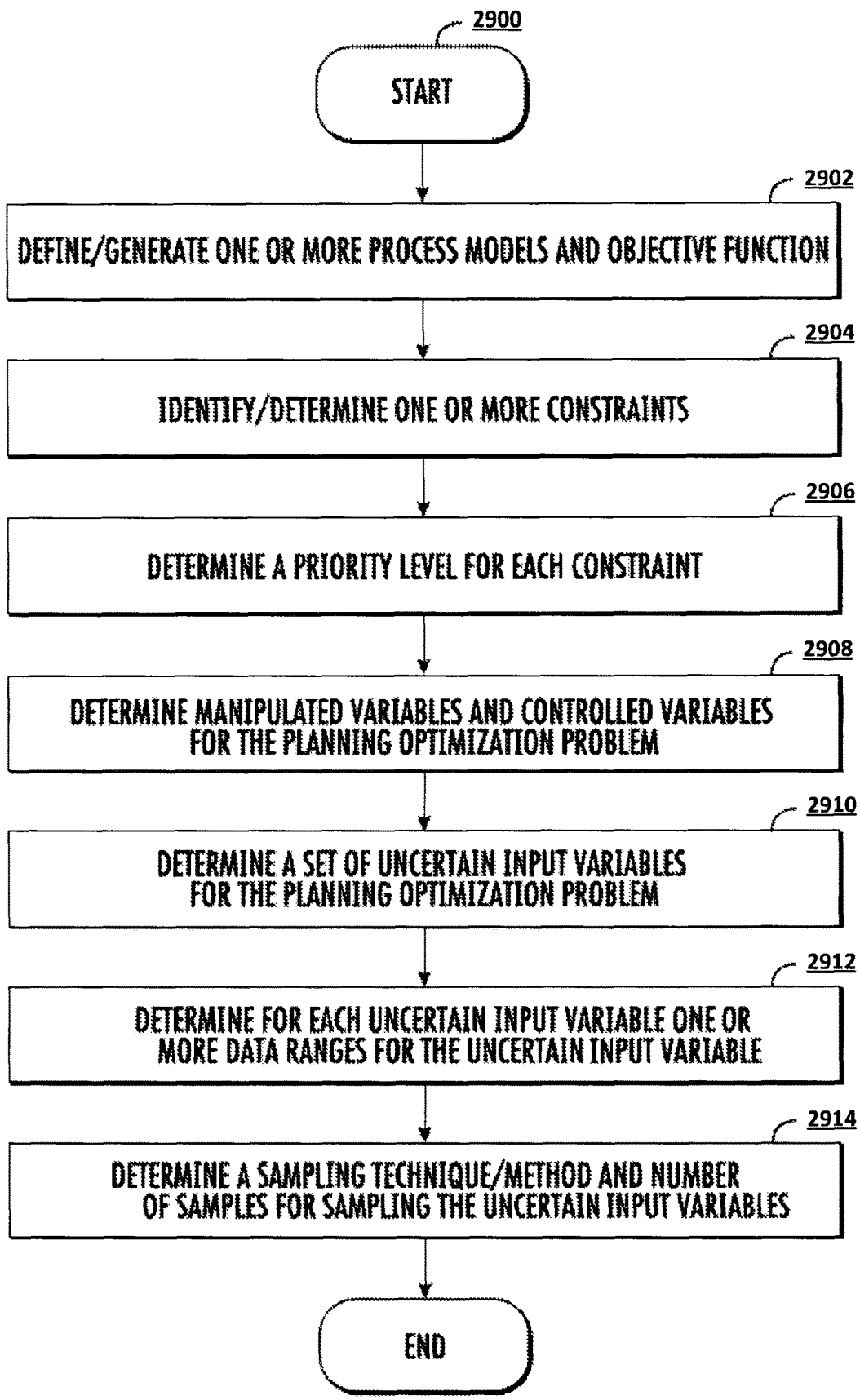
FIG. 29 illustrates a flowchart including example operations of an example process for performing configuration operations in accordance with at least one example embodiment of the present disclosure.

In some embodiments, generating an optimized plan utilizing a model predictive control, such as an NMPC, may comprise performing one or more configuration operations. FIG. 29 illustrates a flowchart including example operations of an example process for performing configuration operation(s) associated with generating predicted optimized plans. Specifically, FIG. 29 illustrates an example computer-implemented process 2900. In some embodiments, the process 2900 is embodied by computer program code stored on a non-transitory computer-readable storage medium of a computer program product configured for execution to perform the process as depicted and described. Alternatively or additionally, in some embodiments, the process 2900 is performed by one or more specially configured computing devices, such as the apparatus 2800 alone or in communication with one or more other component(s), device(s), system(s), and/or the like. In this regard, in some such embodiments, the apparatus 2800 is specially configured by computer-coded instructions (e.g., computer program instructions) stored thereon, for example in the memory 2804 and/or another component depicted and/or described herein and/or otherwise accessible to the apparatus 2800, for performing the operations as depicted and described. For example, the apparatus 2800 in some embodiments is in communication with separate physical component(s) of an industrial plant, and/or the like. For purposes of simplifying the description, the process 2900 is described as performed by and from the perspective of the apparatus 2800.

The process 2900 begins at operation 2902. At operation 2902, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that defines/generates one or more process models (e.g., an optimization model) and objective function. A given process model (e.g., optimization model), for example, may be associated with a particular industrial plant. In some embodiments, the process model is an optimization model that incorporates uncertainty quantification of uncertain input variables (e.g., effectively accounts for uncertainty in the input data to the model). In some embodiments, the industrial plant may be associated with an enterprise (e.g., a corporation) associated with a plurality of industrial plants, wherein each process model (e.g., optimization model) is associated with a given industrial plant of the plurality of industrial plants. In some embodiments, the one or more process models (e.g., optimization model) is defined/generated based at least in part on non-linear model-predictive control (NMPC) approach. For example, the one or more process models (e.g., optimization model) may be defined/generated based at least in part on one or more features, parameters, techniques, and/or the like embodied by NMPC approach. In some embodiments, defining/generating the one or more process models (e.g., optimization model) may comprise retrieving or receiving the one or more process models from a database.

In some embodiments, defining/determining the objective function comprises specifying one or more objective values and/or relationship between the one or more objective values. The objective function may be defined/determined such that the optimization model generates a minimal amount of error between measured process outputs (based at least in part on predicted plan(s)) and desired/expected output. In the context of generating predicted plan(s) to achieve specified emissions goal(s), the objective function may comprise a profit objective function. In some embodiments, the optimization model may be associated with a plurality of object functions.

At operation 2904, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that identifies/determines one or more constraints associated with one or more input variables associated with a particular industrial plant. In some embodiments, the one or more constraints may be identified/determined based at least in part on user input. In some embodiments, the one or more constraints may be retrieved and/or received from a database, a computing device, and/or the like. In some embodiments, the apparatus 2800 may identify/determine the one or more constraints (e.g., automatically) based at least in part on the desired target goal. For example, in the context of generating predicted plan(s) to achieve specified emission reduction goal(s), the one or more constraints may include process constraints (e.g., processing machine constraints), emissions constraints, project constraints, safety constraint, financial constraints, quality constraints, and/or the like.

At operation 2906, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that determine (e.g., specifies) a priority level for each constraint. As described above, non-limiting examples of constraint types include hard constraints and soft constraints. Hard constraint may describe a constraint having finite priority and that may not be violated, while soft constraint may describe a constraint that can be relaxed (e.g., based at least in part on a priority level associated with the soft constraint) but still optimized for. In some embodiments, determining a priority level for each constraint may comprise assigning a priority level to each constraint based at least in part on the constraint type associated with the constraint. For example, in some embodiments, safety constraints may be classified as hard constraints, wherein hard constraints may be associated with a highest priority level. Accordingly, in the noted example, safety constraints may be assigned a highest priority level. As another example, in some embodiments manipulated variables (such as certain decision variables) may be classified as hard constraints, wherein as noted above, hard constraints may be associated with a highest priority level. Accordingly, in the noted example, manipulated constraints may be assigned a highest priority level. As yet another example, in some embodiments, financial constraints may be classified as soft constraints, wherein soft constraints may be associated with a priority level that is lower relative to hard constraints. Accordingly, in the noted example, financial constraints may be assigned a lower priority level relative to a hard constraint such as a safety constraint and a manipulated constraint. In some embodiments, the constraint type for a given input variable may be determined based at least in part on user input. For example, in some embodiments, a user provides information defining a particular constraint, and indicates whether the constraint is a hard constraint or a soft constraint. Additionally or alternatively, in some embodiments, the priority level for a particular constraint may be determined based at least in part on user input. For example, in some embodiments, a user provides information defining a particular constraint, and indicates the priority level for the particular constraint.

At operation 2908, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that determine (e.g., specifies) manipulated variables and controlled variables for the planning optimization problem based at least in part on a plurality of input variables associated with the industrial plant. In some embodiments, the planning optimization problem may comprise a plurality of sub-problems. For example, in some embodiments, determining the manipulated variables and controlled variables for the planning optimization problem may comprise determining manipulated variables and controlled variables for each sub-problem of one or more sub-problems associated with the planning optimization problem (e.g., calibration problem, control problem, optimization problem, uncertainty problem, and/or the like as described above). In some embodiments, manipulated variables and controlled variables for the planning optimization problem may be determined based at least in part on user input. The manipulated variables and controlled variables, for example, may be received via a computing device associated with a user. For example, in some embodiments, a user provides information defining a particular input variable, and indicates whether the input variable is a manipulated variable or a controlled variable. In some embodiments, the manipulated variable and controlled variables may be determined based at least in part on the target goal(s) associated with the optimization model At operation 2910, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that determines (e.g., specifies) a set of uncertain input variables for the planning optimization problem. One or more variables that impacts the desired target goal(s) may be uncertain in that they may be associated with data values that are not fixed and may change (e.g., with a market, regulatory environment, political influence, and/or the like over time). In one or more embodiments, the optimization model incorporates a quantification of the noted one or more uncertain input variables (e.g., the one or more variables that impacts the desired target goal(s) whose data values are not fixed and may change over time). In some embodiments, the set of uncertain input variables for the planning optimization problem may be determined based at least in part on user input. A particular uncertain input variable in the set of uncertain input variables, for example, may be received via a computing device associated with a user (e.g., a corporation associated with the industry plant). For example, in some embodiments, a user provides information defining a particular input variable, and indicates whether the input variable is an uncertain input variable. For example, the user may provide, via associated computing device, information defining price of nitrogen as an input variable and indicates that the price of nitrogen is not fixed (e.g., indicates that the price of gas is an uncertain input variable). As another example, the user may provide, via associated computing device, information defining an emissions benefits for a particular project as an input variable and indicates that the emissions benefits for this particular project is not fixed or is unknown (e.g., indicates that emissions benefits for this particular project is an uncertain input variable). In some embodiments, the set of uncertain input variables may be determined (e.g., automatically) based at least in part on the target goal(s), such as emissions reduction goal. For example, in the noted emissions reduction goal, the apparatus 2800 may determine that the price of natural gas is an uncertain input variable.

At operation 2912, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that determine for each uncertain input variable one or more data ranges for the uncertain input variable. For example, a particular data range may describe an uncertainty range for a particular uncertain input variable. In some embodiments, to determine the data range (e.g., uncertainty range) for an uncertain input variable, the apparatus 2800 may generate a data distribution corresponding to the uncertain input variable (e.g., based at least in part on historical data and/or current data associated with the uncertain input variable), and determine the data range based at least in part on the ends of the distribution. For example, in the context of generating predicted plan(s) to achieve specified emissions reduction goal(s), a particular data range corresponding to the price of nitrogen may comprise a range for the price of nitrogen. In the noted example, the range for the price of nitrogen may be determined, for example, based at least in part on historical prices and/or current price of nitrogen. In some embodiments, the historical data may be received or retrieved from one or more databases or external data sources. In some embodiments, the historical data may be received via a computing device associated with a user. In some embodiments, the current data may be received or retrieved from one or more databases or external data sources. In some embodiments, the current data may be received via a computing device associated with a user.

At operation 2914, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that determines (e.g., specified) a sampling technique/method and number of samples for sampling the uncertain input variables. Examples of such sampling technique/methods may include simple random sampling, cluster sampling, systemic sampling, stratified sampling, convenience sampling, and/or other sampling techniques/methods. In some embodiments, the sampling technique/method and/or the number of samples may be determined based at least on user input. For example, in some embodiments, the sampling technique/method and/or the number of samples may be received or retrieved via a computing device associated with a user. In some embodiments, the sampling technique/method and/or the number of samples may be determined (e.g., automatically) based at least in part on one or more criteria (e.g., based at least in part on the target goal(s))

Figure 30:
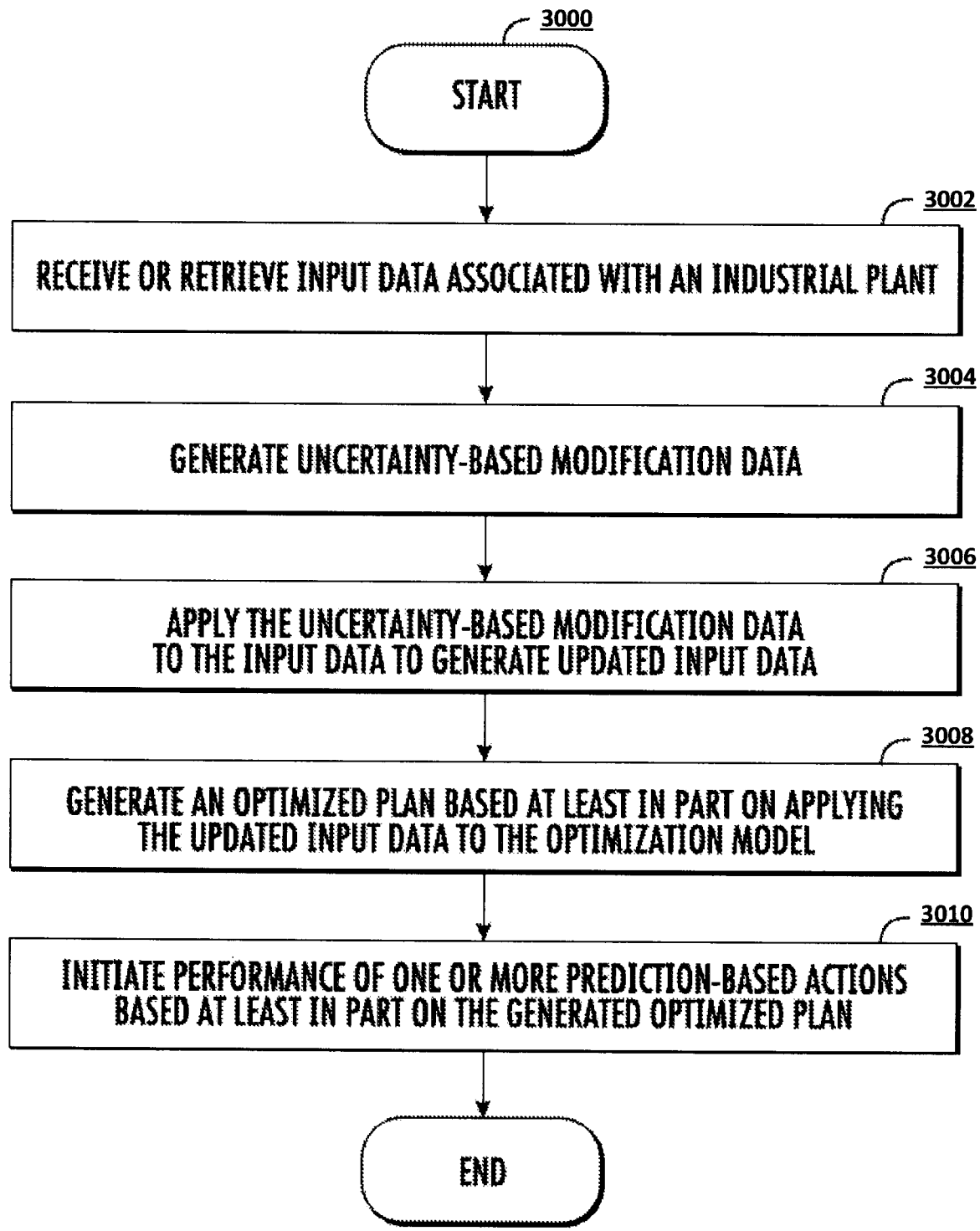
FIG. 30 illustrates a flowchart including example operations of an example process for generating predicted optimized plan in accordance with at least one example embodiment of the present disclosure.

FIG. 30 illustrates a flowchart including example operations of an example process for generating an optimized plan comprising optimized plan data in accordance with at least one example embodiment of the present disclosure. In some embodiments, the noted example process may be performed subsequent to performing one or more configuration operations (e.g., as described above in relation to FIG. 29). Specifically, FIG. 30 illustrates an example computer-implemented process 3000. In some embodiments, the process 3000 is embodied by computer program code stored on a non-transitory computer-readable storage medium of a computer program product configured for execution to perform the process as depicted and described. Alternatively or additionally, in some embodiments, the process 3000 is performed by one or more specially configured computing devices, such as the apparatus 2800 alone or in communication with one or more other component(s), device(s), system(s), and/or the like. In this regard, in some such embodiments, the apparatus 2800 is specially configured by computer-coded instructions (e.g., computer program instructions) stored thereon, for example in the memory 2804 and/or another component depicted and/or described herein and/or otherwise accessible to the apparatus 2800, for performing the operations as depicted and described. In some embodiments, the apparatus 2800 is in communication with one or more external apparatus(es), system(s), device(s), and/or the like, to perform one or more of the operations as depicted and described. For example, the apparatus 2800 in some embodiments is in communication with separate physical component(s) of an industrial plant, and/or the like. For purposes of simplifying the description, the process 3000 is described as performed by and from the perspective of the apparatus 2800.

The process 3000 begins at operation 3002. At operation 3002, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that receives or retrieves input data associated with an industrial plant. The input data may comprise current input data for the model execution cycle and may comprise data corresponding to a plurality of input variables. The input data, for example, may include one or more of emissions data for one or more processes associated with the industrial plant, building data (e.g., plant layout, plant size, and/or the like), asset-related data (e.g., assets that relate manipulated variables to product rates), emissions rate, utilities consumption, lower and upper limits on various constraints (e.g., safety constraints, quality constraints, and/or other constraints), cost data, average operating data, and/or plan achievement probability measure. A plan achievement probability measure may describe the desired likelihood of achieving the desired target goal(s) based at least in part on output (e.g., predicted optimized plan(s)) of the optimization model). In some embodiments, the input data may be received from one or more databases. Additionally or alternatively, the input data may be received from one or more sensing devices (e.g., sensors) associated with one or more physical components (e.g., processing machines, and/or the like). Additionally or alternatively, in some embodiments, portions of input data may be identified based at least in part on one or more other portion(s) of data. In one or more embodiments, portions of the input data include uncertain data (e.g., data associated with input variable that is not fixed or whose value is unknown). As described above, examples of uncertain input variable may include price of a particular raw material(s) (e.g. natural gas), emissions benefits of a particular project, and/or the like.

At operation 3004, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that generates uncertainty-based modification data. The uncertainty-based modification data, for example, may be generated for the uncertain data in the input data, and may correspond to the set of uncertain input variables (e.g., the set of uncertain input variables generated at operation 2910). In some embodiments, the apparatus 2800 may generate uncertainty-based modification data for each uncertain input variable in the set of uncertain input variables based at least in part on the data distribution(s) for the uncertain input variables (e.g., the data distributions(s) determined at operation 2912) and using the determined sampling technique/method and number of sample(s) (e.g., determined at operation 2914). For example, in some embodiments, generating the uncertainty-based modification data may comprise sampling the data distribution(s) (e.g., determined at operation 2912) for each uncertain input variable in the set of uncertain input variables using the sampling technique/method and number of samples (e.g., determined at operation 2914).

At operation 3006, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that applies the uncertainty-based modification data to the input data to generate updated input data. In some embodiments, applying the uncertainty-based modification data to the input data comprises altering the input data based at least in part on the uncertainty-based modification data or otherwise combining the uncertainty-based modification data with the input data in a manner that accounts for the uncertainty in the input data. For example, in some embodiments applying the uncertainty-based modification data to the input data may comprise changing each uncertain data in the input data to the corresponding uncertainty-based modification data for the uncertain data (e.g., for each uncertain input variable, changing the associated uncertain data to the corresponding uncertainty-based modification data). As another example, in some embodiments applying the uncertainty-based modification data to the input data may comprise, for each uncertain input variable in the set of uncertain input variables appending the input data with the corresponding uncertainty-based modification data. As yet another example, in some embodiments, applying the uncertainty-based modification data to the input data may comprise, for each input variable in the set of input variables: (i) changing the associated uncertain data in the input data to the corresponding uncertainty-based modification data and/or (ii) appending the input data with the corresponding uncertainty-based modification data.

Figure 32:
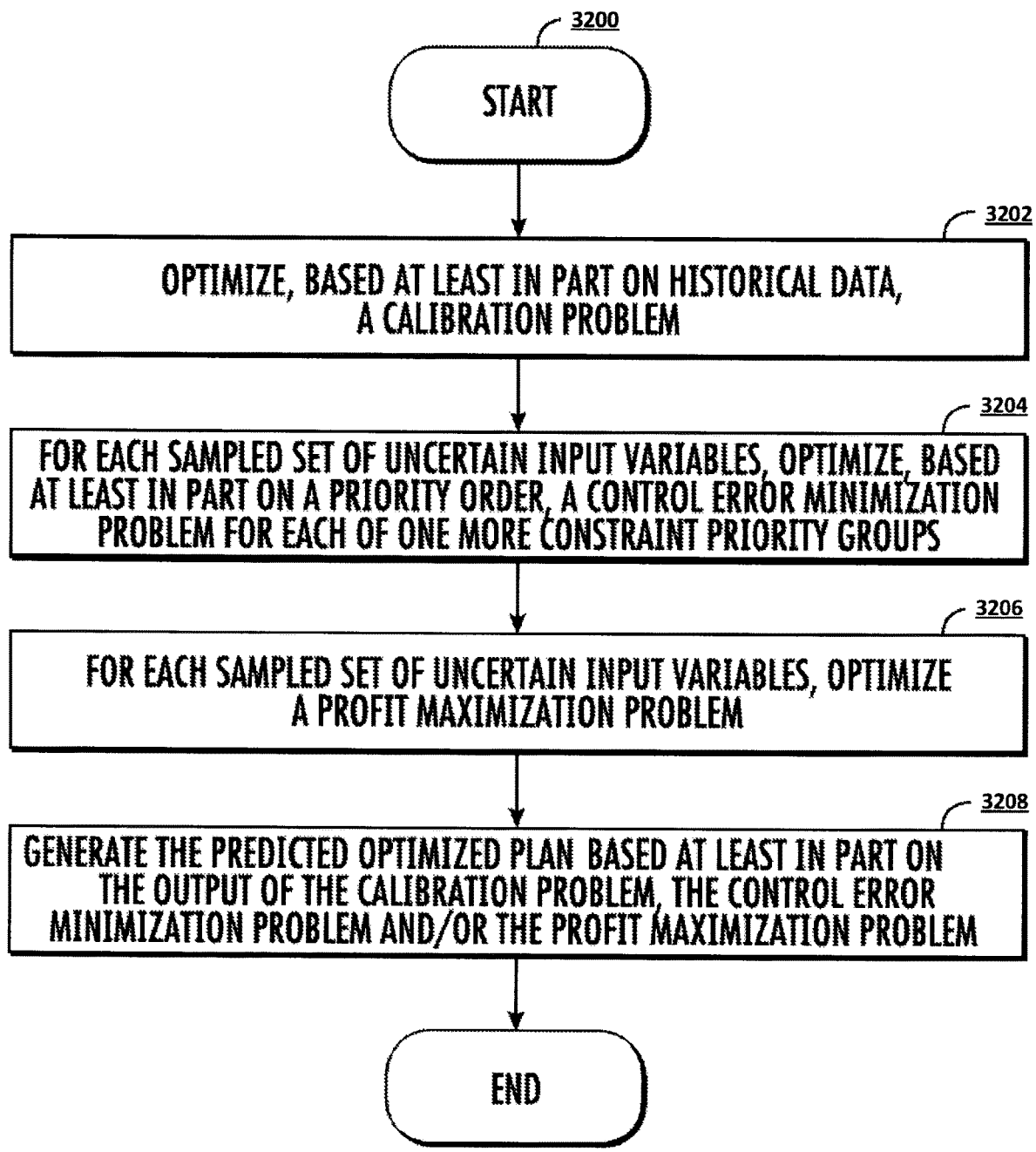
FIG. 32 illustrates a flowchart including example operations of an example process for generated predicted optimized plan in accordance with at least on example embodiment of the present disclosure.

At operation 3008, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that generates an optimized plan based at least in part on applying the updated input data to an optimization model. The optimized plan may comprise optimized plan data. In some embodiments, operation 3008 may be performed in accordance with the example process 3200 that is depicted in FIG. 32.

At operation 3010, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that initiates the performance one or more prediction-based actions based at least in part on the generated optimized plan. In some embodiments, initiating the one or more prediction-based actions comprises outputting the predicted optimized plan(s) (e.g., predicted optimized plan data thereof). In some embodiments, the apparatus 2800 outputs the predicted optimized plan(s) via a display of the apparatus 2800, for example by causing rendering of user interface (e.g., output user interface) via the apparatus 2800. Additionally or alternatively, in some embodiments, the apparatus 2800 outputs the predicted optimized plan(s) via at least one transmission to a client device to cause the client device to cause rendering of a user interface including or otherwise associated with the predicted optimized plan(s). Additionally or alternatively, in some embodiments, the apparatus 2800 outputs the predicted optimized plan(s) for subsequent downstream processing. In some embodiments, the apparatus 2800 outputs the predicted optimized plan(s) by transmitting the predicted optimized plan(s) for use and/or further processing by an external device, system, and/or the like. In some embodiments, the apparatus 2800 outputs the predicted optimized plan(s) for use in automatically configuring/reconfiguring operation one or more physical component(s) of an industrial plant, such as a processing machine, based at least in part on the generated predicted optimized plan data. For example, in some embodiments, the apparatus 2800 outputs the predicted optimized plan(s) to facilitate operation of at least one physical component of an industrial plant based at least in part on the predicted optimized plan (e.g., the optimized plan data thereof), for example by setting a configuration of at least one physical component in the industrial plant in accordance with the predicted optimized plan.

In some embodiments, at least a portion of the predicted optimized plan is outputted for use with at least one plant-wide optimization process. For example, in some embodiments the apparatus 2800 outputs the at least a portion of the predicted optimized plan by applying the at least a portion of the predicted optimized plan to a plant-wide optimization process. In some embodiments, the plant-wide optimization process generates optimized carbon emission levels in accordance with the predicted optimized plan that enables achievement of net zero emission over a specified time horizon. For example, the optimization may be utilized to optimize target amounts of final products, operation of process machines, utility usage, and/or the like in a manner that maximizes and/or minimizes one or more target parameter(s), for example an emissions amount associated with operation of an industrial plant, a profit parameter associated with operation of an industrial plant, and/or the like.

In some embodiments, one or more operations of the process 3000 may be performed periodically (e.g., every month, every 2 months, and/or the like). Additionally and/or alternating one or more operations of the process 3000 may be performed in response to one or more changes/updates, (e.g., changes in input data such as new and/or updated cost data, new and/or updated constraints data, and/or the like). In some embodiments, each execution of the noted one or more operations of the process 3000 may comprise a model execution cycle, wherein the output of an executed cycle is a predicted optimized plan that is generated based at least in part on current input data.

Figure 31:
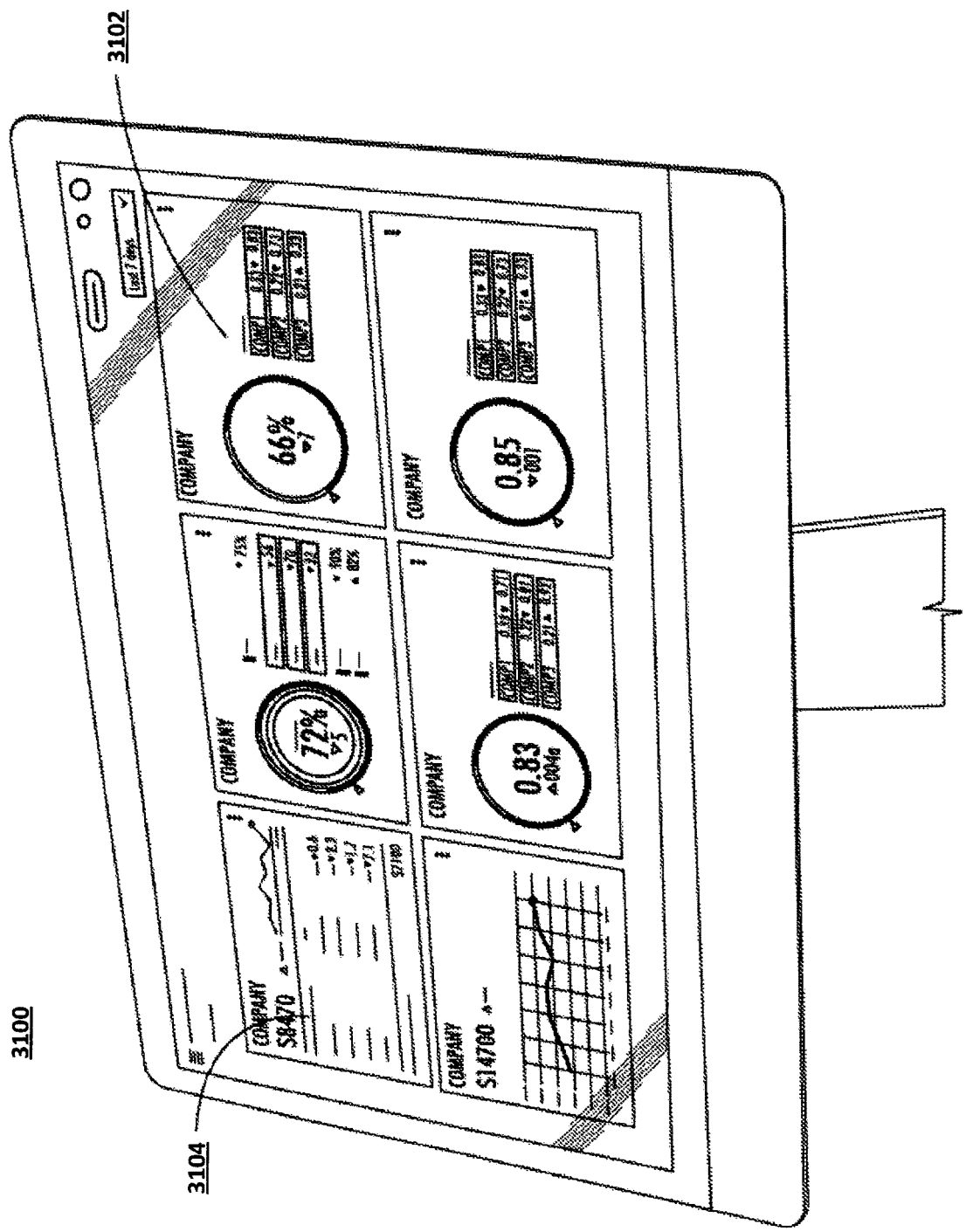
FIG. 31 illustrates an operation example of an output user interface in accordance with at least one example embodiment of the present disclosure.

FIG. 31 provides an operation example showing an output user interface 3100 that may be generated based at least in part on user interface data which are in turn generated based at least in part on the predicted optimized plan(s). The output user interface 3100 may display various data associated with the optimization model and/or the predicted optimized plan(s). As depicted in FIG. 31, the output user interface may display data corresponding to portions of the predicted optimized plan(s), data derived from the predicted optimized plan(s), data corresponding to implementation results of the predicted optimized plan(s), and/or the like. Examples of such user interface data may include performance data 3102, production cost 3104, project data, and/or the like FIG. 32 illustrates a flowchart including example operations of an example process for generating predicted optimized plan(s) based at least in part on applying the updated input data to an optimization model. FIG. 32 illustrates an example computer-implemented process 3200. In some embodiments, the process 3200 is embodied by computer program code stored on a non-transitory computer-readable storage medium of a computer program product configured for execution to perform the process as depicted and described. Alternatively or additionally, in some embodiments, the process 3200 is performed by one or more specially configured computing devices, such as the apparatus 2800 alone or in communication with one or more other component(s), device(s), system(s), and/or the like. In this regard, in some such embodiments, the apparatus 2800 is specially configured by computer-coded instructions (e.g., computer program instructions) stored thereon, for example in the memory 2804 and/or another component depicted and/or described herein and/or otherwise accessible to the apparatus 2800, for performing the operations as depicted and described. For example, the apparatus 2800 in some embodiments is in communication with separate physical component(s) of an industrial plant, and/or the like. For purposes of simplifying the description, the process 3200 is described as performed by and from the perspective of the apparatus 2800.

The process 3200 begins at operation 3202. At operation 3202, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that optimizes, based at least in part on historical data, a calibration problem. Optimizing the calibration problem may embody a feedback mechanism that enables updates to be made to the optimization model based at least in part on historical data associated with the optimization model (e.g., historical predicted plans and/or historical input data). The noted feedback mechanism enables a closed loop performance which ensures with reasonable certainty that the model predictions converge to actual measurements from the processes of the corresponding industrial plant. For example, optimizing the calibration problem may comprise (i) computing and learning biases between historical predicted plans and corresponding actual measurements (e.g., emissions measurements) and (ii) incorporating the noted biases into the optimization model, which in turn minimizes prediction error and improves the prediction accuracy of the optimization model. In some embodiments, to optimize the calibration problem, the apparatus 2800 performs the operations of equation 5 (described above).

At operation 3204, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that for each sampled set of uncertain input variable, optimizes based at least in part on a priority order, a control error minimization problem for each of one or more constraint priority groups, wherein each constraint priority group may be associated with a priority level. In some embodiments, to optimize the control error minimization problem, the apparatus 2800 performs the operations of equation 6 (described above).

At operation 3206, the apparatus 2800 includes model maintenance circuitry 2812, plan prediction circuitry 2814, optional control circuitry 2816, communications circuitry 2808, input/output circuitry 2806, processor 2802, and/or the like, or a combination thereof, that for each sampled set of uncertain input variable, optimizes a maximization problem that incorporates uncertainty quantification. In some embodiments, the maximization problem is a profit maximization problem. In some embodiments, the profit maximization problem comprises at least a decision variable cost measure. The decision variable cost measure may comprise cost for decision variable changes from the current plan.

At operation 3208, the apparatus 2800 includes a model maintenance circuitry 2812, plan prediction circuitry 2814, optional control circuitry 2816, communications circuitry 2808, input/output circuitry 2806, processor 2802, and/or the like, or a combination thereof, that for each sample set of uncertain input variable, generates the predicted optimized plan based at least in part on the output of the calibration problem, the control error minimization problem and/or the profit maximization problem.

CONCLUSION

Many modifications and other embodiments of the disclosure set forth herein will come to mind to one skilled in the art to which these innovations pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosure are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to an industrial control system environment attempting to reduce carbon emissions, however, one skilled in the art may recognize that such principles may be applied to any industrial or factory operations seeking to implement tasks to improve performance of any operating assets. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the embodiments of the innovations set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

What is claimed is:

1. A computer-implemented method for producing an optimization pathway for a plurality of assets, the method comprising:
    receiving, by at least one processor, a plurality of inputs comprising at least one uncertain input and a plurality of variable inputs,
        wherein the at least one uncertain input is associated with an uncertainty model, and
        wherein the uncertainty model corresponds to a predicted accuracy of the uncertain input;
    generating, by the at least one processor, an optimization model,
        wherein the optimization model is associated with a plurality of optimization parameters,
        wherein each of the plurality of optimization parameters is associated with an optimization weight corresponding to a relative priority of a particular optimization parameter, and
        wherein the optimization model is configured based at least in part on the plurality of configuration inputs, the input uncertainty model, at least one hard constraint, and at least one soft constraint;
    generating, by the at least one processor, the optimization pathway comprising a plurality of decarbonization tasks associated with the plurality of assets based at least in part on the optimization model,
        wherein the optimization pathway is optimized according to the plurality of selected optimization parameters associated with a least optimization weight,
        wherein the optimization pathway conforms to each of the one or more hard constraints, and
        wherein the plurality of decarbonization tasks associated with the plurality of assets comprises adjusting an operation of at least one asset of the plurality of assets to optimize emission for one or more industrial processes; and
    generating an updated optimization pathway based at least in part on an observed value and the optimization pathway,
        wherein the observed value comprises at least one measured value captured by one or more sensing devices positioned to capture a physical characteristic of a monitored asset of the plurality of assets.

2. The computer-implemented method of claim 1, wherein the plurality of configuration inputs comprise static configuration inputs, and dynamic configuration inputs.

3. The computer-implemented method of claim 2,
    wherein the static configuration inputs comprise at least one of a geographic location of one or more assets of the plurality of assets and an operating environment of one or more assets of the plurality of assets.

4. The computer-implemented method of claim 2,
    wherein the dynamic configuration inputs comprise at least one of a cost of consumable materials, a cost of operations, a budget, regulatory requirements, resources available, and implementation timelines.

5. The computer-implemented method of claim 1, wherein the uncertainty model indicates the predicted accuracy of the uncertain input through a probability distribution indicating a probability of an occurrence of a particular value for the uncertain input.

6. The computer-implemented method of claim 1,
    wherein the plurality of optimization parameters are optimized according to an order defined by the optimization weight.

7. The computer-implemented method of claim 1, further comprising:
    receiving a carbon emissions target value representing the target net carbon emissions for the plurality of assets,
        wherein a model carbon emissions output value associated with the net carbon emissions of the optimized plurality of assets is below the carbon emissions target value.

8. The computer-implemented method of claim 1,
    wherein the plurality of optimization parameters may comprise at least one of total cost, time, risk, and total carbon emissions.

9. The computer-implemented method of claim 1,
    wherein the plurality of decarbonization tasks comprise replacing, modifying, or installing at least one asset of the plurality of assets.

10. The computer-implemented method of claim 1,
    wherein performance of the plurality of decarbonization tasks results in a reduction of a carbon emissions value of one or more assets of the plurality of assets.

11. The computer-implemented method of claim 1, wherein the optimization pathway provides a predicted value for each of the plurality of optimization parameters.

12. An apparatus for producing an optimization pathway for a plurality of assets, the apparatus comprising at least one processor and at least one non-transitory memory including computer-coded instruction thereon, the computer coded instructions, with the at least one processor, cause the apparatus to:
    receive a carbon emissions value representing a net carbon emission for the plurality of assets;

receive a plurality of configuration inputs comprising at least one uncertain input and a plurality of variable inputs,
  wherein the at least one uncertain input is associated with an uncertainty model, and
  wherein the uncertainty model represents a predicted accuracy of the uncertain input;
receive a sensor data input, wherein the sensor data input represents a physical characteristic of an asset of the plurality of assets;
generate an optimization model,
  wherein the optimization model comprises a plurality of optimization parameters associated with the plurality of variable inputs,
  wherein each of the plurality of optimization parameters is associated with an optimization weight corresponding to a relative priority of a particular optimization parameter, and
  wherein the optimization model further comprises the plurality of configuration inputs, the input uncertainty model, a hard constraint, and a soft constraint;
generate the optimization pathway comprising a plurality of decarbonization tasks associated with the plurality of assets based at least in part on the optimization model,
  wherein the optimization pathway is optimized according to the optimization parameters associated with a least optimization weight,
  wherein the optimization pathway conforms to all of the one or more hard constraints,
  wherein the plurality of decarbonization tasks associated with the plurality of assets comprises adjusting an operation of at least one asset of the plurality of assets to optimize emission for one or more industrial processes; and
update the optimization pathway based at least in part on an observed value,
  wherein the observed value comprises a measured value captured by one or more sensing devices positioned to capture a physical characteristic of a monitored asset of the plurality of assets.

13. The apparatus of claim 12, wherein the plurality of configuration inputs comprise static configuration inputs, and dynamic configuration inputs.

14. The apparatus of claim 13, wherein the static configuration inputs comprise at least one of a geographic location of one or more assets of the plurality of assets and an operating environment of one or more assets of the plurality of assets.

15. The apparatus of claim 13, wherein the dynamic configuration inputs comprise at least one of a cost of consumable materials, a cost of operations, a budget, regulatory requirements, resources available, and implementation timelines.

16. The apparatus of claim 12, wherein the uncertainty model indicates the predicted accuracy of the uncertain input through a probability distribution indicating a probability of an occurrence of a particular value for the uncertain input.

17. The apparatus of claim 12, wherein the plurality of optimization parameters are optimized according to an order defined by the optimization weight.

18. The apparatus of claim 12, further comprising:
receiving a carbon emissions target value representing the target net carbon emissions for the plurality of assets,
  wherein a model carbon emissions output value associated with the net carbon emissions of the optimized plurality of assets is below the carbon emissions target value.

19. The apparatus of claim 12, wherein performance of the plurality of decarbonization tasks results in a reduction of a carbon emissions value of one or more assets of the plurality of assets.

20. A computer program product comprising at least one non-transitory computer-readable storage medium having computer program code stored thereon that, in execution with at least one processor, configures the computer program product for:
receiving a carbon emissions value representing a net carbon emission for the plurality of assets;
receiving a plurality of configuration inputs comprising at least one uncertain input and a plurality of variable inputs,
  wherein the at least one uncertain input is associated with an uncertainty model, and
  wherein the uncertainty model represents a predicted accuracy of the uncertain input;
receiving a sensor data input, wherein the sensor data input represents a physical characteristic of an asset of the plurality of assets;
generating an optimization model,
  wherein the optimization model comprises a plurality of optimization parameters associated with the plurality of variable inputs,
  wherein each of the plurality of optimization parameters is associated with an optimization weight corresponding to a relative priority of a particular optimization parameter, and
  wherein the optimization model further comprises the plurality of configuration inputs, the input uncertainty model, a hard constraint, and a soft constraint;
generating the optimization pathway comprising a plurality of decarbonization tasks associated with the plurality of assets based at least in part on the optimization model,
  wherein the optimization pathway is optimized according to the plurality of selected optimization parameters associated with a least optimization weight,
  wherein the optimization pathway conforms to all of the one or more hard constraints, and
  wherein the plurality of decarbonization tasks associated with the plurality of assets comprises adjusting an operation of at least one asset of the plurality of assets to optimize emission for one or more industrial processes; and
updating the optimization pathway based at least in part on an observed value,
  wherein the observed value comprises measured values captured by one or more sensing devices positioned to capture a physical characteristic of a monitored asset of the plurality of assets.

* * * * *